US012693150B1

(12) United States Patent
DesJardien et al.

(10) Patent No.: US 12,693,150 B1
(45) Date of Patent: Jul. 28, 2026

(54) MODULAR STORAGE SYSTEMS

(71) Applicant: Amazon Technologies, Inc., Seattle, WA (US)

(72) Inventors: Matthew Ray DesJardien, Kenmore, WA (US); Chelsea Olson, Auburn, WA (US); Robert M. Riggs, Winthrop, WA (US); Dan Beltzer, Issaquah, WA (US); Paul Eugene Munger, Seattle, WA (US); Aaron M. McDaniel, Seattle, WA (US); Andrew James Pierce, Renton, WA (US); Michael Mosman, Everett, WA (US); Nathan Pius O'Neill, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 18/434,441

(22) Filed: Feb. 6, 2024

Related U.S. Application Data

(63) Continuation of application No. 16/453,677, filed on Jun. 26, 2019, now Pat. No. 11,927,472.

(51) Int. Cl.
*G01G 19/414* (2006.01)
*G06Q 30/0283* (2023.01)
*H02S 40/38* (2014.01)

(52) U.S. Cl.
CPC ....... *G01G 19/414* (2013.01); *G06Q 30/0283* (2013.01); *H02S 40/38* (2014.12)

(58) Field of Classification Search
CPC ... G01G 19/414; G06Q 30/0283; H02S 40/38
See application file for complete search history.

(56) References Cited

U.S. PATENT DOCUMENTS 5,671,362 A    9/1997   Cowe et al.
7,225,980 B2   6/2007   Ku et al.
7,949,568 B2   5/2011   Fano et al.
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Nha T Nguyen
(74) *Attorney, Agent, or Firm* — Athorus, PLLC

(57) ABSTRACT

Modular storage systems include load sensors disposed beneath or in association with platforms. The load sensors are pulse-sampled for signals corresponding to loads at time intervals, rather than continuously, in order to conserve electrical power. An item associated with a transaction is identified based on a change in the loads, as determined from the pulse-sampled signals. The platforms are aligned at horizontal or non-horizontal angles, and photovoltaic power sources with banks of photovoltaic cells are mounted to front edges of the platforms. When a user reaches over one of the photovoltaic cells to access an item on a platform, a level of power or voltage generated by the photovoltaic cell is diminished. The item closest to the photovoltaic cell having the diminished power or voltage, or a customer that accessed the item, may be identified accordingly.

20 Claims, 46 Drawing Sheets

(56) References Cited

U.S. PATENT DOCUMENTS

| | | | |
|---|---|---|---|
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 8,695,878 | B2 | 4/2014 | Burnside et al. |
| 9,473,747 | B2 | 10/2016 | Kobres et al. |
| 10,001,402 | B1 | 6/2018 | Gyori et al. |
| 10,007,892 | B1 | 6/2018 | Hahn et al. |
| 10,064,502 | B1 | 9/2018 | Gyori et al. |
| 10,108,157 | B1 | 10/2018 | Raghavan et al. |
| 10,121,121 | B1 | 11/2018 | Bonet et al. |
| 10,198,710 | B1 | 2/2019 | Hahn et al. |
| 10,262,294 | B1 | 4/2019 | Hahn et al. |
| 10,318,917 | B1 | 6/2019 | Goldstein et al. |
| 10,332,089 | B1 | 6/2019 | Asmi et al. |
| 10,332,183 | B1 | 6/2019 | Dogan et al. |
| 10,438,277 | B1 | 10/2019 | Jiang et al. |
| 10,489,743 | B2 | 11/2019 | Aepli |
| 10,535,146 | B1 | 1/2020 | Buibas et al. |
| 10,614,415 | B1 | 4/2020 | Bonet et al. |
| 10,769,450 | B1 | 9/2020 | Krishnamurthy et al. |
| 10,783,762 | B1 | 9/2020 | Paul et al. |
| 10,922,541 | B2 | 2/2021 | Shiraishi |
| 11,087,275 | B2 | 8/2021 | Tripathi |
| 11,106,941 | B2 | 8/2021 | Buibas et al. |
| 11,144,877 | B2 | 10/2021 | Tineo |
| 11,263,613 | B2 | 3/2022 | Motoki |
| 11,397,914 | B2 | 7/2022 | Johnson et al. |
| 11,501,454 | B2 | 11/2022 | Mirza et al. |
| 11,928,823 | B2 | 3/2024 | Calvarese et al. |
| 11,933,661 | B2 | 3/2024 | Yadai et al. |
| 2002/0070862 | A1 | 6/2002 | Francis et al. |
| 2002/0093426 | A1 | 7/2002 | Jackson et al. |
| 2003/0001726 | A1 | 1/2003 | Moore |
| 2003/0002712 | A1 | 1/2003 | Steenburgh et al. |
| 2004/0181467 | A1 | 9/2004 | Raiyani et al. |
| 2005/0093690 | A1 | 5/2005 | Miglionico |
| 2005/0171854 | A1 | 8/2005 | Lyon |
| 2006/0071774 | A1 | 4/2006 | Brown et al. |
| 2007/0050271 | A1 | 3/2007 | Ufford et al. |
| 2007/0069867 | A1 | 3/2007 | Fleisch et al. |
| 2007/0090927 | A1 | 4/2007 | Potyrailo et al. |
| 2007/0182555 | A1 | 8/2007 | Walker et al. |
| 2008/0055087 | A1 | 3/2008 | Horii et al. |
| 2008/0074268 | A1 | 3/2008 | Shafer |
| 2008/0077511 | A1 | 3/2008 | Zimmerman |
| 2008/0109114 | A1 | 5/2008 | Orita et al. |
| 2008/0198015 | A1 | 8/2008 | Lawrence et al. |
| 2008/0284604 | A1 | 11/2008 | Rubinstein |
| 2009/0027202 | A1 | 1/2009 | Copeland et al. |
| 2009/0058644 | A1 | 3/2009 | French et al. |
| 2009/0072949 | A1 | 3/2009 | Fukuda et al. |
| 2009/0107207 | A1 | 4/2009 | Yamazaki et al. |
| 2009/0121017 | A1 | 5/2009 | Cato et al. |
| 2009/0153328 | A1 | 6/2009 | Otani et al. |
| 2009/0207023 | A1 | 8/2009 | Kushida et al. |
| 2009/0245573 | A1 | 10/2009 | Saptharishi et al. |
| 2010/0007464 | A1 | 1/2010 | McTigue |
| 2010/0019906 | A1 | 1/2010 | Kushida et al. |
| 2010/0176922 | A1 | 7/2010 | Schwab et al. |
| 2011/0011936 | A1 | 1/2011 | Morandi et al. |
| 2011/0221577 | A1 | 9/2011 | Kuwako et al. |
| 2011/0241831 | A1 | 10/2011 | Makiranta et al. |
| 2012/0126982 | A1 | 5/2012 | Lee et al. |
| 2012/0133488 | A1 | 5/2012 | Choi et al. |
| 2012/0284132 | A1 | 11/2012 | Kim et al. |
| 2012/0310757 | A1 | 12/2012 | Kim et al. |
| 2013/0048724 | A1 | 2/2013 | Burnside et al. |
| 2013/0076898 | A1 | 3/2013 | Philippe et al. |
| 2013/0253700 | A1 | 9/2013 | Carson et al. |
| 2014/0111333 | A1 | 4/2014 | Haas |
| 2014/0201042 | A1 | 7/2014 | Meyer |
| 2014/0224875 | A1 | 8/2014 | Slesinger et al. |
| 2014/0279294 | A1 | 9/2014 | Field-Darragh et al. |
| 2014/0316561 | A1 | 10/2014 | Tkachenko et al. |
| 2014/0362223 | A1 | 12/2014 | LaCroix et al. |
| 2015/0019391 | A1 | 1/2015 | Kumar et al. |
| 2015/0073907 | A1 | 3/2015 | Purves et al. |
| 2015/0083744 | A1 | 3/2015 | Vogler et al. |
| 2015/0269516 | A1 | 9/2015 | Fukuda |
| 2016/0048798 | A1* | 2/2016 | Meyer .................... G01G 19/42 |
| | | | 705/28 |
| 2016/0153826 | A1 | 6/2016 | Oneid |
| 2016/0187189 | A1 | 6/2016 | Camp |
| 2016/0253534 | A1 | 9/2016 | Hattori et al. |
| 2016/0328767 | A1 | 11/2016 | Bonner et al. |
| 2016/0328813 | A1 | 11/2016 | Montgomery et al. |
| 2016/0342969 | A1 | 11/2016 | Perez Jacome |
| 2017/0147969 | A1 | 5/2017 | Narsingh et al. |
| 2017/0172315 | A1 | 6/2017 | Hay |
| 2017/0220987 | A1 | 8/2017 | Sun et al. |
| 2017/0228686 | A1 | 8/2017 | Rodriguez et al. |
| 2017/0323162 | A1 | 11/2017 | Jones et al. |
| 2017/0344937 | A1 | 11/2017 | Atchley et al. |
| 2018/0010953 | A1 | 1/2018 | Jones et al. |
| 2018/0082246 | A1 | 3/2018 | Jones et al. |
| 2018/0137462 | A1 | 5/2018 | Zohar et al. |
| 2018/0158017 | A1 | 6/2018 | Jones et al. |
| 2018/0374328 | A1 | 12/2018 | Man |
| 2019/0019385 | A1 | 1/2019 | Caution et al. |
| 2019/0034727 | A1 | 1/2019 | Chihara et al. |
| 2019/0073576 | A1 | 3/2019 | D'Annunzio |
| 2019/0108474 | A1 | 4/2019 | Tripathi |
| 2019/0204897 | A1 | 7/2019 | Duron et al. |
| 2019/0205821 | A1 | 7/2019 | Werner et al. |
| 2020/0013002 | A1 | 1/2020 | Hayashi et al. |
| 2020/0019921 | A1 | 1/2020 | Buibas et al. |
| 2020/0279462 | A1 | 9/2020 | Gabara |
| 2020/0334835 | A1 | 10/2020 | Buibas et al. |
| 2020/0380701 | A1 | 12/2020 | Buibas et al. |
| 2021/0049772 | A1 | 2/2021 | Buibas et al. |
| 2021/0067744 | A1 | 3/2021 | Buibas et al. |
| 2021/0148751 | A1 | 5/2021 | Yadai et al. |
| 2021/0158430 | A1 | 5/2021 | Buibas et al. |
| 2021/0248889 | A1 | 8/2021 | Okamura |
| 2021/0262852 | A1 | 8/2021 | Xiang et al. |
| 2021/0342770 | A1 | 11/2021 | Li et al. |
| 2022/0003592 | A1 | 1/2022 | Kobayashi et al. |
| 2022/0020253 | A1 | 1/2022 | Mei et al. |
| 2022/0067642 | A1 | 3/2022 | Barton et al. |
| 2022/0067689 | A1 | 3/2022 | Guack et al. |
| 2022/0101296 | A1 | 3/2022 | Nakamura et al. |
| 2022/0230216 | A1 | 7/2022 | Buibas et al. |
| 2023/0168119 | A1 | 6/2023 | Winkler et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner $\Sigma(F_i)_1 = 8.08$ lb $\Sigma(F_i)_1 = 8.08$ lb $\Sigma(F_i)_2 = 7.51\text{lb}$

CHARGE CUSTOMER
FOR SANDWICH $(8.08-7.51)\text{lb} \cdot \$7.97/\text{lb} = \$4.55$ SANDWICHES $7.99/lb MASS: 37.80 lbs
TRANSACTION:
0.31 lb APPLE
$0.62

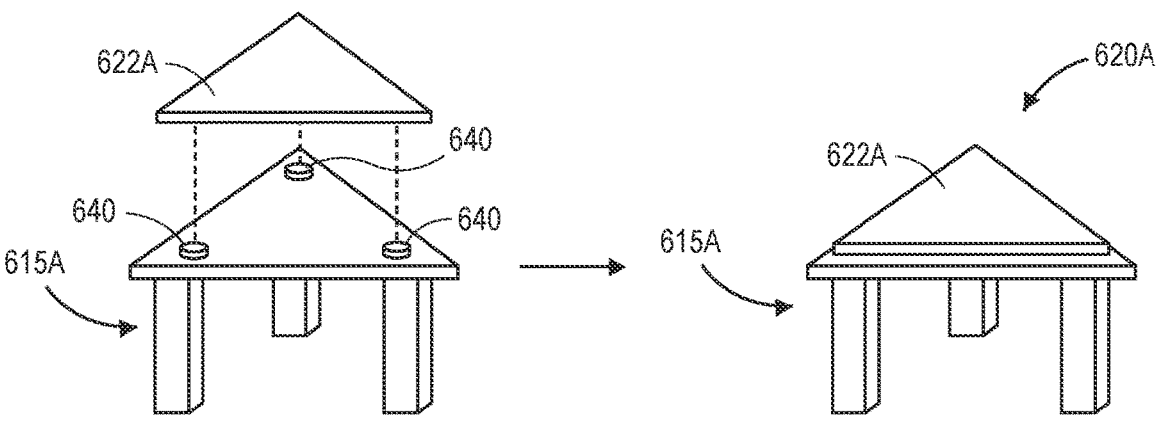
FIG. 6A
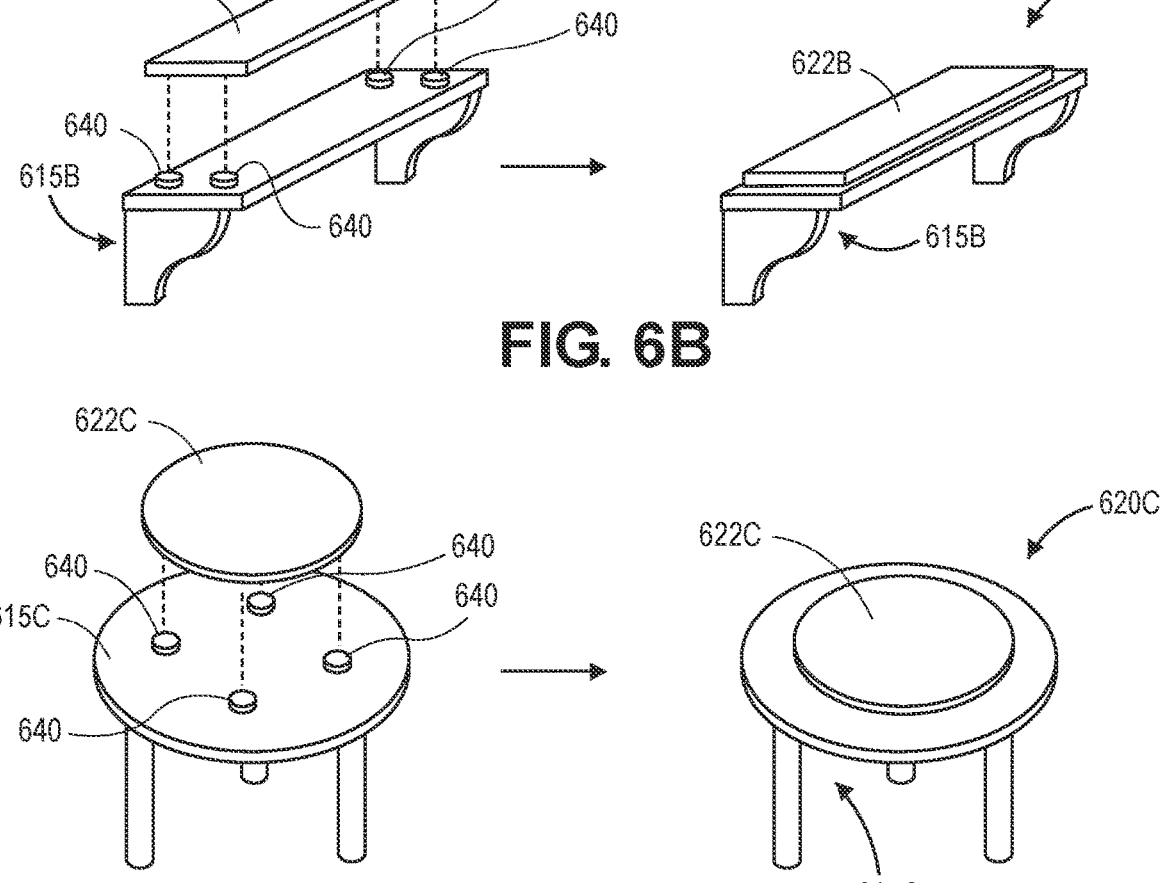
FIG. 6B
FIG. 6C

FREE
BODY
DIAGRAM $$\vec{F}_P = \vec{W} \cdot \cos \theta$$

VOLTAGE SUBSTANTIALLY EQUAL $V_A = V_B = V_C = V_D$

MODULAR STORAGE SYSTEMS

CROSS-REFERENCE TO RELATED APPLICATIONS

This application is a continuation of U.S. patent application Ser. No. 16/453,677, filed Jun. 26, 2019, the contents of which are incorporated by reference herein in their entirety.

BACKGROUND

Materials handling facilities such as warehouses or retail stores often store or display items on shelves. For example, a materials handling facility may include structural features such as walls, gondola racks or fixtures to which one or more shelves may be mounted or from which such shelves may be suspended, and available items may be disposed upon such shelves. Available items may remain on shelves on a temporary basis, until one or more of the items thereon is desired (e.g., in response to an order or a request from one or more users of the materials handling facility).

Storing items on shelves or like elements provides a number of advantages to users of a materials handling facility. For example, an item having one or more flat surfaces may be stored individually or collectively (e.g., along with other like or identical items), by placing one or more of the flat surfaces of such items on a corresponding flat surface of a shelf or like element. Furthermore, items may be stored in random locations on a shelf, or in predetermined areas or spaces of the shelf that are set aside for items of a specific type, group or category.

Increases in processing power and network connectivity, and reductions in component size, have enabled computer-based systems to be utilized in connection with nearly every aspect of our daily lives. In bricks-and-mortar commerce, computer-based systems having one or more sensors, such as imaging devices (e.g., digital cameras), have been integrated into traditional retail establishments in order to aid in theft prevention or inventory tracking.

Computer-based systems, however, traditionally require hard-wired connections to power sources and communications systems or networks. In newly constructed retail establishments, storage units may be installed with embedded or native ports or connectors to which a computer-based system may be readily connected. In an existing retail establishment, however, where such storage units have already been constructed, providing electrical or communications connections to a computer-based system requires running cables along one or more rigid or substantially fixed shelves of a storage unit, attaching such cables to the storage unit by unsightly means such as adhesive tape, or other unfavorable measures to refit the storage unit for use with the computer-based system. Moreover, many computer-based systems for monitoring inventory levels on shelves, or tracking transactions involving the placement of items on such shelves or the removal of items from such shelves, are computationally expensive in that such systems operate substantially continuously and consume significant amounts of power. For such reasons, most computer-based systems have hard-wired connections rather than batteries or other power sources, which would require frequent replacement.

BRIEF DESCRIPTION OF THE DRAWINGS

FIGS. 6A through 6C are views of one storage system in accordance with implementations of the present disclosure.

DETAILED DESCRIPTION

Figure 1A:
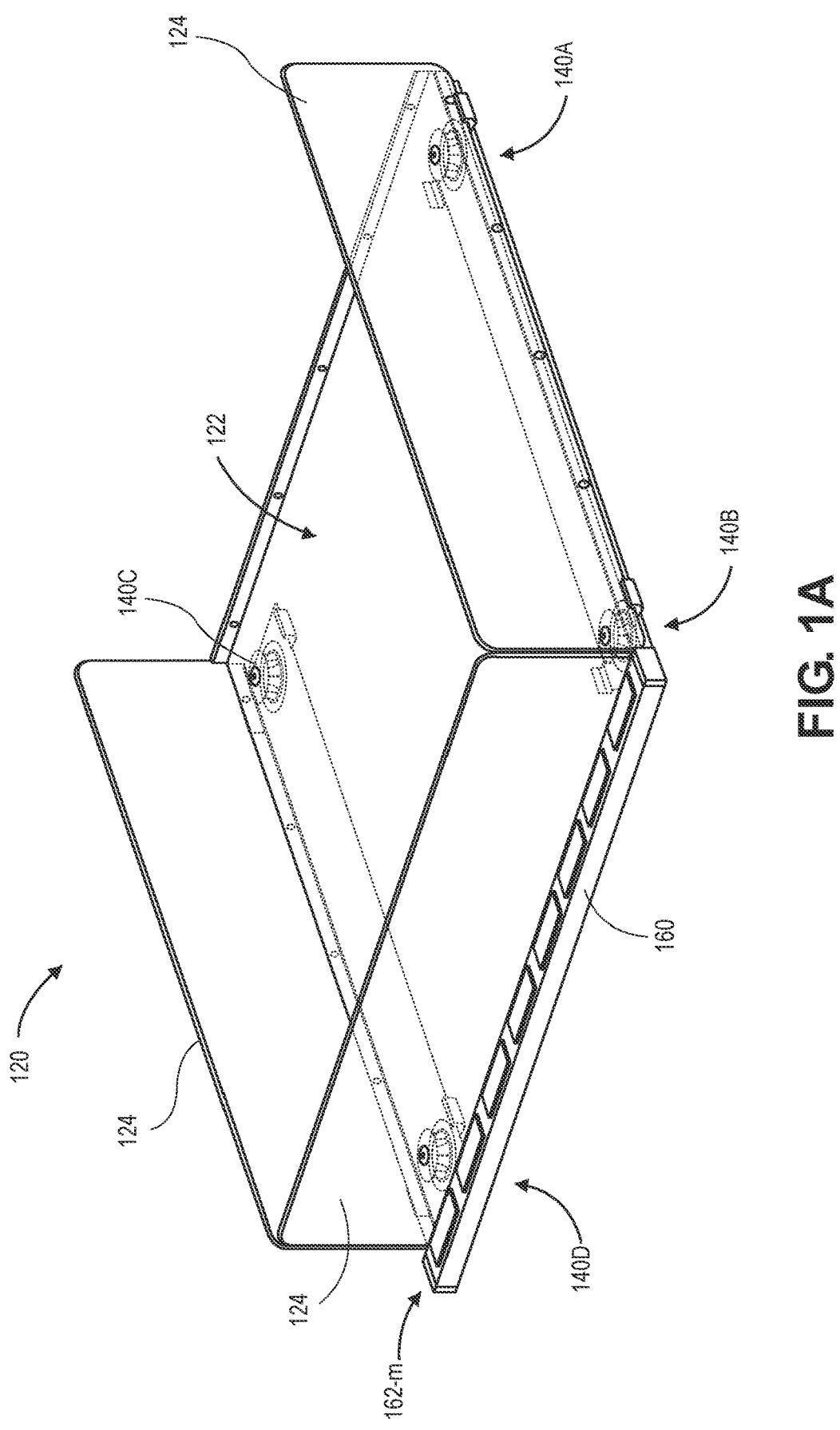
FIGS. 1A through 1G are views of components of one storage system in accordance with implementations of the present disclosure.

As is set forth in greater detail below, the present disclosure is directed to systems and methods for receiving, storing, distributing or tracking items. More specifically, the systems and methods of the present disclosure are directed to systems that may be provided in association with shelves, tables, platforms or other substantially planar surfaces for accommodating items, e.g., in inventory areas of a materials handling facility, or methods for tracking the placement of items thereon or the removal of items therefrom. The systems may include load sensors for determining changes or variations in loading on such surfaces, and for determining a number of items, or a type of the items, that are placed on or removed from the surfaces due to such changes or variations in loading. The load sensors may be provided as components of an integrated system that includes surfaces for accommodating items. Alternatively, the load sensors may be provided as additional components that may complement an existing storage system having one or more surfaces for accommodating items, e.g., by retrofitting the existing storage system with the one or more load sensors, thereby enabling implementations of the present disclosure to be incorporated into traditional storage systems quickly, inexpensively and effectively. The load sensors may include one or more load cells, circuits, or other components, and may be configured for communication by wired or wireless technologies or protocols.

In some implementations, the load sensors may be configured to generate and transmit signals corresponding to loads sensed thereby at designated intervals, e.g., in one or more pulses rather than continuously, in order to reduce power or energy consumed thereby. Additionally, in some implementations, the load sensors are self-powered, e.g., with one or more batteries or power sources provided therein. In some other implementations, however, the load sensors may include one or more photovoltaic cells for generating electrical energy from natural or artificial light.

Moreover, in some implementations, pulse intervals and/ or pulse durations may be selected based on an extent of power or energy that is available to the load sensors, or a level of activity associated with the load sensors, such as an amount, a number or a frequency of interactions with one or more surfaces with which the load sensors are associated. For example, where actors are interacting with storage system surfaces infrequently, load sensors may be config- ured for operation in a first mode, in which the load sensors are configured for pulse-sampling at short durations or at long intervals, in an effort to conserve power or energy by limiting pulse-sampling and processing of pulses. Where actors are interacting with the storage system surfaces more frequently, however, the load sensors may transition to a second mode, in which the load sensors are configured for pulse-sampling for longer durations or at short intervals, in an effort to enhance the accuracy or precision by which transactions may be identified based on differences in load- ing conditions. After a level of activity associated with the load sensors has slowed, e.g., for a predetermined period of time, however, the load sensors may transition back to the first mode, and may be configured for pulse-sampling at the short durations or at the long intervals.

Furthermore, where a storage system includes a plurality of photovoltaic cells associated with specific locations or regions of a surface for accommodating items, levels of power or voltages generated by each of the photovoltaic cells may be determined and monitored in order to identify a location or region of the surface where an interaction with the storage system has occurred. For example, where an actor (e.g., a user, a customer, an associate or any other person) reaches over or into a storage system, thereby causing one or more of the photovoltaic cells to be obscured by a shadow or other region of diminished light, levels of voltage generated by the one or more photovoltaic cells will be reduced. A temporary reduction in voltage observed at the one or more photovoltaic cells may, therefore, be associated with an interaction occurring at a location or region asso- ciated with the one or more photovoltaic cells.

Referring to FIGS. 1A through 1G, views of components of one storage system in accordance with implementations of the present disclosure are shown. As is shown in FIG. 1A, a storage system 120 includes a product platform 122, a plurality of load sensors 140A, 140B, 140C, 140D, and a power source 160. The platform 122 may be utilized to support any number of items of any type thereon, including but not limited to food products (e.g., prepared foods, baked goods, produce or the like), office products, consumer elec- tronics, home and garden products, hardware or tools, or any other items. Moreover, the platform 122 may further include one or more locations or regions that are designated or set aside for accommodating or storing one or more items of a discrete type. For example, such locations or regions may extend in parallel along a length of the platform 122. In some implementations, the locations or regions may be demar- cated with one or more lines, markings or other designa- tions. In some other implementations, however, the locations or regions need not be demarcated or designated in any way.

The storage system 120 may further include one or more walls 124 provided in association with one or more edges of the platform 122, e.g., substantially normal to the platform 122, or at any other angle with respect to the platform 122. The walls 124 may be coupled to the edges of the platform 122 in any manner, e.g., by one or more brackets or other bolted, clipped, fastened, riveted or threaded connections. The walls 124 may provide a physical barrier for supporting or encasing any number of items of any type that are placed on the platform 122. Where a plurality of storage systems, such as the storage system 120, are provided in close proximity to one another, the walls 124 may act as barriers or dividers that separate items disposed on platforms 122 of the respective storage systems 120 from one another. Although the storage system 120 of FIG. 1A includes three walls 124, including walls 124 provided on opposing sides and a front of the storage system 120, the storage system 120 may include any number of walls 124, or, alternatively, may be provided without any walls 124.

The storage system 120 may be utilized in any commer- cial space or facility that may be subject to any varying environmental conditions, such as periods of high or low levels of sunlight, high or low temperatures, high or low humidity levels, high or low barometric pressures, or the like. For example, the storage system 120 may be utilized in spaces that are refrigerated (e.g., within coolers, refrigera- tors or freezers), heated (e.g., within ovens or warming stations), or maintained at room temperature (or ambient temperatures), as well as spaces where moisture levels are selectively maintained, e.g., by misting or through the use of one or more humidifiers or dehumidifiers. In some imple- mentations, the platform 122 and/or the walls 124 may be formed from any suitable materials including but not limited to steel, plastics, acrylics or other sufficiently durable mate- rials, and may, in some implementations, be treated with one or more substances (e.g., paints, powders, or the like). In some implementations, the platform 122 and/or the walls 124 may be partially or substantially translucent in order to enable one or more actors (e.g., users, customers, associates or other persons) to visually evaluate any items disposed on the platform 122 from different angles or lines of sight.

The load sensors 140A, 140B, 140C, 140D are any devices or systems for determining dead and/or live loading on the platform 122. For example, in some implementations, the load sensors 140A, 140B, 140C, 140D may include one or more capacitive sensors, force-sensing resistors, strain gages, load cells, piezoelectric sensors, inductive weight sensors, or any other type or form of device or system for generating electrical load signals in response to loading on the platform 122 or unloading from the platform 122. Such signals may be used to determine a mass or weight of objects placed on or removed from the platform 122, and, based on such masses or weights, identify one or more of such objects. Moreover, where locations of the load sensors 140A, 140B, 140C, 140D with respect to the platform 122 are known, the electrical load signals may be further used to determine locations where items are placed on the platform 122 or removed therefrom. For example, a mass or weight of an item may be determined as a sum of forces sensed by the load sensors 140A, 140B, 140C, 140D, less an accounting for a mass or weight of the platform 122, or any other items placed thereon (not shown). A location of an item on the platform 122 may be determined based on sums of forces sensed by pairs of the load sensors 140A, 140B, 140C, 140D, as well as distances between the pairs of the load sensors 140A, 140B, 140C, 140D, according to standard equilibrium principles.

The power source 160 may be a component having one or more sources of electrical energy provided therein for powering the load sensors 140A, 140B, 140C, 140D. As is shown in FIG. 1A, the power source 160 includes a plurality of m photovoltaic cells 162-$m$ on an upper surface. The photovoltaic cells 162-$m$ are aligned to harvest electrical energy from natural or artificial light sources within a vicinity of the storage system 120. In some implementations, the photovoltaic cells 162-$m$ may have any size or shape, such as rectangles having surface areas of five to ten millimeters (5-10 mm) by twenty to thirty millimeters (20-30 mm), or any other size or shape.

The power source 160 may further include any number of onboard power sources (not shown), such as batteries, for providing additional electrical energy during temporary or extended periods of elevated, current-intensive demand or diminished light, or when software or firmware upgrades are required. The power source 160 may also include one or more circuits or converters (e.g., boost and/or buck converters) having any number of inductors, capacitors, resistors and/or amplifiers for converting electrical energy generated by the photovoltaic cells 162-$m$ for use in powering the load sensors 140A, 140B, 140C, 140D or in charging the one or more other onboard power sources.

Figure 1B:
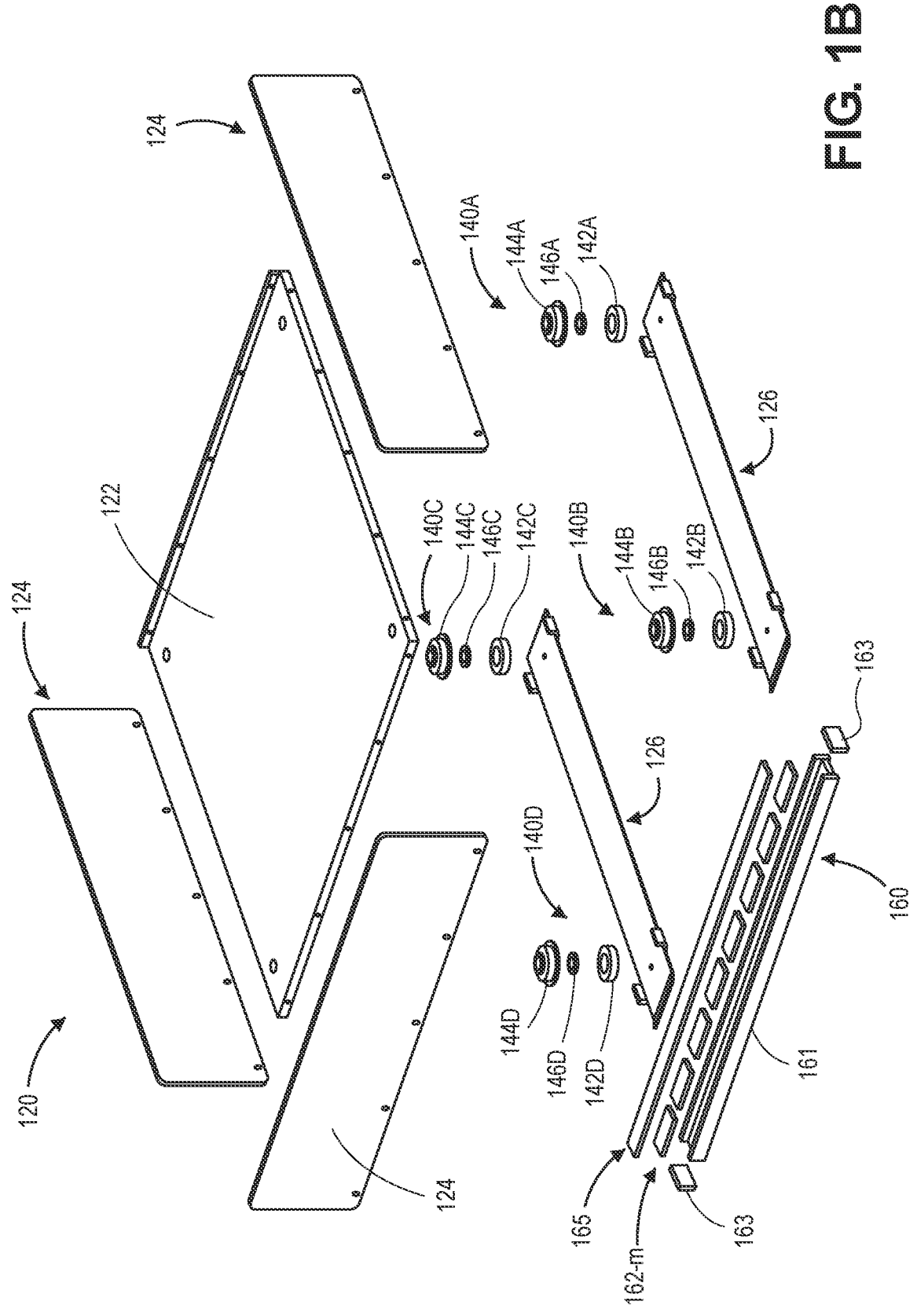

FIG. 1B is an exploded view of components of the storage system 120. As is shown in FIG. 1B, each of the load sensors 140A, 140B, 140C, 140D includes a power source 142A, 142B, 142C, 142D, a load cell 144A, 144B, 144C, 144D, and a circuit board 146A, 146B, 146C, 146D provided within a common housing. The power sources 142A, 142B, 142C, 142D may be any sufficiently small batteries (e.g., coin cell batteries) that may be coupled to or charged by power received from the power source 160, e.g., by one or more wired connections. The load cells 144A, 144B, 144C, 144D may be any systems for sensing vertical loading on the platform 122 at discrete points, and may include one or more capacitive sensors, force-sensing resistors, strain gages, load cells, piezoelectric sensors, inductive weight sensors, or any other type or form of device or system for sensing a load thereon. The circuit boards 146A, 146B, 146C, 146D may be printed-circuit boards or any other circuits or components having communication devices, such as transmitters and/or receivers (e.g., transceivers) thereon. For example, in some implementations, each of the load sensors 140A, 140B, 140C, 140D may be configured to communicate continuously with one or more external computer devices (not shown), e.g., by wired or wireless technologies or protocols, and to transmit load signals corresponding to loading conditions on a respective one of the load sensors 140A, 140B, 140C, 140D. Alternatively, one or more of the load sensors 140A, 140B, 140C, 140D may receive communications from each of the other load sensors 140A, 140B, 140C,

140D, and may transmit load signals corresponding to loading conditions on all of the load sensors 140A, 140B, 140C, 140D collectively.

As is further shown in FIG. 1B, the power source 160 includes a frame 161, and end caps 163 at either end of the frame, and a protective cover 165 over the photovoltaic cells 162-$m$. The frame 161, the end caps 163 and/or the cover 165 may be formed from any suitable materials. For example, in some implementations, the frame 161 may be formed from an extruded plastic, while the end caps 163 may be injection-molded plastic components that may be provided at ends of the frame 161. Additionally, in some implementations, the cover 165 may be formed from substantially transparent polycarbonates or other materials.

As is also shown in FIG. 1B, the storage system 120 further includes a pair of tracks or bands 126 for providing a physical channel and/or connection between the load sensors 140A, 140B, 140C, 140D and the power source 160. For example, one of the tracks 126 is provided underneath the platform 122 and encases the load sensor 140A and the load sensor 140B, providing a channel for wired connections to extend between the load sensor 140A and the load sensor 140B, or between the load sensor 140A or the load sensor 140B and the power source 160. Similarly, another of the tracks 126 is provided underneath the platform 122 and encases the load sensor 140C and the load sensor 140D, providing a channel for wired connections to extend between the load sensor 140C and the load sensor 140D, or between the load sensor 140C or the load sensor 140D and the power source 160. The tracks 126 may be formed from any suitable material, and may serve to reduce electrostatic or electromagnetic interference generated by one or more load sensors from affecting any other load sensors, including but not limited to load sensors of the storage system 120, or one or more adjacent storage systems (not shown).

Figure 1C:
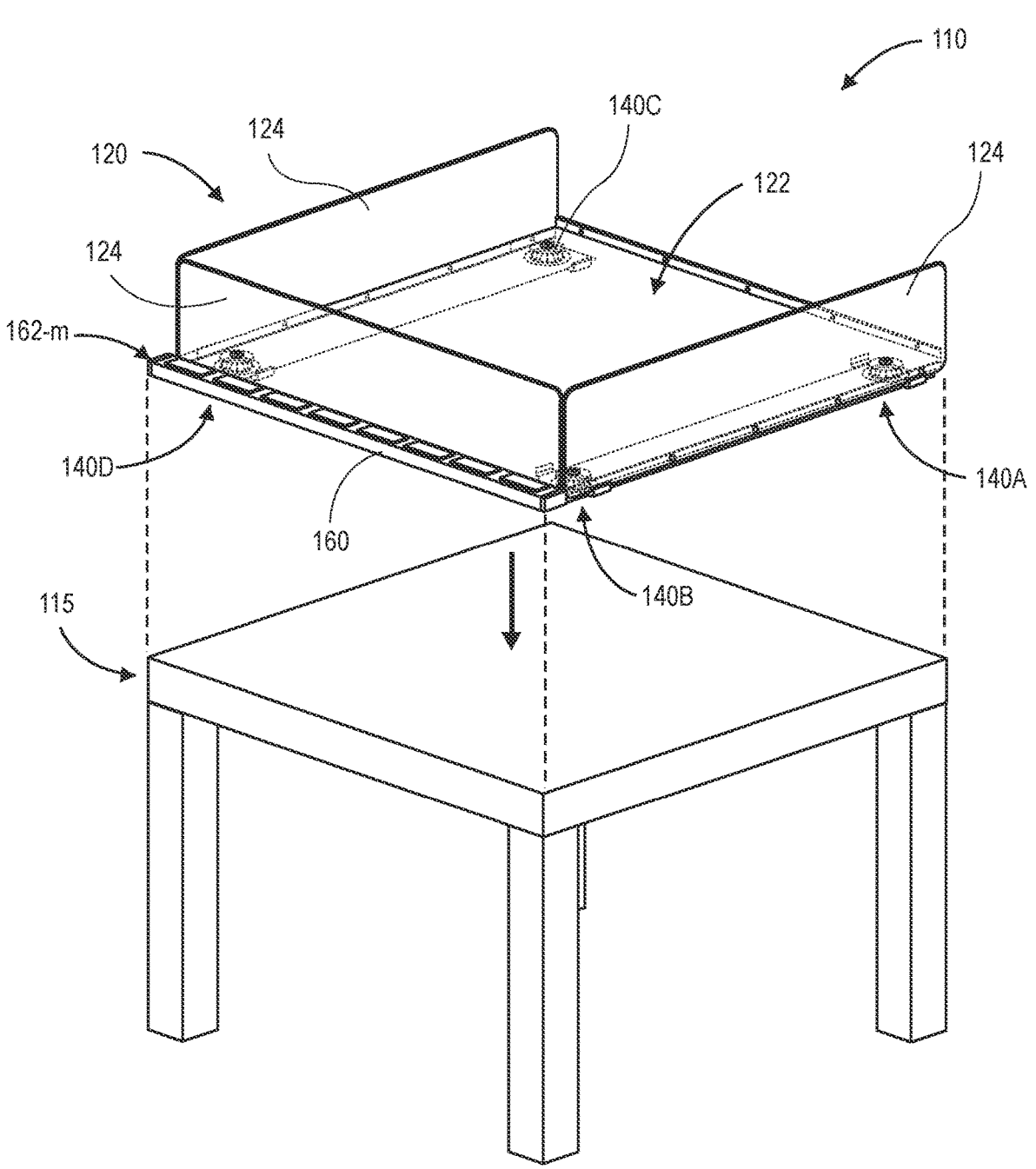
Figure 1D:
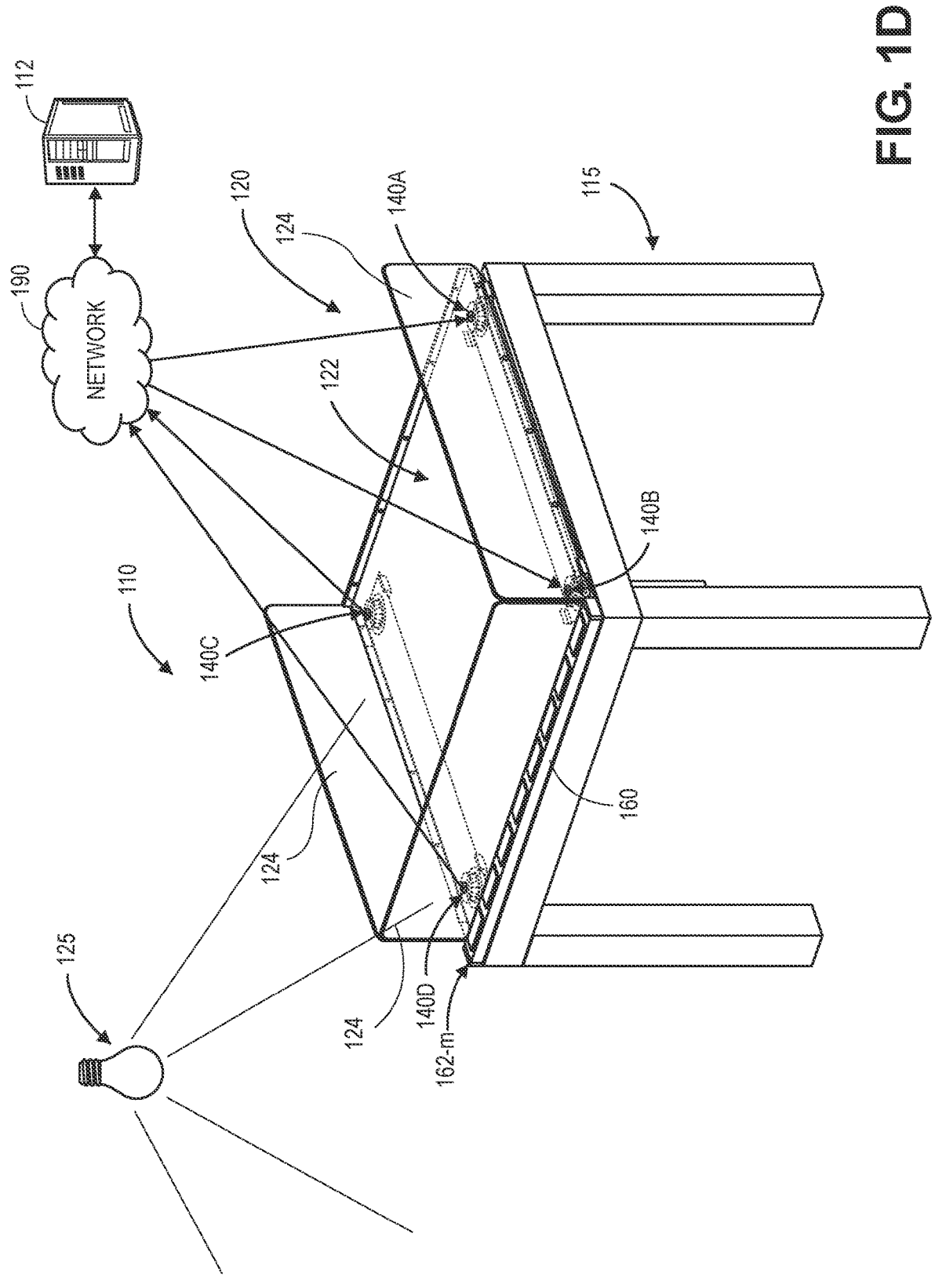

As is shown in FIG. 1C, the storage system 120 may be placed on a table 115 or other surface or facility, e.g., within a materials handling facility 110. The table 115 may have the same shape and/or size as an underside of the storage system 120, or a different shape or size than the storage system 120. As is shown in FIG. 1D, with the storage system 120 installed on the table 115, the power source 160 may be energized by light from a light source 125 (e.g., one or more light bulbs, light-emitting diodes, or other light sources), and the load sensors 140A, 140B, 140C, 140D may engage in pulsed communications with a server 112 or other computer system over a network 190. For example, each of the load sensors 140A, 140B, 140C, 140D may be configured to transmit an electrical load signal consistent with an extent of loading sensed thereby at a selected time interval, e.g., approximately ten milliseconds, or any other interval, and for a selected duration. The load sensors 140A, 140B, 140C, 140D may be configured to communicate with the server 112, with any other external computer devices (not shown), or with one another, according to any wired or wireless means, e.g., wired technologies such as Universal Serial Bus (or "USB") or fiber optic cable, or standard wireless protocols such as Bluetooth® or any Wireless Fidelity (or "Wi-Fi") protocol.

Figure 1E:
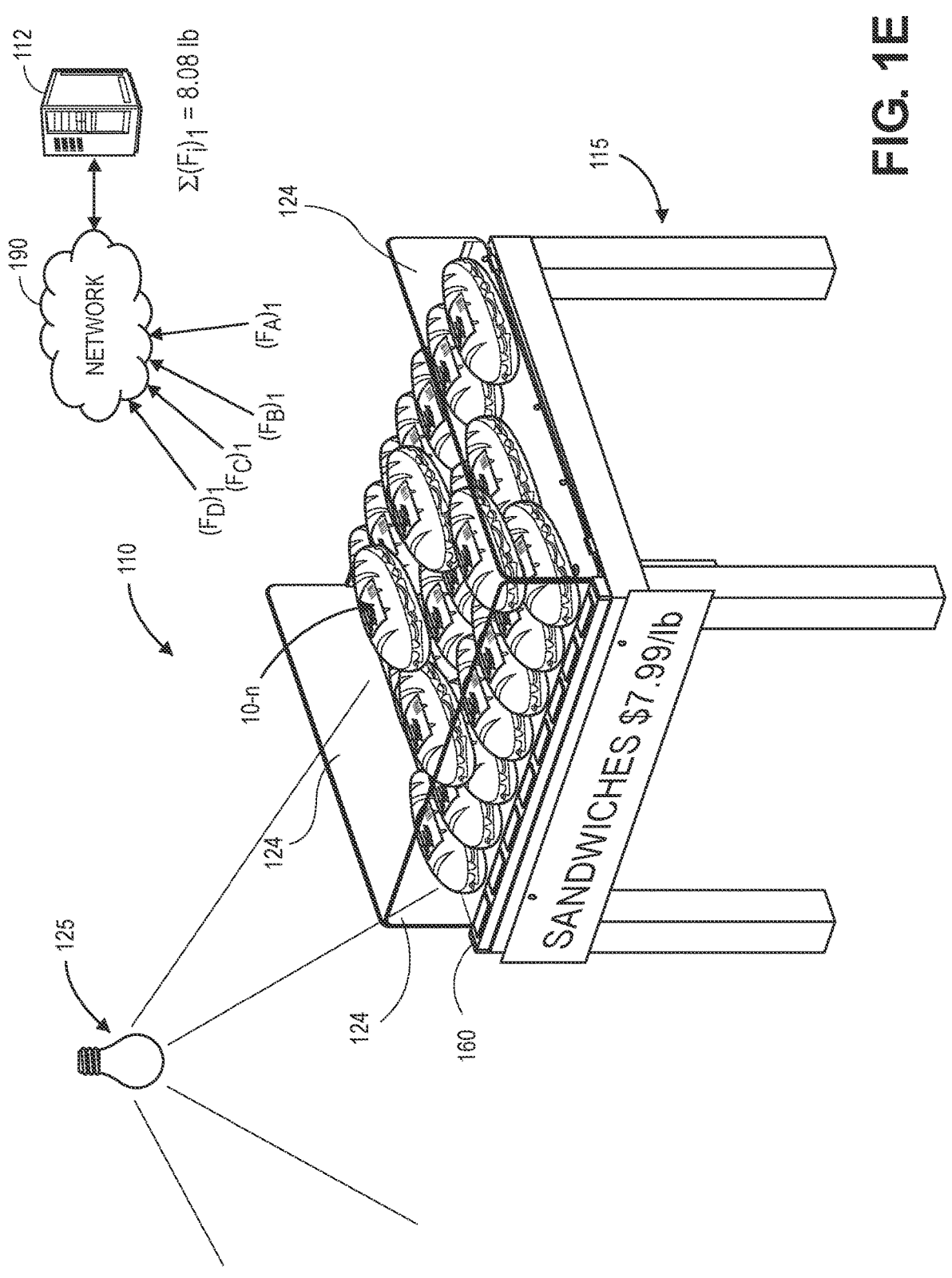

As is shown in FIG. 1E, when a plurality of items 10-$n$ are placed on the platform 122, the load sensors 140A, 140B, 140C, 140D may each transmit load signals indicative of forces $(F_A)_1$, $(F_B)_1$, $(F_C)_1$, $(F_D)_1$ sensed thereby due to the collective weight of the items 10-$n$, or a total of 8.08 pounds. As is discussed above, in some implementations, the load signals may be transmitted at selected pulse intervals and pulse durations, rather than continuously, in order to conserve power consumed by the load sensors 140A, 140B, 140C, 140D, and to enable the load sensors 140A, 140B, 140C, 140D to be powered by the photovoltaic cells 162-*m*. Where the loading on the platform 122 is unchanged, the forces $(F_A)_1$, $(F_B)_1$, $(F_C)_1$, $(F_D)_1$, sensed by the load sensors 140A, 140B, 140C, 140D are substantially constant, and the load signals transmitted by the load sensors 140A, 140B, 140C, 140D at the pulsed intervals are substantially identical. The pulse signals and pulse durations may be selected on any basis, including but not limited to an extent of power or energy that is available to the load sensors 140A, 140B, 140C, 140D, a level of activity (e.g., a number or a frequency of interactions) of interactions with the platform 122, or any other factors, including but not limited to a desired level of accuracy or precision in detecting such interactions.

Figure 1F:
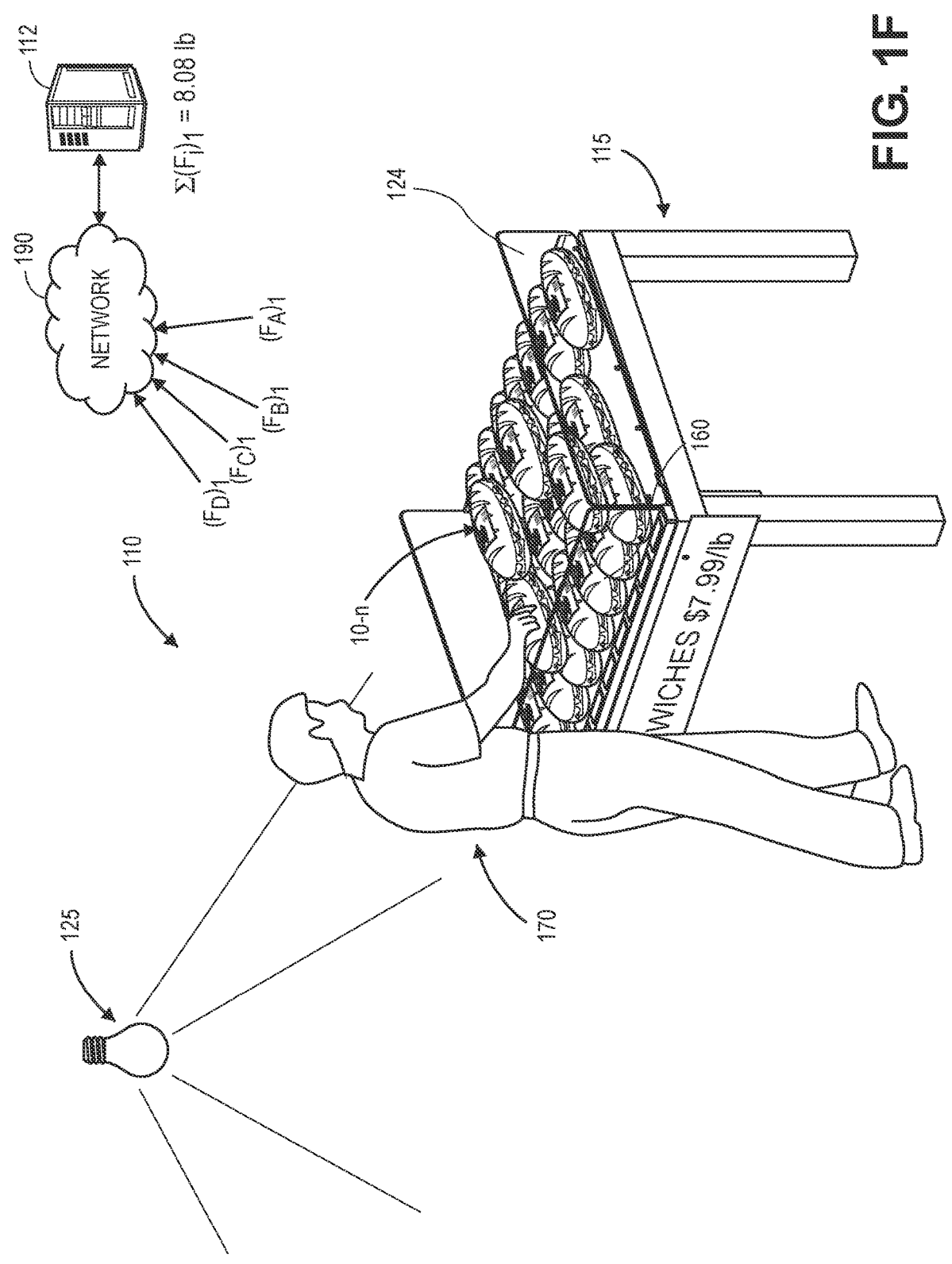
Figure 1G:
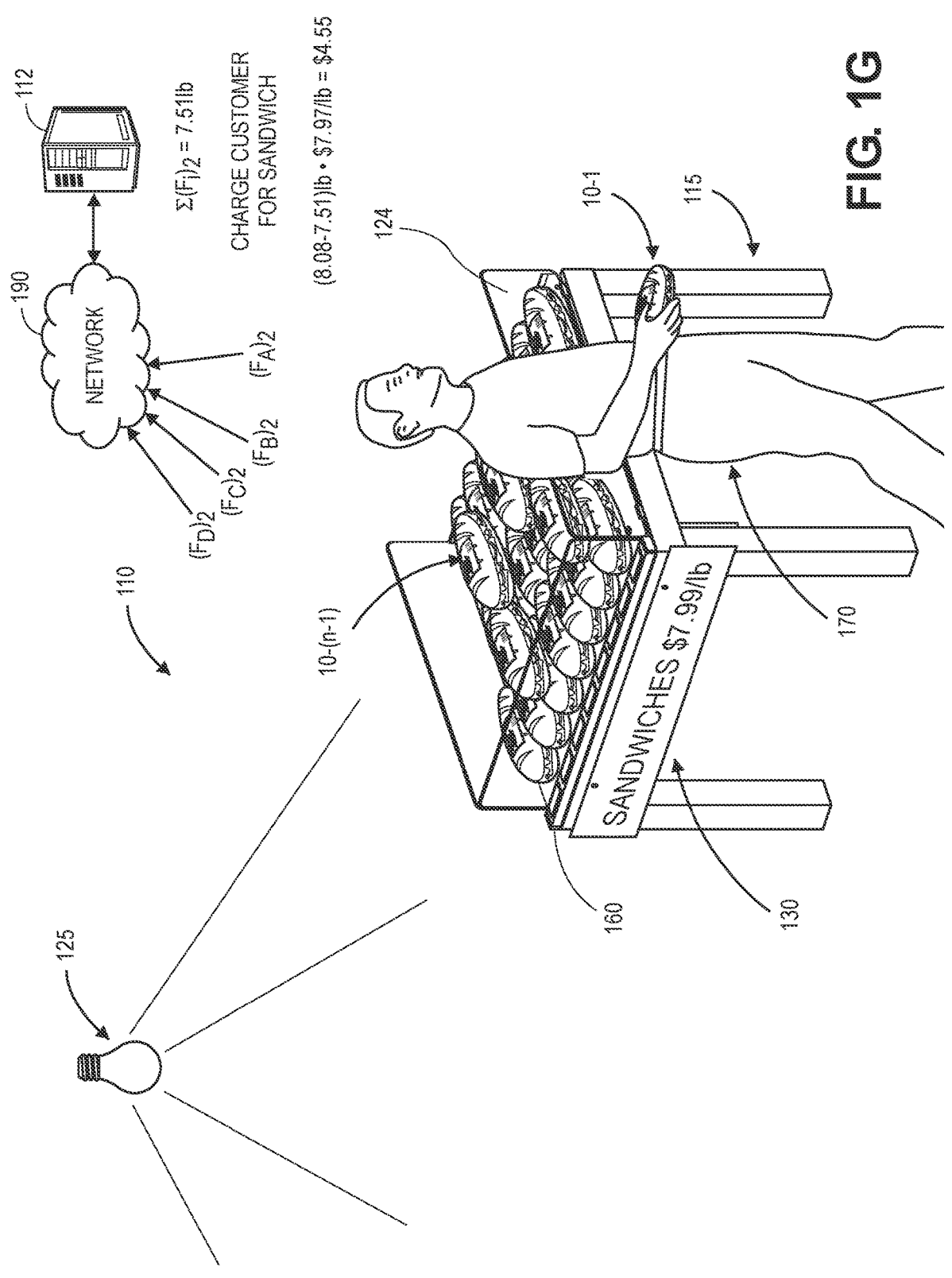

As is shown in FIG. 1F, with the items 10-*n* loaded on the platform, a customer 170 approaches the storage system 120 to retrieve one or more of the items 10-*n*. As is shown in FIG. 1G, upon departing with one of the items 10-1, the load sensors 140A, 140B, 140C, 140D may each transmit load signals indicative of forces $(F_A)_2$, $(F_B)_2$, $(F_C)_2$, $(F_D)_2$, sensed thereby due to the collective weight of the items 10-($n$–1), viz., after the one of the items 10-1 has been removed therefrom, or a total of 7.51 pounds. The load signals indicative of the forces $(F_A)_1$, $(F_B)_1$, $(F_C)_1$, $(F_D)_1$ and the load signals indicative of the forces $(F_A)_2$, $(F_B)_2$, $(F_C)_2$, $(F_D)_2$ may be processed to determine a change or variation in weight by the removal of the item 10-1 from the platform 122, or 0.57 pounds. The customer 170 may be charged for a cost of the item 10-1, or a product of the change or variation in weight and a unit rate for the items 10-*n*, viz., $7.99 per pound, or a total of $4.55. Alternatively, the change or variation in weight may be used to determine a number of the items 10-*n* removed therefrom, such as where each of the items 10-*n* has a common or standard weight, and wherein the change or variation in weight is a multiple of the common or standard weight. In such instances, a number of the items removed from the platform 122 may be determined based on a quotient of the change or variation in weight and the common or standard weight.

In commercial settings, such as within warehouses, fulfillment centers, retail establishments or other materials handling facilities, shelves and other planar surfaces are widely used for storing items on a short-term or a long-term basis, and are particularly valuable for their simplicity of design and ease of access. Determining the contents of an inventory location such as a shelf or another planar surface, or determining when such contents have changed, are persistent challenges or limitations that impact their utility and value in many situations. Traditionally, inventory levels have been determined and tracked by visual inspection, or through the use of radiofrequency identification (or "RFID") transmitters and receivers provided in association with the items and the shelves, respectively, e.g., by equipping shelves with RFID readers or sensors, or by incorporating RFID tags or emitters into items or their packaging. The use of RFID technology is effective but expensive, however, as each shelf must be provided with an RFID reader or sensor in close proximity, and each item to be stored on the shelf must be equipped with an RFID tag or emitter.

Frequently, items may be identified by their respective weights. Using weight for inventory tracking is a particularly reliable form of inventory control and management, because weight is an immutable characteristic that does not readily change, and because identical or like items typically have identical or like weights. For example, a combination of three discrete items has the same net weight regardless of the order or configuration in which such items are stacked, laid or aligned on a shelf. Moreover, unlike a visual appearance, which may vary based on perspective or be easily confused, weights of items are typically both fixed and unique.

Items that are stored on a shelf, or changes in the number or type of such items, may be identified based on the weight of loads on the shelf, or based on the weights of items that are placed onto or removed from the shelf. In general, tracking items by their weight involves primary events such as removing an item from a shelf, placing the item onto a scale, determining a mass or weight of the item, and utilizing information regarding the mass or weight for one or more other purposes. For example, when purchasing pears that are sold by weight, a number of pears may be weighed on a scale, and a total mass or weight of the pears may be multiplied by a price-per-weight, in order to determine a total cost for the pears. Thus, contemporary methods for tracking items by weight within a materials handling facility may require extensive or repeated interaction with the items by one or more users.

Shelves or other storage facilities that are outfitted with load sensors or other equipment for determining weights or masses are typically large and complex systems that are not readily transported and do not frequently change. For example, a typical shelf that includes load sensors is typically hard-wired with power sources and network connections within a frame of a shelving unit. Once such a shelf or like storage facility is assembled, installed and calibrated, the shelving unit is rarely moved or reconfigured. Therefore, traditional shelves or other storage facilities that are outfitted with network-connected load sensors are typically unable to be moved or easily modified for use with seasonal or temporarily relevant items, e.g., items that are on sale or are otherwise subject to one or more promotions. Moreover, such shelving units may also not be readily used in hot, cold, wet, dry or other adverse environmental conditions.

The systems and methods of the present disclosure are directed to receiving, storing, distributing or tracking items on planar surfaces, such as shelves, tables, platforms or other substantially planar surfaces using modular systems that may be readily assembled or disassembled on short notice, or configured to accommodate items of varying sizes. The storage systems disclosed herein may feature platforms or other storage surfaces that may be aligned substantially horizontally, e.g., flat, or at one or more other non-horizontal angles, and may include walls, dividers or other systems coupled to or aligned with respect to such systems. The storage systems may include load sensors that are configured to generate and transmit electrical load signals indicative of forces sensed thereby. Where a storage system includes a plurality of load cells or other load sensors, a mass of items on a platform or other surface may be determined based on a sum of the masses or weights calculated based on the electrical load signals that are generated and transmitted thereby.

The load sensors of the present disclosure may be provided in self-contained systems having housings including one or more load cells or other load-sensing systems, power sources, circuits or boards (e.g., printed circuit boards) having transmitters and/or receivers for communicating with one another, or with one or more external computer systems. In some implementations, the load sensors may be configured to transmit electrical load signals at pulsed intervals and durations, rather than continuously, in order to conserve power. The intervals or durations may be selected on any basis, such as an extent of available power or energy, a level of activity, or a desired level of accuracy or precision in detecting interactions.

In order to utilize a storage system of the present disclosure, a plurality of load sensors may be provided on a shelf, a table, a platform or another substantially planar surface of an inventory location. A platform may be placed on each of the load sensors, which may be configured to communicate with one another or with an external computer device over one or more networks, e.g., by Bluetooth®, Wi-Fi, or in any other manner. Alternatively, a storage system may be manufactured or assembled as an integral unit including the load sensors, a platform or other loading surface, and a photovoltaic power source (or other power source).

The load sensors may generate electrical load signals indicative of the dead and/or live loading thereon, including masses or weights of the platform and any items accommodated thereon. The load sensors may include one or more capacitive sensors, force-sensing resistors, strain gauges, load cells, inductive weight sensors, or any other type or form of device or system for generating electrical load signals. Moreover, where locations of the load sensors with respect to a platform thereon are known, the electrical load signals may be further used to determine locations where items are placed on the platform or removed therefrom.

Load sensors may be provided in any spatial arrangement, and a platform placed thereon may have any shape or size, in accordance with the present disclosure. Furthermore, in some implementations, a platform need not be required, and a box, a bucket, a kiosk, a pallet, a vat, a vessel or any other container or system may be placed directly on a plurality of load sensors, which may generate and transmit electrical load signals indicative of the loading thereon at pulsed intervals or continuously. Changes or variations in loading, as determined from such signals, may be used to calculate a mass or weight of one or more items that have been placed onto a storage system or removed therefrom, or a location at which the items have been placed thereon or removed therefrom, and a transaction associated with such items may be attributed to a customer accordingly.

The storage systems of the present disclosure may further include one or more photovoltaic power sources, such as a bank of photovoltaic cells provided along one or more edges or faces of the storage systems, e.g., along a front edge or upper side of the storage systems. For example, in some implementations, load sensors may be powered by a bank or array of one or more photovoltaic cells, which may harvest electrical energy from natural light sources (e.g., the Sun or another celestial body) or artificial light sources (e.g., light bulbs, light emitting diodes or any other light sources). The load sensors may be connected to the photovoltaic power source or one another by one or more connectors, which may be used to power the load sensors directly, or to charge one or more batteries or other power sources associated with one or more of the load sensors.

In some implementations, such as where a storage system includes a power source having a plurality of photovoltaic cells, each of the photovoltaic cells may be associated with a discrete location of the storage system where one or more items may be placed thereon. Levels of power or voltage generated by the respective photovoltaic cells may be monitored, and attributes of a transaction involving one or more of the items may be determined based on changes or variations in the levels of power or voltage. For example, where a customer, an associate or another actor extends an arm or another body part over a photovoltaic cell, thereby causing the photovoltaic cell to be obscured by a shadow, a level of power or voltage generated by the photovoltaic cell is diminished, at least temporarily. A location of a transaction, an identity of a customer associated with the transaction, or any other attribute of the transaction may be determined based on a number or size of the photovoltaic cells for which a drop in a level of power or voltage generated thereby is observed, a time at which the drop was observed, or a duration for which the drop was observed, or any other factor.

Any number of implementations of the storage systems disclosed herein may be utilized in tandem with one another, and may be configured to communicate with one or more external computer devices or systems regarding any number of items provided thereon. An addition of an item to a platform or other surface of a storage system, or a removal of an item from the platform or other surface, may be determined based on changes or variations in net forces sensed by the load sensors collectively, or by changes or variations in the net forces sensed by each of the load sensors individually. For example, the load sensors of the present disclosure are configured to determine a total weight, a change or a variation in weight, and a position of a change or a variation in weight on a platform or surface.

Where a platform or other surface having one or more items thereon is supported in equilibrium by load sensors, a total weight of the items is determined by a net total load sensed by the load sensors (e.g., a total load sensed by such sensors, less a weight of the platform). Additionally, because the platform is supported by the load cells in equilibrium, individual loads sensed by such sensors may be used to determine a center of gravity of the loads. Thus, in accordance with the present disclosure, when each item is placed in a given location on a platform, the weight and the center of gravity (which corresponds to the given location) of the item may be determined based on the individual loads sensed by each of the load sensors. In some implementations, the location of an item on a platform may be determined using a pair of load sensors disposed near opposite ends of the platform, and may thus be defined as a common line or line segment having a first distance from one of the load sensors and a second distance from another of the load sensors. In some other implementations, a location of an item may be determined using multiple pairs of load sensors disposed beneath a platform, and may thus be defined as an intersection of two or more of such lines or line segments. Moreover, once a mass or a weight of an item is determined, the mass or weight may be compared to an index, record or look-up table associating items with their respective masses or weights, and used to identify the item that was placed at the location.

The load sensors of the present disclosure may be used to determine a mass or a weight of an item placed on a platform, and a location of the item, where the platform is mounted in association with the load sensors, e.g., atop the load sensors. Those of ordinary skill in the pertinent arts will recognize that an object in static equilibrium satisfies the following conditions. First, a vector sum of all external forces acting on the object must be zero. Second, a sum of torques due to all external forces acting on the object about any axis must also be zero. Accordingly, where one or more items are placed atop a storage system of the present disclosure or removed therefrom, a mass or a weight of an item disposed on the storage system may be identified by determining a sum of the forces sensed by each of the load sensors, and a location of the item on a shelf or another inventory location may be determined based on known distances between pairs of the load sensors. Where two or more pairs of load sensors provide support to a platform, a mass or a weight of an item disposed on the storage system may be identified by determining a sum of the forces sensed by each of the load sensors, and a location of the item may be determined based on known distances between each of any pair of the load sensors.

The load sensors of the present disclosure may incorporate any type or form of systems for sensing loading on a platform or other surface. A load cell may be a transducer that converts a sensed mechanical force into a measurable electrical signal. In some implementations, the load cells may be strain-gage load cells including a plurality of strain gages that are bonded onto a beam or structural member that deforms when weight is applied thereto. Strain gage load cells are commonly recognized for their accurate static and dynamic measurement capacities, and are typically designed with grids of wires or foils bonded to carrier matrices, with electrical resistance of such grids varying linearly with respect to strain applied to the grid. The extent of strain may be measured by determining a change in resistance when a force is applied to a carrier matrix, which is bonded to a surface. The strain gages included in a load cell may be configured to sense both tension and compression in the beam or structural member, and may include multiple strain gages to improve their sensitivity to load and to compensate for temperature variations within a vicinity of the load cell. When a load cell is subjected to loads, the strain of the load cell causes the electrical resistance of the strain gages to vary in proportion to the loads.

The systems and methods of the present disclosure may be incorporated into any number, type or size of storage system having any number, type or size of inventory locations, e.g., platforms or other storage units, that are supported in any manner. For example, the storage systems disclosed herein may be utilized in a gondola-type system, such as atop an existing two-post shelf that is cantilevered from a back plane, or atop a four-post shelf supported from either end, e.g., within a cabinet or like structure. The storage systems disclosed herein may determine weights of items placed onto such shelves, or removed from such shelves, and enable such items to be identified or located based on such weights. In this regard, a traditional shelving system may be converted into a "smart" shelving system using one or more of the systems or methods disclosed herein, while still maintaining a look and feel of the traditional shelving system, and without requiring the installation of scales distributed throughout one or more shelving units. Alternatively, one or more of the storage systems disclosed herein may be manufactured or assembled to include the load sensors, power sources or other components disclosed herein.

Those of ordinary skill in the pertinent art will further recognize that the term "weight" refers to a force applied to a given mass by acceleration due to gravity, or approximately 32 feet per second per second (32 ft/s$^2$), or 9.8 meters per second per second (9.8 m/s$^2$), which is substantially constant all over the planet Earth. Because weight is directly proportional to mass, the terms "weight" and "mass" may be used interchangeably throughout the present disclosure.

Figure 2A:
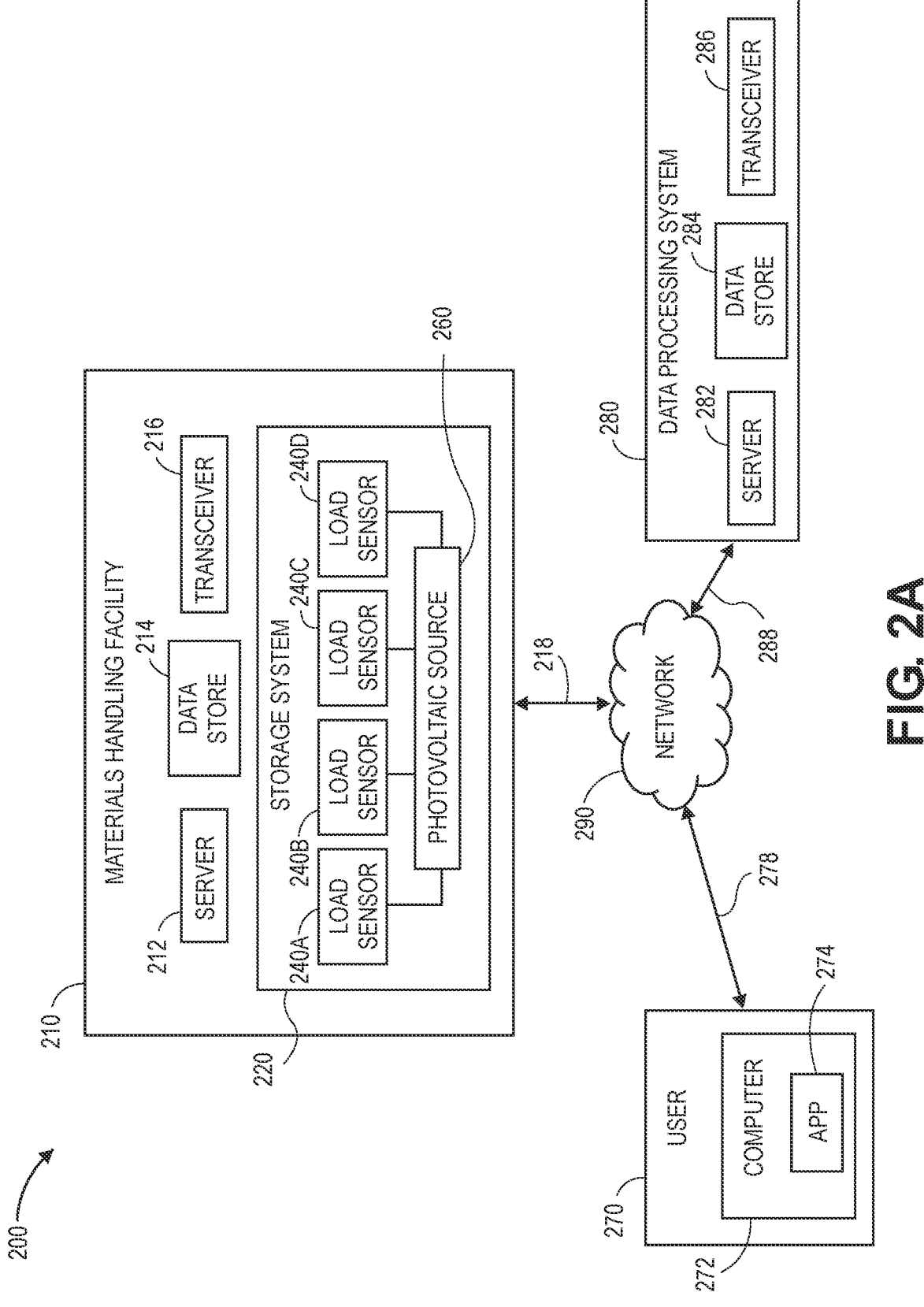
FIGS. 2A and 2B are block diagrams of components of one storage system in accordance with implementations of the present disclosure.
Figure 2B:
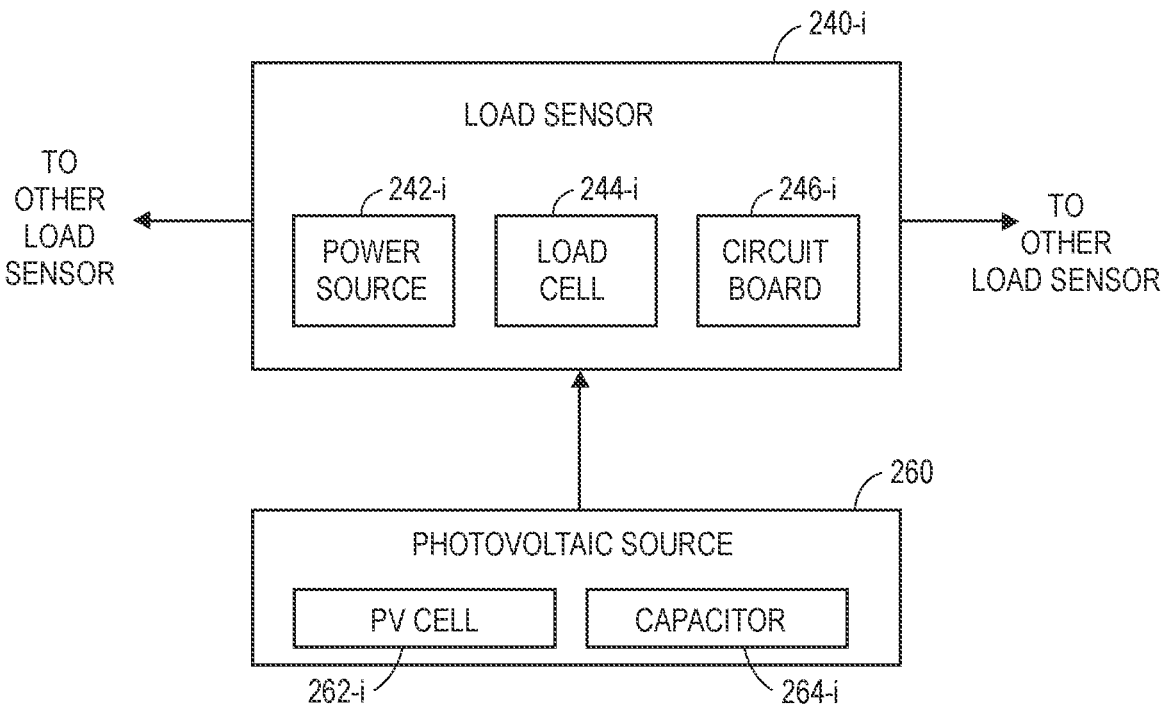

Referring to FIGS. 2A and 2B, block diagrams of components of one storage system in accordance with implementations of the present disclosure is shown. Except where otherwise noted, reference numerals preceded by the number "2" shown in FIGS. 2A and 2B indicate components or features that are similar to components or features having reference numerals preceded by the number "1" shown in FIGS. 1A through 1G.

As is shown in FIG. 2A, a system 200 includes a materials handling facility 210 having a storage system 220, as well as a user 270 and a data processing system 280 that are connected to one another across a network 290, which may include the Internet in whole or in part.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts or volumes that may not be inherently organized into countable units, and may instead be managed in terms of measurable quantities such as units of length, area, volume or weight, or other dimensional properties characterized by units of measurement.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first inventory location (e.g., a first inventory shelf or other storage unit) in an inventory area, moved a distance, and placed at a second inventory location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or transceivers 216, that may be provided in the same physical location as the materials handling facility 210, or in one or more alternate or virtual locations, e.g., in a "cloud"-based environment. In some implementations, the servers 212, the data stores 214 and/or the transceivers 216 or any number of other computing devices or resources may further execute any type of computer-based function or compute any type or form of calculation, including but not limited to any formulas, equations, algorithms or techniques for determining one or more probabilities or performing any number of statistical tests. In some implementations, the servers 212, the data stores 214 and/or the transceivers 216 may be configured to execute one or more machine learning tools, systems or techniques.

The transceiver 216 may be configured to enable the materials handling facility 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the materials handling facility 210, or to one or more other computer devices or systems (e.g., other aerial vehicles, not shown) via the network 290. For example, in some implementations, the transceiver 216 may be configured to coordinate I/O traffic between the server 212 or the data store 214 and the user 270 or the data processing system 280. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or integrated with the server 212.

The storage system 220 includes a plurality of load sensors 240A, 240B, 240C, 240D and a photovoltaic power source 260. The storage system 220 may further include any number of surfaces, such as a platform, for accommodating one or more inventory items thereon, and the load sensors 240A, 240B, 240C, 240D may be provided in association with such surfaces to detect loading thereon and to generate one or more electrical load signals consistent with forces associated with such loading. In some implementations, the storage system 220 may be associated with an inventory location such as a shelf, a table or another system having a surface for accommodating items thereon. In such implementations, the storage system 220 may include a platform placed atop the one or more load sensors 240A, 240B, 240C, 240D, such as is shown in FIGS. 1A through 1G, thereby enabling the storage system 220 to be incorporated quickly, inexpensively and effectively. Alternatively, the storage system 220 may be an integrated system that includes one or more surfaces for accommodating items and the load sensors 240A, 240B, 240C, 240D incorporated therein. Regardless of form, platforms or other surfaces of the storage system 220 may be aligned horizontally, e.g., flat, or at any non-horizontal angle. Additionally, the storage system 220 may further include any structural components associated with such platforms or the load sensors 240A, 240B, 240C, 240D, including but not limited to one or more of the walls 124 or the tracks 126 of the storage system 120 shown in FIGS. 1A through 1G.

The load sensors 240A, 240B, 240C, 240D may be any device that is configured to generate and transfer electrical load signals corresponding to forces sensed from dead and live loads at respective points of the storage system 220, e.g., on one or more surfaces for accommodating items thereon, with such forces including a mass or a weight of a platform or other surface along with weights of one or more items placed thereon. In some implementations, the load sensors 240A, 240B, 240C, 240D may be configured for placement beneath or in association with a platform or another surface for accommodating items thereon that is placed atop an existing storage system, e.g., an inventory location such as a shelf, a table or another surface. In some other implementations, one or more of the load sensors 240A, 240B, 240C, 240D may be integral components of the storage system 220, and mounted therein in association with a platform or other surface for accommodating items thereon.

A representative one of the load sensors 240A, 240B, 240C, 240D is shown as a load sensor 240-i in FIG. 2B. The load sensor 240-i of FIG. 2B includes a power source 242-i, a load cell 244-i and a circuit board 246-i, which may be disposed in a common housing of any size or shape. The power source 242-i may be any type or form of battery, fuel cell or other system for generating power for supporting operations of the load sensor 240-i. In some implementations, the power source 242-i may be a standard battery, such as a size AA battery, a size AAA battery, a size C battery, a size D battery, a coin-cell battery (e.g., a CR 2016, a CR 2025 or a CR 2032), or any other battery. The load cell 244-i may be any system for generating electrical load signals corresponding to forces applied to the load sensor 240-i. In some implementations, the load cell 244-i may be a strain-gage load cell, which may include conductive elements such as aluminum, copper and/or silicon provided in strings or grids that are configured to sense changes in electrical resistance in response to physical loading. In some other implementations, the load cell 244-i may include one or more capacitive sensors, force-sensing resistors, inductive weight sensors, or any other type or form of device or system for generating electrical load signals in response to loading thereon.

The circuit board 246-i may include any components for controlling operations of the load sensor 240-i or interpreting information or data captured thereby. Such components may include one or more processors, transistors, transducers, transceivers or any other components. For example, the circuit board 246-i may include a converter, e.g., an analog-to-digital converter, for converting signals generated by the load cell 244-i to one or more other forms, such as from analog signals to digital signals, which may be transmitted to another computer device or system. Such converters may include, but are not limited to, a direct-conversion converter, a successive-approximation converter, a ramp-compare converter, an integrating converter, a sigma-delta converter, or any other analog-to-digital converter. Alternatively, in some implementations, a single, common converter or like component may be provided to convert signals generated by one or more load cells into another form, e.g., from analog signals to digital signals.

For example, in some implementations, the circuit board 246-i may include one or more transceivers for communicating with other load sensors 240-i, or with one or more external computer devices or systems, over the network 290. Such transceivers may be configured for communication via one or more wired or wireless means, e.g., wired technologies such as USB or fiber optic cable, or standard wireless protocols such as Bluetooth® or any Wi-Fi protocol, such as over the network 290 or directly. For example, in some implementations, the circuit board 246-*i* may enable the load sensor 240-*i* to communicate over the network 290 via or within any wireless band, including but not limited to a 5.0 gigahertz (GHz) band, or a 2.4 gigahertz (GHz) band. In some other implementations, the circuit board 246-*i* may enable the load sensor 240-*i* to communicate over the network 290 via or within a wireless band of less than 1.0 gigahertz (GHz).

In some implementations, each of the load sensors 240-*i* may include a corresponding power source 242-*i*. In some other implementations, one or more of the load sensors 240-*i* may not include an intrinsic power source, but may be electrically coupled to another component, e.g., another load sensor or the photovoltaic source 260, and may receive electrical power from the other component. Additionally, each of the load sensors 240-*i* may be in communication with the server 212 by wired or wireless means, or with one or more external computer devices or systems, e.g., over the network 290, in order to transmit or receive information in the form of digital or analog data by any wired or wireless technologies or protocols, or for any other purpose.

The photovoltaic power source 260 may be any system for generating electrical power from light, and for powering one or more of the load sensors 240-*i* from the electrical power generated thereby. As is shown in FIG. 2B, the photovoltaic power source 260 includes one or more photovoltaic cells 262-*i* and capacitors 264-*i*, or any other components (e.g., resistors, amplifiers, inductors or the like), which may be maintained within a common housing, such as is shown in FIGS. 1A and 1B.

The photovoltaic cells 262-*i* may be electrical devices, e.g., a photoelectric cell, that convert energy of light directly into electrical energy by the photovoltaic effect. The photovoltaic cells 262-*i* may have one or more electrical characteristics, such as current, voltage, or resistance, that vary when the photovoltaic cells 262-*i* are exposed to light, e.g., as a function of intensity of the light, or any other factors. In this way, photovoltaic cells 262-*i* may absorb photons from a light source, generate a current, and produce electrical energy that can be stored by the one or more capacitors 264-*i* or used to power one or more of the load sensors 240-*i*, e.g., either directly or by maintaining a desired level of voltage or charge on the power source 242-*i*. Alternatively, the storage system 220 may include any other type or form of systems for generating electrical energy, including but not limited to thermoelectric materials that generate electrical energy from differences in temperature, magnetic cartridges that convert physical motion to electrical energy, as well as any other transducers for converting energy from one form to another, e.g., into electrical energy for powering the one or more load sensors 240-*i*.

Although the system 200 of FIG. 2A includes a single box corresponding to a storage system 220, and four boxes corresponding to the load sensors 240A, 240B, 240C, 240D, those of ordinary skill in the pertinent arts will recognize that the materials handling facility 210 may include any number of the storage system 220, and each of such storage systems 220 may include any number of load sensors. Furthermore, each of the storage systems 220 may be homogenous, such that each includes the same number and type of load sensors and surfaces for accommodating items, or heterogeneous in nature, such that one or more of the storage systems 220 includes a number or type of load sensors or a surface for accommodating items that is different from a number or type of load sensors or a surface for accommodating items of one or more other storage systems 220 in accordance with the present disclosure.

In addition to the storage system 220, the materials handling facility 210 may include any number of other inventory areas or facilities having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or 2B). The materials handling facility 210 may operate one or more order processing and/or communication systems using computer devices or resources in communication with one or more of the servers 212, the data stores 214 and/or the transceivers 216, or through one or more other computing devices or resources that may be connected to the network 290, as is indicated by line 218, in order to transmit or receive information in the form of digital or analog data, or for any other purpose.

The materials handling facility 210 may also include any number of other sensors, components or other features for detecting one or more events or interactions therein, including one or more imaging devices, RFID sensors, LIDAR sensors, or any other type or form of sensors. Information or data captured by a variety of sensors may be independently or collectively evaluated in order to determine a measure of a probability or likelihood that an event has occurred at a specific location, and processed according to one or more of the systems or methods disclosed herein if an event is determined to have occurred, to a predetermined level of confidence or accuracy, or discarded when it is determined that no event has occurred. Likewise, a location or a time of an event may be determined based on information or data captured by any of such sensors, which may be independently or collectively evaluated in order to identify the location or the time at which the event has most likely occurred.

The materials handling facility 210 may also include one or more other components or features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, information or data captured using the load sensors 240A, 240B, 240C, 240D or any other components of the materials handling facility 210 and/or the storage system 220 may be utilized in concert with information or data captured or generated by a locating service having one or more processors or sensors for detecting the presence or absence of one or more actors within the materials handling facility 210, and locating one or more poses, gestures or other actions executed by such actors within the materials handling facility 210. Such a locating service may be provided in the same physical location as the materials handling facility 210 or in one or more alternate or virtual locations, e.g., in a "cloud"-based environment.

For example, a number and positions of actors within the material handling facility 210 (e.g., the user 270) may be identified based on imaging data captured by a plurality of cameras, such as based on one or more outlines, faces or other attributes of actors (e.g., customers, workers or other humans) detected in images captured by any of the cameras and recognized as corresponding to one or more actors, or possibly corresponding to one or more actors. A record of the number of actors within the materials handling facility 210, or the identities of the actors, may be determined based on images captured by such cameras (e.g., according to one or more other facial recognition and/or other object recognition techniques). Alternatively, a number and/or a position of one or more actors within the materials handling facility 210 may be determined based on information or data gathered by one or more sensors other than a camera. For example, a materials handling facility 210 may include a scanner, a reader or other device configured to identify actors who enter or exit the materials handling facility 210, e.g., based on information or data provided by an application operating on a mobile device carried by such actors, or in any other manner. In some implementations, the cameras that are used to determine the number and/or the position of the actors within the materials handling facility 210 may be one or more of the same sensors that detected the event. In some implementations, the cameras need not be the same sensors that detected the event.

The user 270 may be any entity or individual that wishes to download, purchase, rent, lease, borrow or otherwise obtain items (which may include goods, products, services or information of any type or form) from the materials handling facility 210, or any other entity or individual that is located at the materials handling facility 210 for any reason. The user 270 may utilize one or more computing devices 272, including but not limited to a mobile device (e.g., a smartphone, a tablet computer or a wearable computer, or computing devices provided in wristwatches or other wrist-mounted devices, glasses or other head-mounted devices, automobiles or any other appliances or machines), a set-top box, a smart speaker, as well as a laptop computer, a desktop computer, or computing devices provided in wristwatches, televisions, set-top boxes, automobiles or any other appliances or machines. The computing devices 272 utilized by the user 270 may operate or access one or more software applications 274, such as a web browser, a shopping application, a mapping application or an E-mail client, and may be connected to or otherwise communicate with the materials handling facility 210, or any other computer devices by the transmission and receipt of digital data over the network 290.

The data processing system 280 includes one or more physical computer servers 282 having one or more data stores 284 (e.g., databases) and transceivers 286 associated therewith, as well as provided for any specific or general purpose. For example, the data processing system 280 of FIG. 2A may be independently provided for the exclusive purpose of receiving, analyzing or storing information or data received from the materials handling facility 210 or the user 270, or, alternatively, provided in connection with one or more physical or virtual services that are configured to receive, analyze or store such information or data, as well as one or more other functions. In some implementations, the data processing system 280 may be associated with the materials handling facility 210, or any other physical or virtual facility.

The servers 282, the computer data stores 284 and/or the transceivers 286 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, such as over the network 290. In some implementations, the data processing system 280 may be provided in a physical location. In other such implementations, the data processing system 280 may be provided in one or more alternate or virtual locations, e.g., in a "cloud"-based environment. In still other implementations, the data processing system 280 may be provided onboard one or more vehicles, e.g., an unmanned aerial vehicle.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," a "customer," or a "data processing system," or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," a "customer," or a "data processing system," or like terms, may be typically performed by a human, but could, alternatively, be performed by an automated agent. The protocols and components for providing communication between the materials handling facility 210, the user 270 and/or the data processing system 280 are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the servers 212, the data stores 214, the transceiver 216, the computer 272, the server 282, the data stores 284 or the transceiver 286, and having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
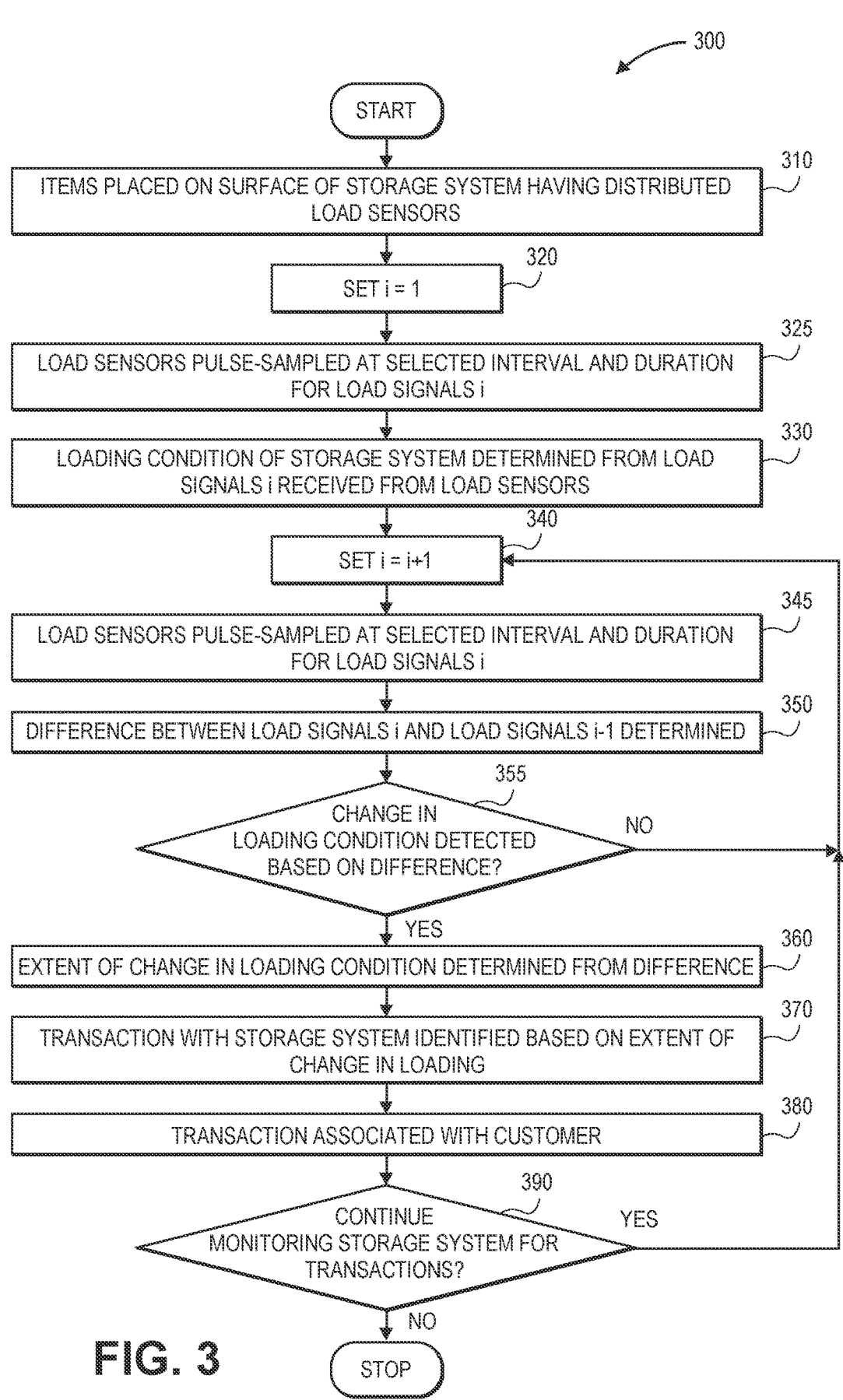
FIG. 3 is a flow chart of one process for using one or more storage systems in accordance with implementations of the present disclosure.

Referring to FIG. 3, a flow chart 300 of one process for using one or more storage systems in accordance with implementations of the present disclosure is shown. At box 310, a storage system having a plurality of load sensors is provided on a surface, and one or more items are placed thereon. For example, the storage system may include a platform placed atop one or more load cells or other load sensing systems provided in association with a shelf, a table, a platform, a floor, a cart or another substantially planar surface of an inventory location, such as is shown in FIGS. 1A through 1G, thereby enabling implementations of the present disclosure to be incorporated into traditional storage systems quickly, inexpensively and effectively. Alternatively, the storage system may be an integrated system that includes one or more surfaces for accommodating items. The load sensors may include one or more load cells, circuits, or other components, and may be configured for communication by wired or wireless technologies or protocols.

At box 320, a value of a step variable i is set equal to one, or i=1. At box 325, the load sensors are pulse-sampled for load signals i at a selected interval or duration. For example, in some implementations, each of the load sensors may be programmed to transmit a signal representative of a respective loading condition at a regular interval of time, e.g., every ten milliseconds, and having a regular duration, e.g., every two milliseconds. By pulse-sampling the load sensors, and selecting and/or limiting the intervals and durations of the respective pulses, the amount of power consumed by each of the load sensors is significantly reduced as compared to load sensors that are continuously sampled. The pulse-sampling rate or frequency may be selected on any basis, and with an objective of increasing a likelihood that a change in a loading condition of each of the load sensors is appropriately detected, or with an objective of conserving available power. For example, in some implementations, pulse intervals and pulse durations may be selected on any basis, including but not limited to an extent of power or energy that is available to the load sensors, a level of activity (e.g., a number or a frequency of interactions) of interactions with the storage system, or any other factors, including but not limited to a desired level of accuracy or precision in detecting such interactions.

In some implementations, each of the load sensors may be powered by one or more batteries or other power sources of any size or type, including but not limited to batteries that are commonly utilized in powering commercial electronic devices, such as AA batteries, AAA batteries, or coin-cell batteries (e.g., CR 2032 batteries). In some other implementations, the load sensors may be powered by one or more photovoltaic cells, which may harvest electrical energy from natural light sources (e.g., the Sun or another celestial body) or artificial light sources (e.g., light bulbs, light emitting diodes or any other light sources). Alternatively, in still other implementations, the load sensors may be powered in tandem by a combination of batteries and photovoltaic cells, or any other power sources, e.g., alternating current power.

At box 330, a loading condition of the storage system is determined from each of the load signals i received from the load sensors. For example, where each of the load sensors has generated an electrical signal corresponding to a force generated thereby, values of forces sensed by the respective load sensors may be calculated from such signals, and live and dead loads on the storage system may be determined accordingly.

At box 340, a value of the step variable i is incremented by one, or i=i+1. At box 345, the load sensors are again pulse-sampled for load signals i at a selected interval or duration. At box 350, a difference between the load signals i and the load signals (i−1) is calculated. If there has not been any change in the loading condition on the storage system, a difference between the load signals i and the load signals (i−1) should be approximately zero. If there is any change in the loading condition on the storage system, however, such as a placement of an item onto the storage system, a removal of an item from the storage system, or a relocation of an item from one location on the storage system to another location on the storage system, a difference between the load signals i and the load signals (i−1) should be non-zero.

At box 355, whether a change in loading condition is identified based on a difference between the load signals is determined. If a change in the loading condition is not identified, then the process returns to box 340, where the value of the step variable i is incremented by one, or i=i+1, and to box 345, where the load sensors are again pulse-sampled for load signals i.

If a change in the loading condition is identified, however, then the process advances to box 360, where an extent of the change in the loading condition is determined from the difference between the load signals. For example, a net increase in a sum of the load signals may represent a total mass of items placed onto the loading system, while a net decrease in the sum of the load signals may represent a total mass of items removed from the loading system. A temporary increase or decrease in the sum of the load signals that is followed by an equal and opposite decrease or increase in the sum may represent a total mass of items that are temporarily removed from and returned to the storage system, or a total mass of items that are temporarily placed onto and removed from the storage system. Alternatively, in some implementations, where locations of the load sensors with respect to one another are known, differences in load signals received from each of such load sensors may be used along with the locations of the load sensors to determine locations at which one or more items are placed onto the storage system or removed from the storage system, according to standard equilibrium principles.

At box 370, a transaction with the storage system is identified based on the extent of the change in loading. For example, where a mass or weight of one or more items is calculated from the extent of the change in loading, the mass or weight may be compared against an index, record or look-up table stored in a database or other data store in order to identify the one or more items that may have been removed from the storage system or placed onto the storage system. At box 380, the transaction is associated with a customer within a vicinity of the storage system, e.g., by updating a data file or record regarding items associated with the customer to indicate that the one of the items is now associated with the customer, or is no longer stored on the storage system. At box 390, whether the continued monitoring of the storage system for transactions is desired may be determined. If the storage system is to be monitored for transactions, then the process returns to box 340, where a value of the step variable i is again incremented by one, or i=i+1. If the storage system need not be monitored for transactions, however, then the process ends.

Figure 4A:
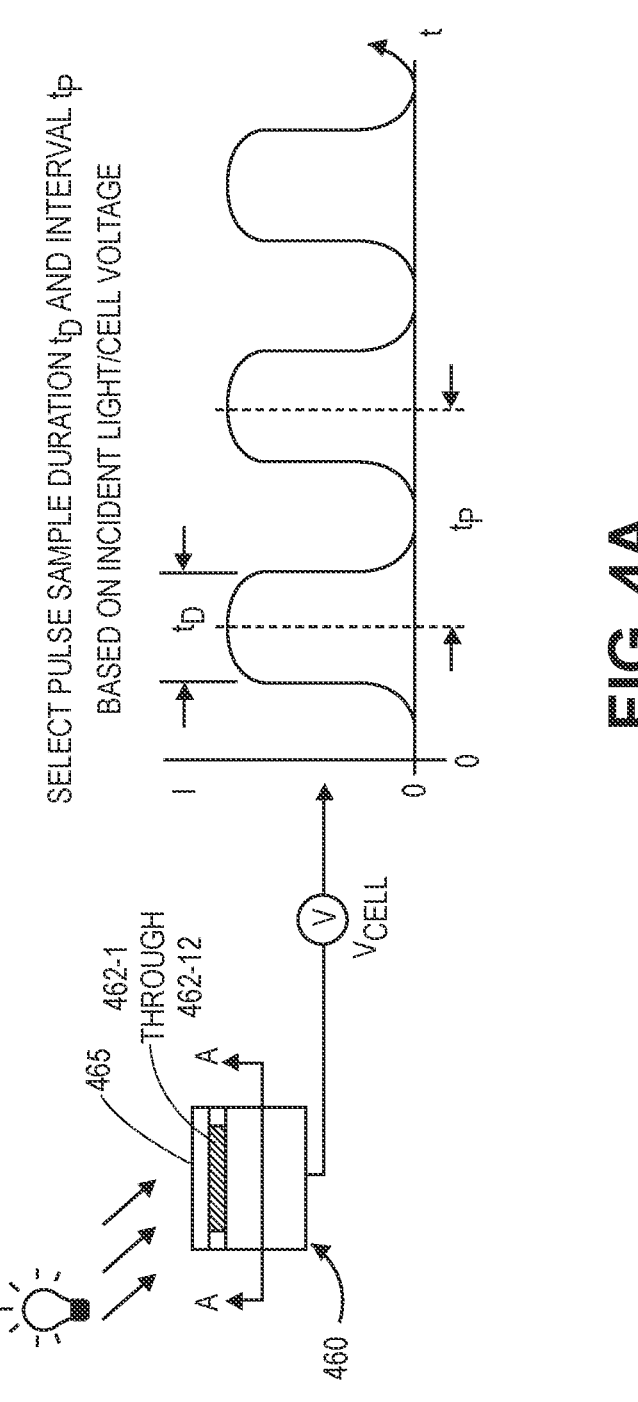
FIGS. 4A and 4B are views of aspects of one storage system in accordance with implementations of the present disclosure.
Figure 4B:
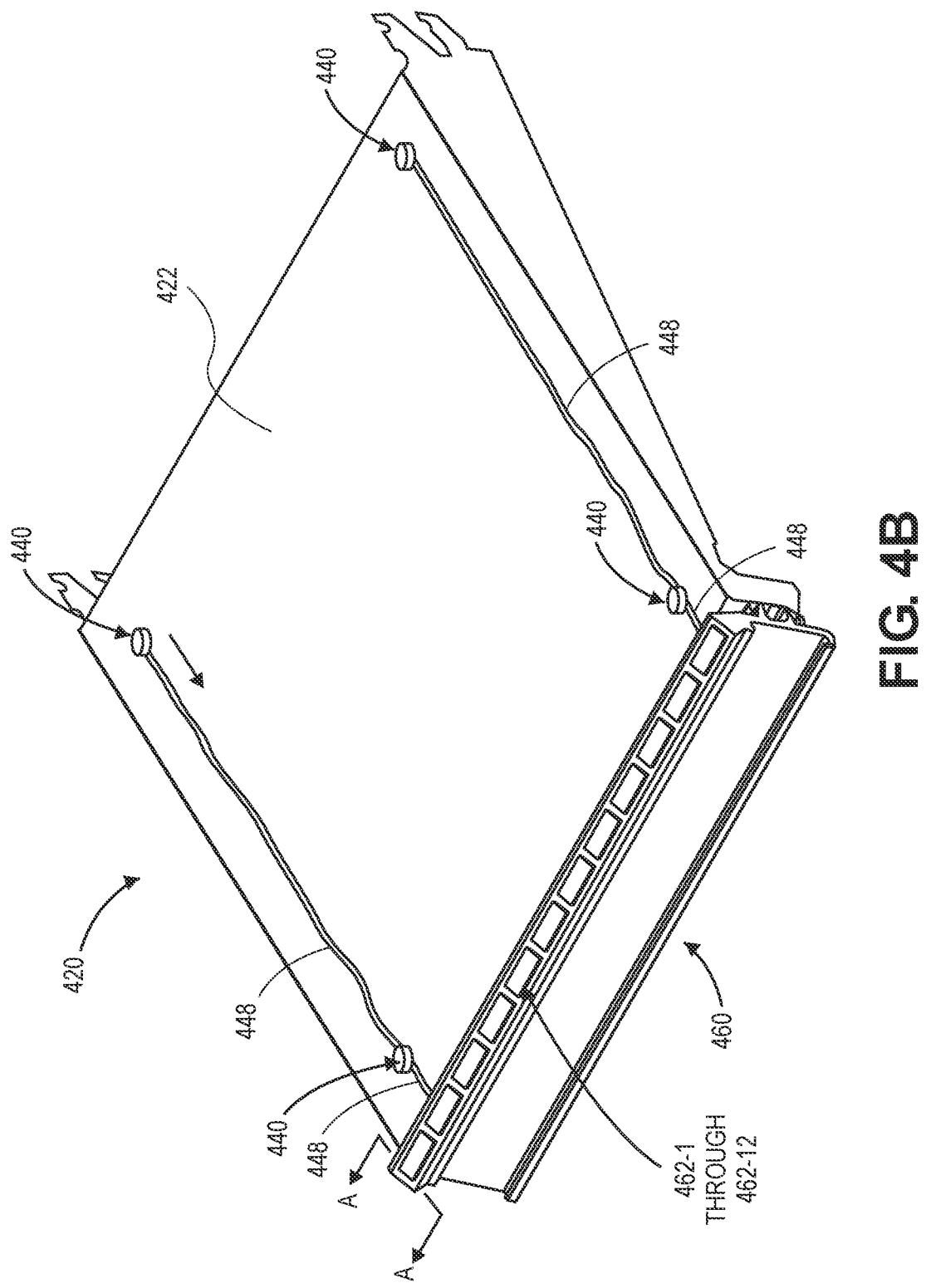

As is discussed above, durations and/or intervals by which load sensors are sampled may be determined on any basis, including but not limited to an amount or an extent of power that is available to the load sensors. Referring to FIGS. 4A and 4B, views of aspects of one storage system in accordance with implementations of the present disclosure is shown. Except where otherwise noted, reference numerals preceded by the number "4" shown in FIGS. 4A and 4B indicate components or features that are similar to components or features having reference numerals preceded by the number "2" shown in FIGS. 2A and 2B, or by the number "1" shown in FIGS. 1A through 1G.

As is shown in FIGS. 4A and 4B, a storage system 420 includes a plurality of load sensors 440 that are placed on a shelf 422 and connected to a photovoltaic power source 460 and configured to draw electrical power therefrom by a plurality of wired connectors 448. The photovoltaic power source 460 includes a plurality of photovoltaic cells 462-1 through 462-12 disposed in an upper surface, and the load sensors and the photovoltaic power source 460 are configured for use in association with a shelf, a table, a platform or any other loading surface of an inventory location.

When the photovoltaic cells 462-1 through 462-12 of the photovoltaic power source 460 are exposed to light, voltage levels $V_{CELL}$ associated with one or more of the photovoltaic cells 462-1 through 462-12 may be monitored by a volt meter or other monitoring system. Durations of pulses $t_D$ and/or intervals $t_P$ by which the load sensors 440 are pulse-sampled may be selected based on the voltage levels $V_{CELL}$. Whereas pulse-sampling at shorter durations consumes less power than pulse-sampling at longer durations, greater accuracy or precision in identifying times at which transactions occurred or in identifying items associated with such transactions may be obtained where pulse-sampling occurs at longer durations than at shorter durations. Likewise, whereas pulse sampling at longer intervals consumes less power than pulse-sampling at shorter intervals, greater accuracy or precision in identifying times at which transactions occurred or in identifying items associated with such transactions may be obtained where pulse-sampling occurs at shorter intervals than at longer intervals. Thus, a duration $f_D$ of a pulse, and an interval $t_P$ between pulses, may be selected based on the available power levels, e.g., voltage levels $V_{CELL}$ associated with one or more of the photovoltaic cells 462-1 through 462-12, as well as a level of activity in interacting with the shelf 422, or desired levels of accuracy or precision by which transactions are to be identified, or users are to be associated with such transactions.

In accordance with the present disclosure, two or more discrete pairs of load sensors having load cells provided therein, such as the load sensors 440, may be used to both identify an item placed on the shelf 422 or removed therefrom, and also to determine a precise location where the item was placed or from which the item was removed, e.g., a location of a center of gravity of the item. For example, a mass or a weight of an item may be determined based on a sum of the forces on each of the load sensors 440, which may be used to identify the item in a record, an index, a look-up table or another set of data that includes associations of items with masses or weights and is stored in at least one data store.

Additionally, a location of an item placed onto the shelf 422 or removed therefrom may be determined based on the individual forces sensed by each of the load sensors 440, where the locations of the respective load sensors 440 are known. For example, a sum of the forces sensed by a pair of the load sensors 440 at or near a back edge of the shelf 422 and a sum of the forces sensed by a pair of the load sensors 440 at or near a front edge of the shelf 422 may be used to generate a line or line segment extending in a first direction or along a first dimension, e.g., parallel to the back edge and the front edge of the shelf 422, according to standard equilibrium principles. Likewise, a sum of the forces sensed by the load sensors 440 located near a left edge of the shelf 422 and a sum of the forces sensed by the load sensors 440 that are located near a right edge of the shelf 422 may be used to generate a line or line segment extending in a second direction or along a second dimension, e.g., parallel to the left edge of the shelf 422 and to the right edge of the shelf 422, according to standard equilibrium principles. A location of an item on the shelf 422, or a location on the shelf 422 from which the item was removed, may be determined based on an intersection of the lines or line segments.

As is discussed above, implementations of storage systems of the present disclosure may include integrated systems having load sensors provided in association with surfaces for accommodating items, such as the storage system 120 of FIGS. 1A through 1G, or a plurality of load sensors that may be provided on a substantially flat surface and a platform for accommodating one or more items may be placed thereon. Referring to FIGS. 5A through 5E, views of components of one storage system in accordance with implementations of the present disclosure are shown. Except where otherwise noted, reference numerals preceded by the number "5" shown in FIGS. 5A through 5E indicate components or features that are similar to components or features having reference numerals preceded by the number "4" shown in FIGS. 4A and 4B, by the number "2" shown in FIGS. 2A and 2B, or by the number "1" shown in FIGS. 1A through 1G.

Figure 5A:
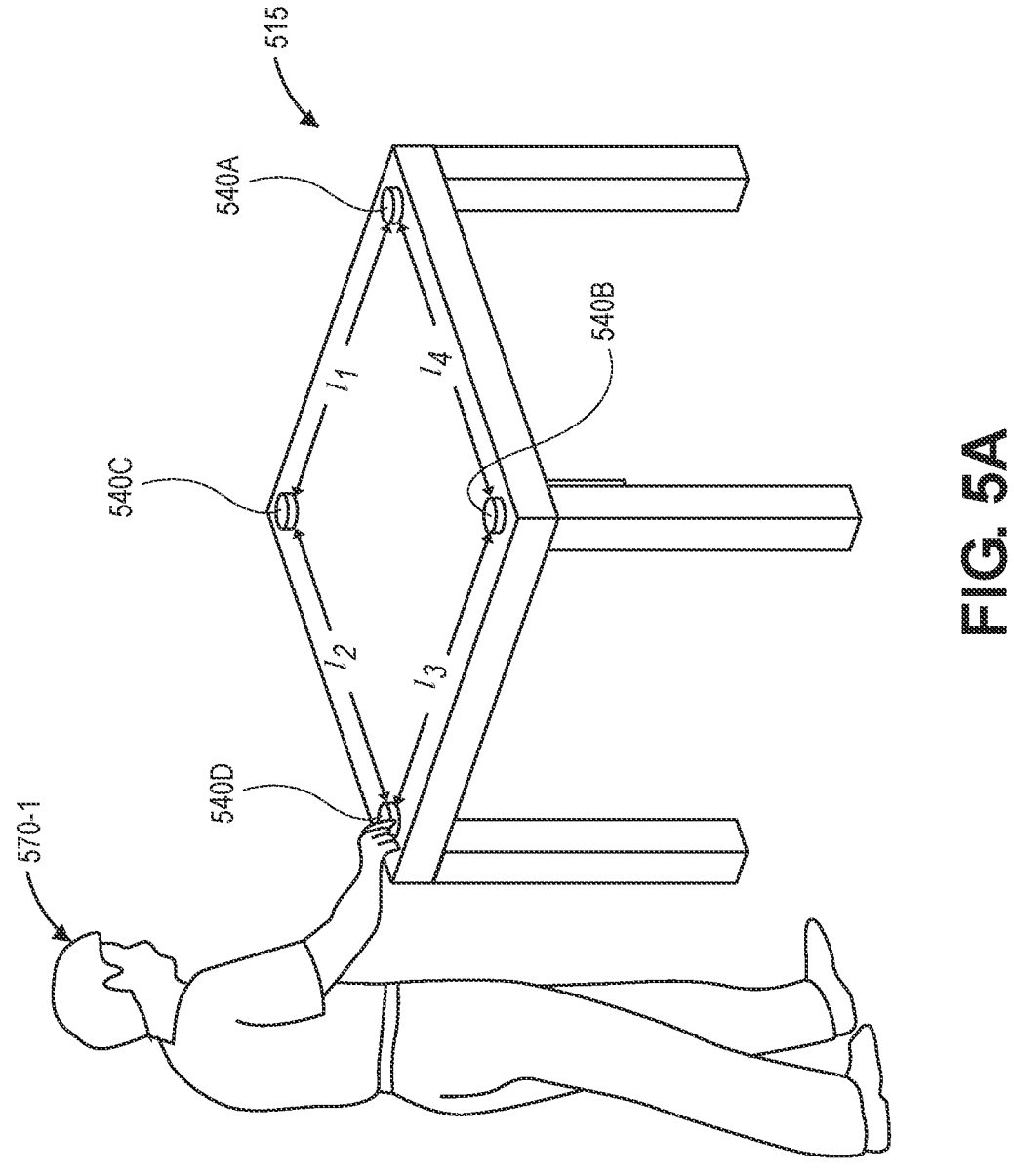
FIGS. 5A through 5E are views of components of one storage system in accordance with implementations of the present disclosure.

As is shown in FIG. 5A, an associate (or actor, or worker, or user) 570-1 installs a plurality of load sensors 540A, 540B, 540C, 540D on a surface of a table 515. In some implementations, the associate 570-1 may be an agent associated with a materials handling facility, or a vendor of one or more items to be stored in associated with or distributed from the table 515.

The table 515 may be provided in a materials handling facility or in any other location or facility, and may have a surface that is aligned horizontally or at any other angle. The load sensors 540A, 540B, 540C, 540D may each include one or more load cells or other systems for sensing loading thereon, as well as one or more power supplies, circuit boards, transceivers or other systems or components.

The associate 570-1 places the load sensors 540A, 540B, 540C, 540D in locations near corners of the surface of the table 515 at finite distances from one another. For example, as is shown in FIG. 5A, the load sensor 540A is located in one corner at a distance $l_1$ from the load sensor 540C, and a distance $l_4$ from the load sensor 540B. Likewise, the load sensor 540D is located in another corner, diagonally opposite from the corner of the load sensor 540A, at a distance $l_2$ from the load sensor 540C and at a distance $l_3$ from the load sensor 540B.

Figure 5B:
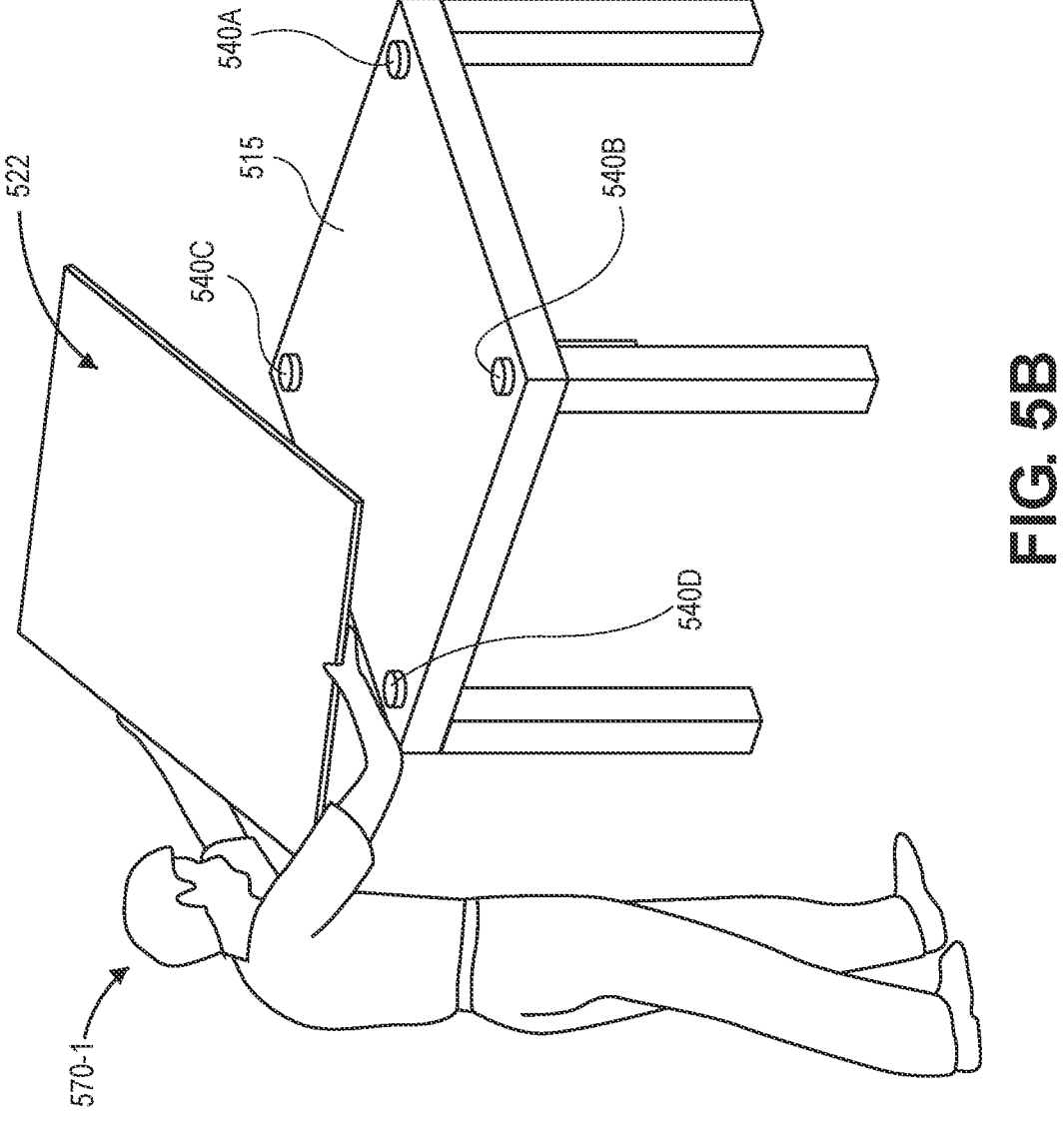
Figure 5C:
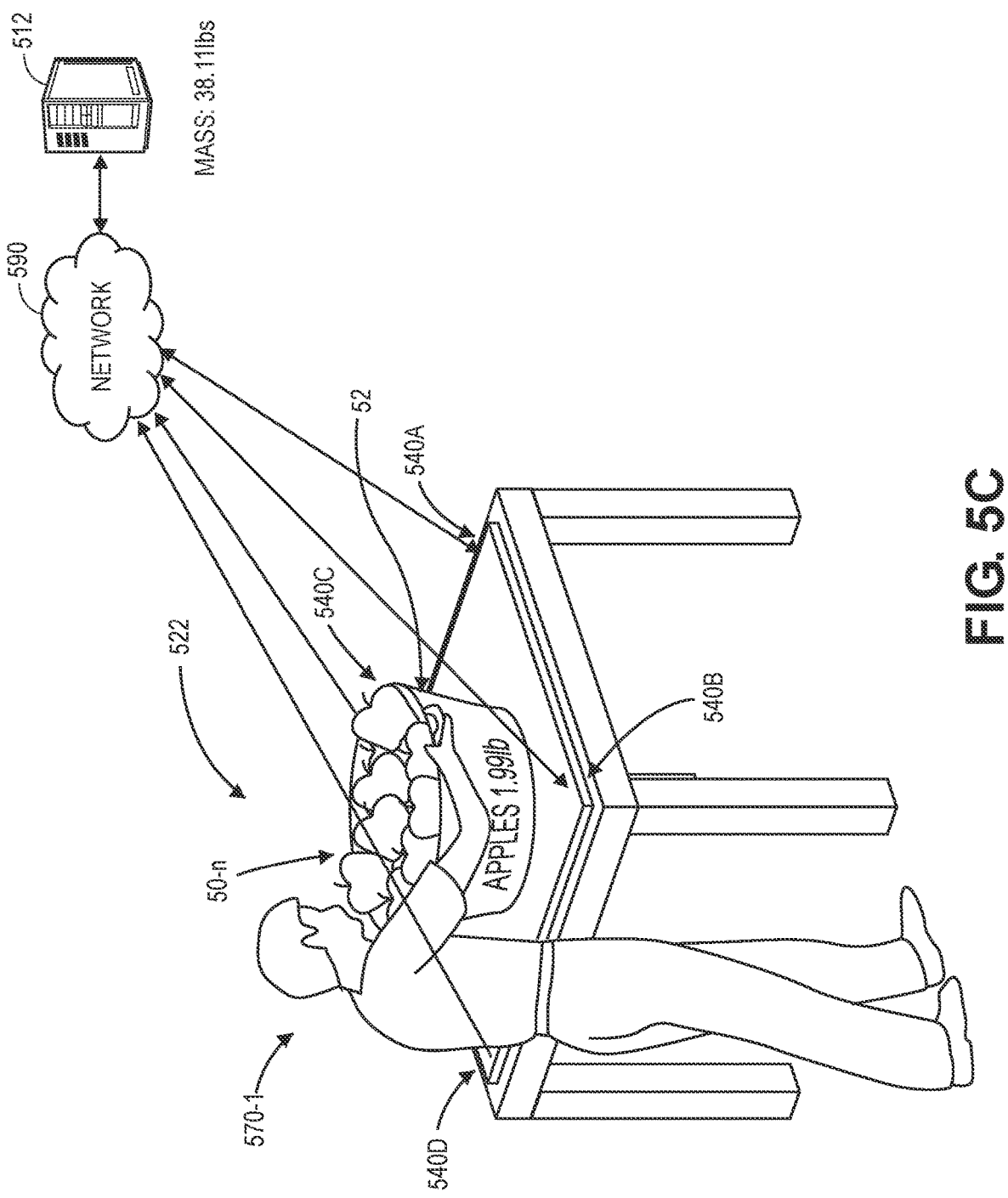

As is shown in FIG. 5B, after installing the load sensors 540A, 540B, 540C, 540D on the corners of the table 515, the associate 570-1 places a platform 522 atop each of the load sensors 540A, 540B, 540C, 540D. As is shown in FIG. 5C, the associate 570-1 further places a container 52 of items 50-$n$, viz., a bushel of apples, onto the platform 522. In response to the loading of the container 52 and the items 50-$n$ onto the platform 522, the load sensors 540A, 540B, 540C, 540D generate and transmit a plurality of electrical load signals indicative of forces acting on the load sensors 540A, 540B, 540C, 540D to a server 512 over a network 590. The server 512 may interpret such signals to calculate a mass of the items 50-$n$, the container 52 and the platform 522 based on a sum of the forces.

Figure 5D:
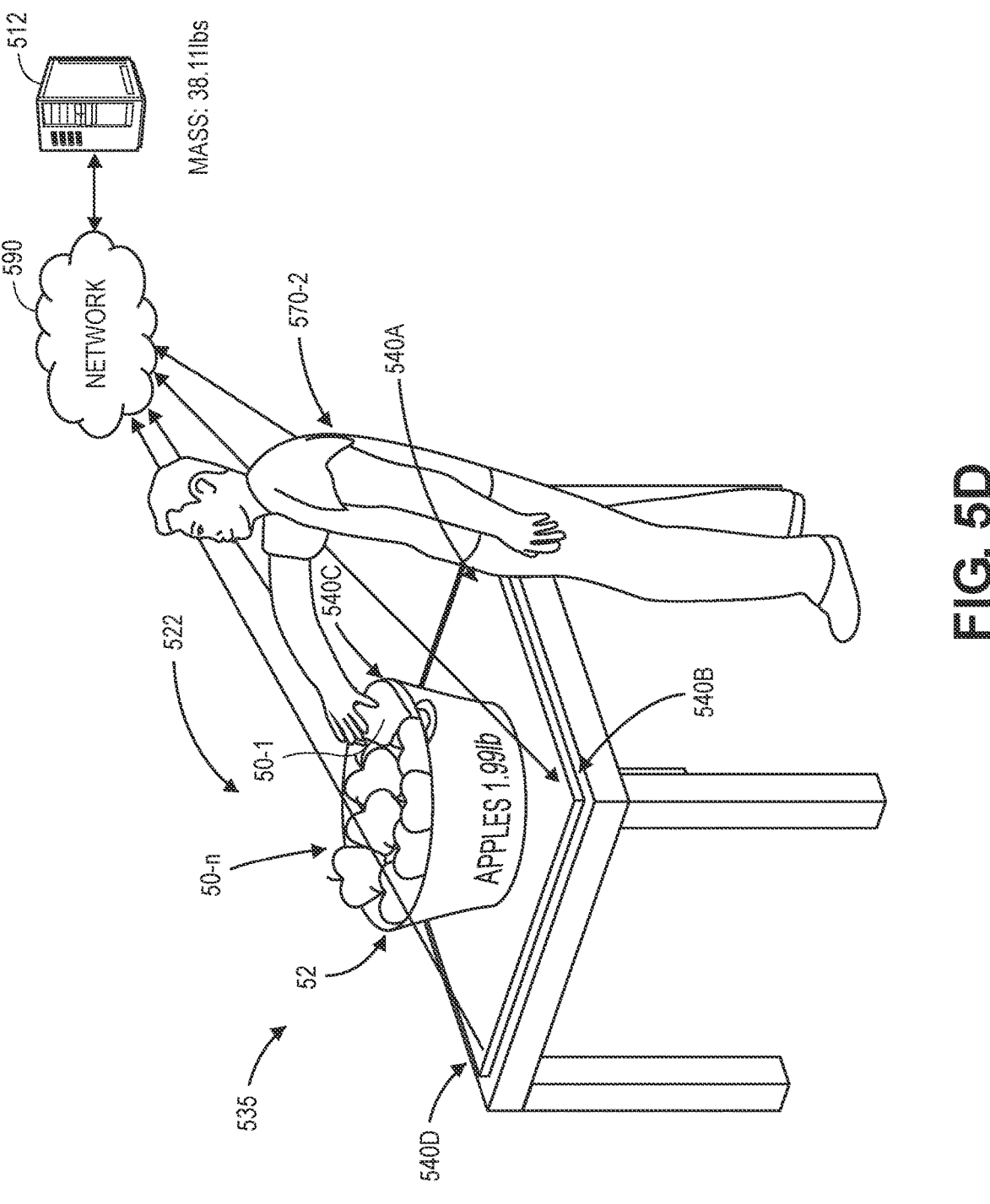
Figure 5E:
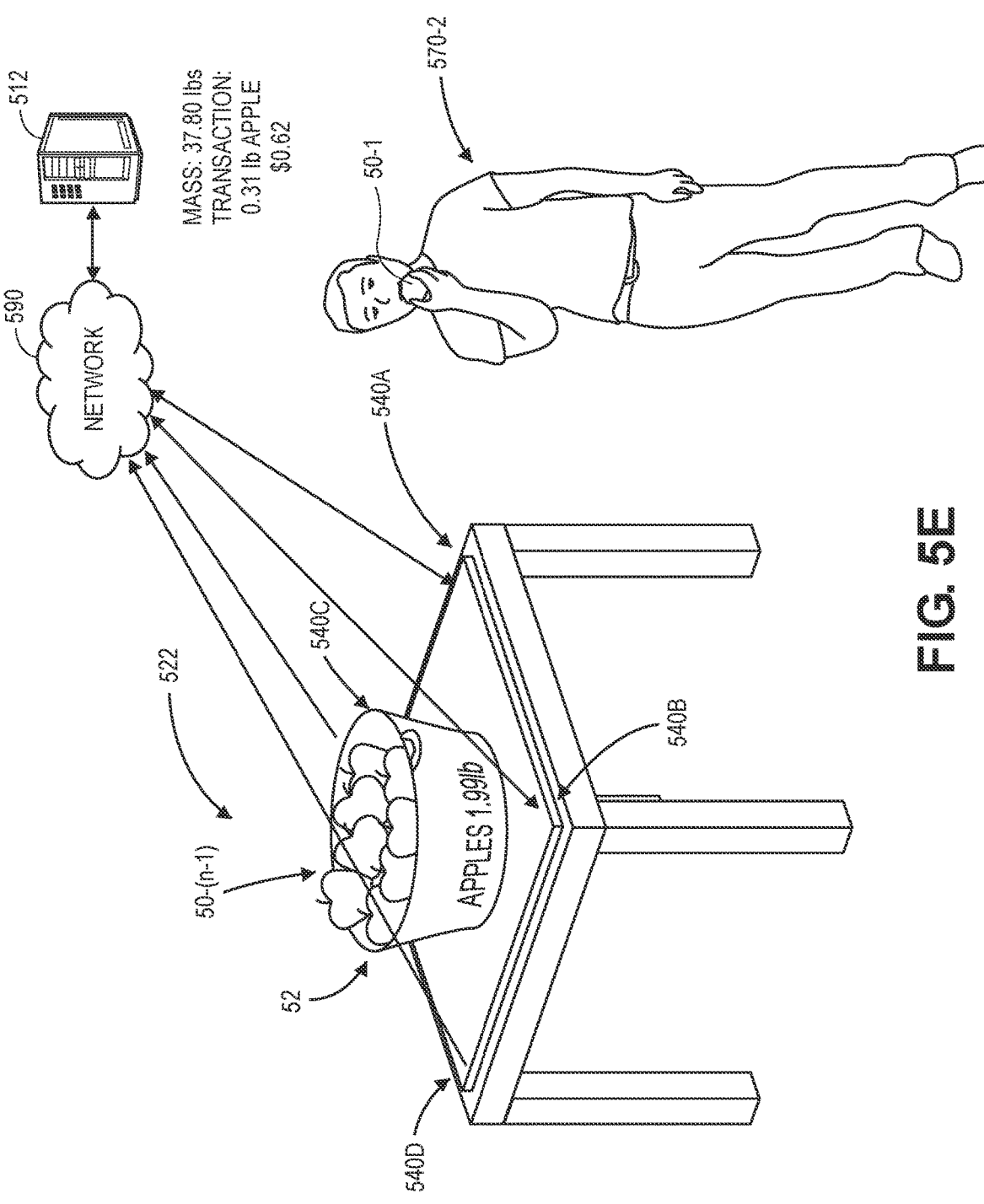

As is shown in FIG. 5D, a customer 570-2 approaches the table 515 and reaches into the container 52 to retrieve one of the items 50-$n$. As is shown in FIG. 5E, after the customer 570-2 removes an item 50-1 from the container 52, the load sensors 540A, 540B, 540C, 540D generate and transmit a plurality of electrical load signals indicative of forces acting on the load sensors 540A, 540B, 540C, 540D to the server 512. The server 512 may interpret such signals to calculate a mass of the items 50-($n$–1), the container 52 and the platform 522. A mass of the item 50-1 may be determined from a difference between the mass of the items 50-$n$, the container 52 and the platform 522 and the mass of the items 50-($n$–1), the container 52 and the platform 522. A transaction involving the item 50-1 may be attributed to the customer 570-2. A cost of the transaction may be calculated as a product of the mass of the item 50-1 and a unit cost of the items 50-$n$, and charged to the customer 570-2.

Implementations of the present disclosure may be utilized in connection with any type or form of storage systems of any size or shape. Additionally, the load sensors of the present disclosure may be modular in nature, and utilized in connection with any number of loading surfaces. Referring to FIGS. 6A through 6C, views of components of one storage system in accordance with implementations of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 6A, three load sensors 640 are disposed on a table 615A having a triangularly shaped upper surface in a triangular arrangement. The load sensors 640 include any number of load cells or other systems for sensing a mass or weight thereon, along with any power sources, circuit boards, transceivers or other components. Additionally, as is also shown in FIG. 6A, a platform 622A having a triangular shape is placed onto the load sensors 640. Thus, a computer device (e.g., a server, not shown) in communication with the load sensors 640 may receive and interpret electrical load signals to determine a mass or weight of the platform 622A and any items placed thereon, e.g., based on a sum of the loads sensed by the respective load sensors 640. Any changes in loading determined from electrical load signals received from the load sensors 640 may be associated with the placement of items onto the platform 622A (e.g., increases in loading) or the removal of items from the platform 622A (e.g., decreases in loading).

As is shown in FIG. 6B, four of the load sensors 640 are disposed on a shelf 615B having a rectangularly shaped upper surface in a rectangular arrangement. As is also shown in FIG. 6B, a platform 622B having a rectangular shape is placed onto the load sensors 640. A computer device (not shown) in communication with the load sensors 640 may receive and interpret electrical load signals to determine masses or weights of the platform 622B and any items placed thereon, or to detect changes in loading associated with the placement of items onto the platform 622B or the removal of items from the platform 622B.

As is shown in FIG. 6C, four of the load sensors 640 are disposed on a shelf 615C having a circularly shaped upper surface in a square arrangement. As is also shown in FIG. 6C, a platform 622C having a circular shape is placed onto the load sensors 640. A computer device (not shown) in communication with the load sensors 640 may receive and interpret electrical load signals to determine masses or weights of the platform 622C and any items placed thereon, or to detect changes in loading associated with the placement of items onto the platform 622C or the removal of items from the platform 622C.

Figure 7A:
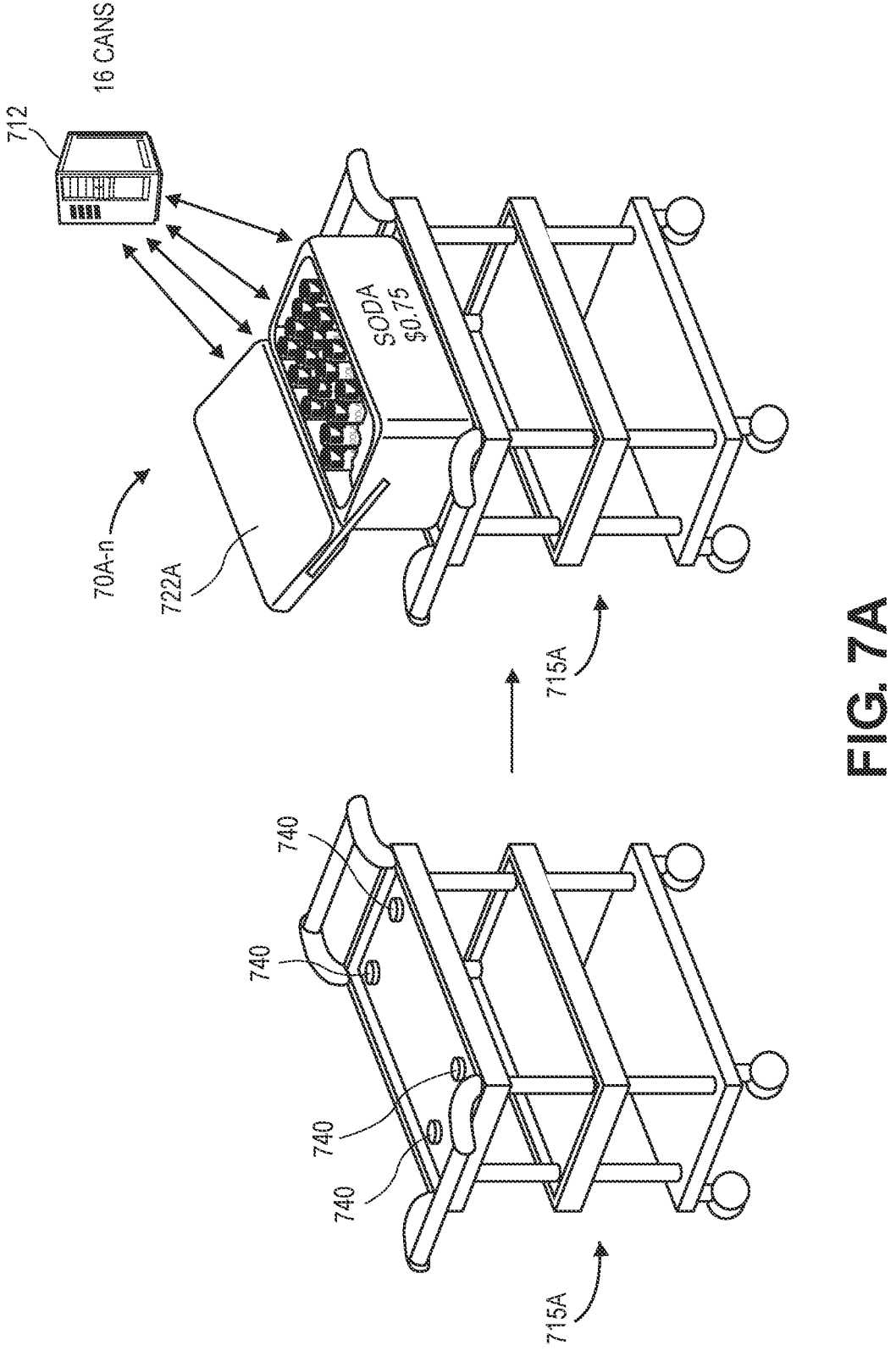
FIGS. 7A through 7C are views of aspects of one storage system in accordance with implementations of the present disclosure.
Figure 7B:
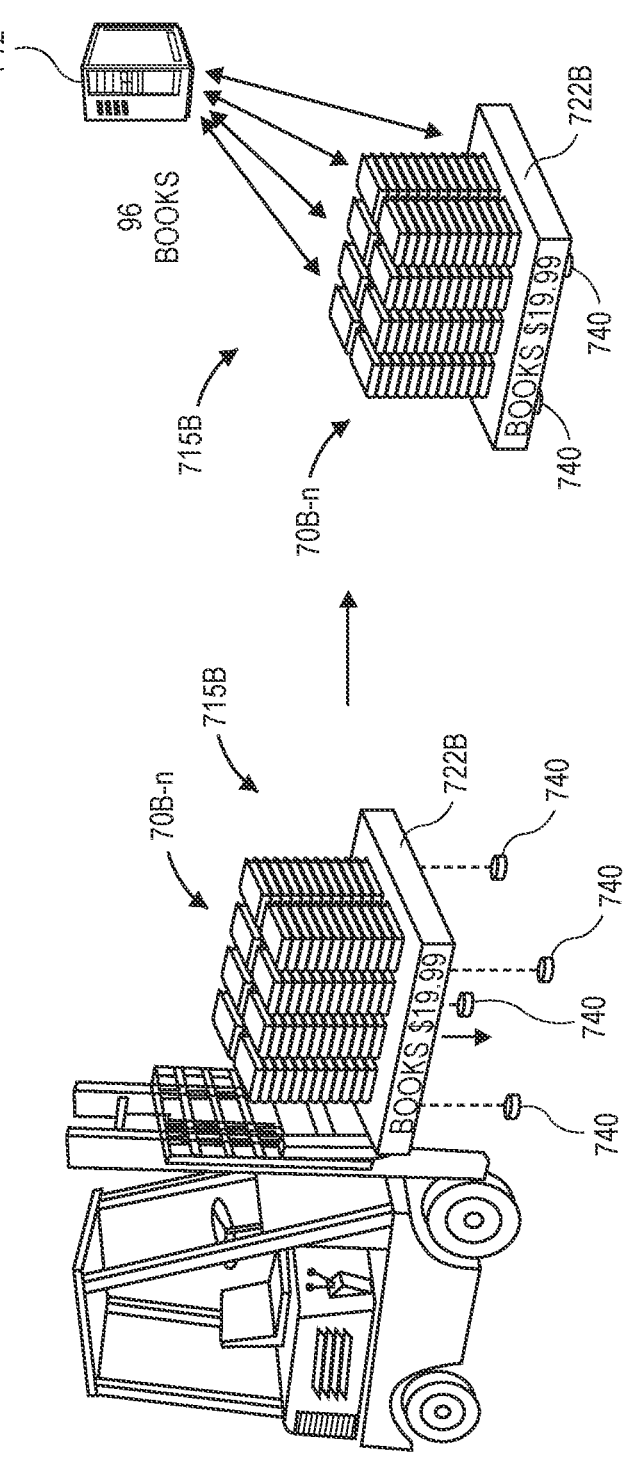
Figure 7C:
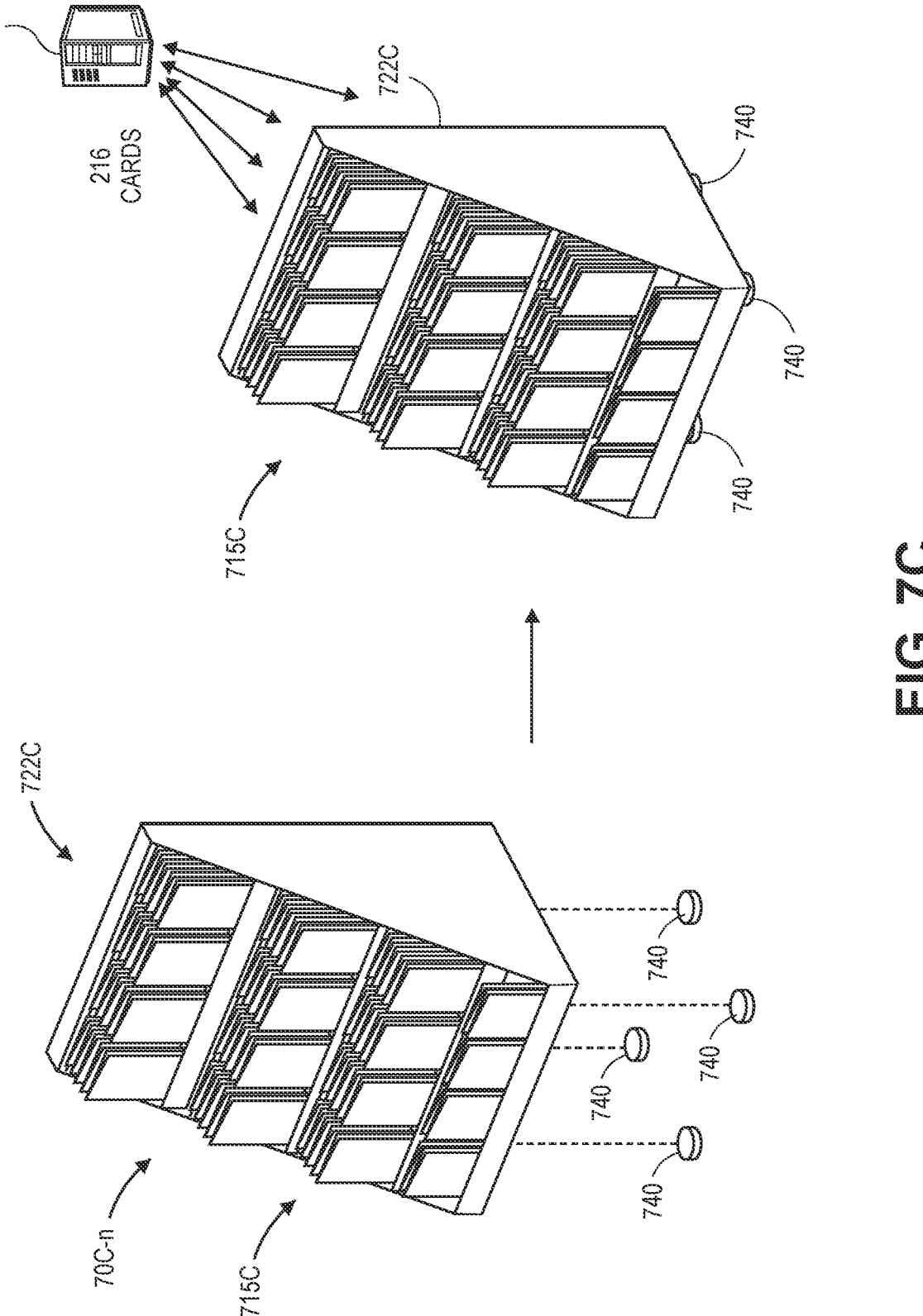

Implementations of the present disclosure need not require a specific platform or loading surface for accommodating items thereon, and may instead be utilized in connection with any number of buckets, bins, vats, vessels or other containers having any number or type of items therein. Referring to FIGS. 7A through 7C, a view of components of one storage system in accordance with implementations of the present disclosure is shown. Except where otherwise noted, reference numerals preceded by the number "7" shown in FIGS. 7A through 7C indicate components or features that are similar to components or features having reference numerals preceded by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 7A, a cart 715A has a plurality of load sensors 740 provided on an upper surface, e.g., in a rectangular arrangement. As is also shown in FIG. 7A, a container 722A (e.g., a cooler) having a plurality of items 70A-n (e.g., beverages) is placed onto the load sensors 740. A computer device 712 (e.g., a server) in communication with the load sensors 740 may receive and interpret electrical load signals to determine masses or weights of the container 722A, the items 70A-n and any associated objects or substances (e.g., water and ice) placed therein. Subsequently, any changes in the loading on the load sensors 740, e.g., due to a removal of one or more of the items 70A-n from the container 722A, or an addition of one or more items to the container 722A, may be detected based on electrical load signals received from the load sensors 740.

As is shown in FIG. 7B, a pallet 715B has a plurality of boards 722B (e.g., leadboards and/or deckboards) with a plurality of items (e.g., books) 70B-n loaded thereon. The pallet 715B is lowered onto the load sensors 740, which are in communication with the computer device 712, and provide electrical load signals representative of masses or weights of the pallet 715B, the items 70B-n and any associated objects or substances (e.g., paper or plastic wrappings or dunnage). Subsequently, any changes in loading on the load sensors 740, e.g., due to a removal of one or more of the items 70B-n from the pallet 715B, or an addition of one or more items to the pallet 715B, may be detected based on electrical load signals received from the load sensors 740.

As is shown in FIG. 7C, a standing kiosk 715C has a frame 722C (e.g., a cardboard or plastic structure) with a plurality of items (e.g., greeting cards) 70C-n loaded thereon. The kiosk 715C is placed onto the load sensors 740, which are in communication with the computer device 712, and provide electrical load signals representative of masses or weights of the kiosk 715C, the items 70C-n and any associated objects or substances (e.g., paper or plastic wrappings or dunnage). Subsequently, any changes in loading on the load sensors 740, e.g., due to a removal of one or more of the items 70C-n from the kiosk 715C, or an addition of one or more items to the kiosk 715C, may be detected based on electrical load signals received from the load sensors 740.

Figure 8:
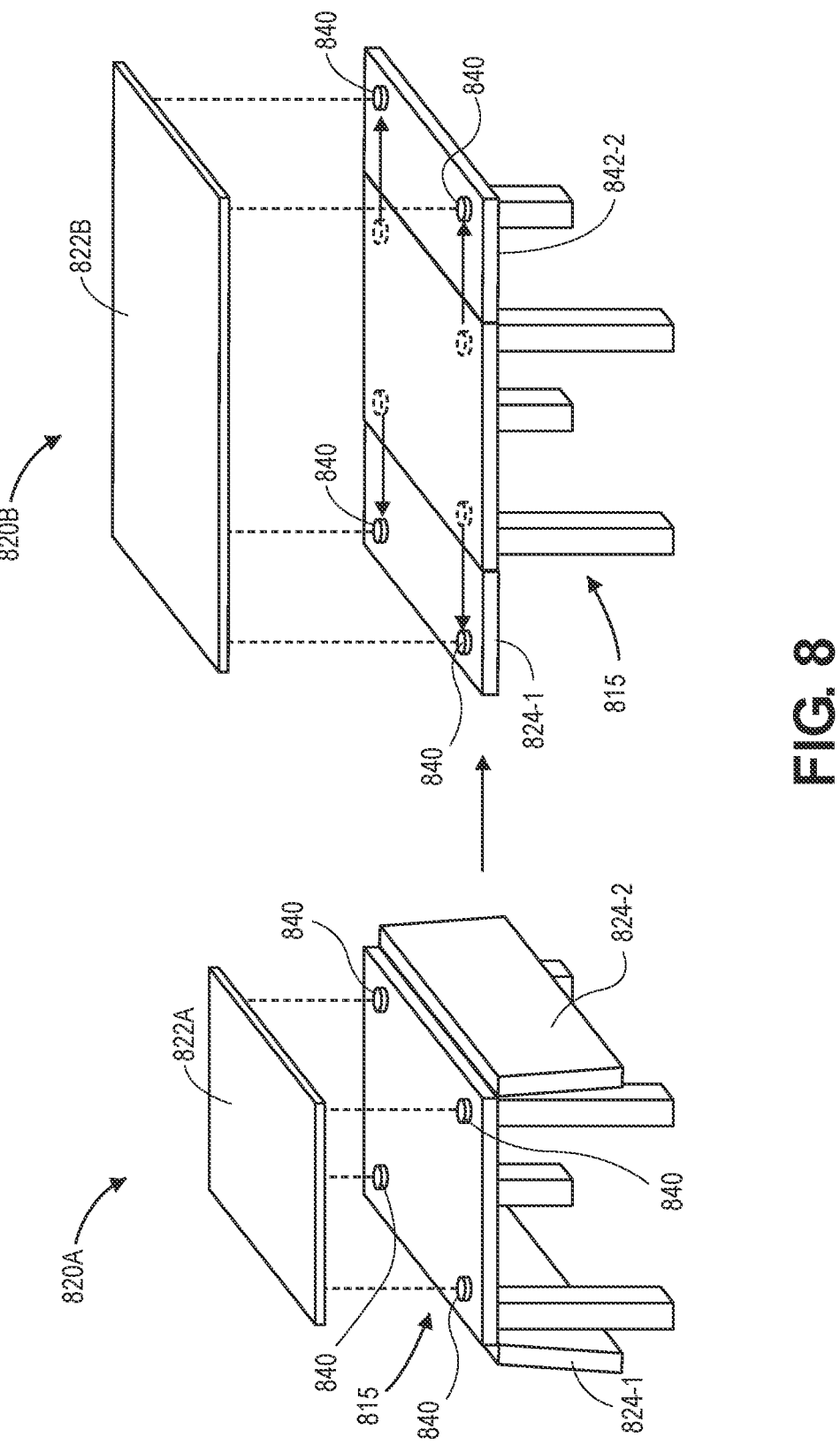
FIG. 8 is a view of one storage system in accordance with implementations of the present disclosure.

Components of the storage systems described herein may be configured or reconfigured for use in connection with any storage facilities of any size or shape. Referring to FIG. 8, a view of components of one storage system in accordance with implementations of the present disclosure is shown. Except where otherwise noted, reference numerals preceded by the number "8" shown in FIG. 8 indicate components or features that are similar to components or features having reference numerals preceded by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 8, a plurality of load sensors 840 are placed on a drop-leaf table 815 having a pair of hinged leaves 824-1, 824-2. The load sensors 840 are placed at corners of a portion of the drop-leaf table 815 not including the leaves 824-1, 824-2. A platform 822A placed onto the load sensors 840 enables items to be accommodated thereon. A computer device (not shown) in communication with the load sensors 840 may receive and interpret electrical load signals to determine masses or weights of the platform 822A and any items placed thereon, or to detect changes in loading associated with the placement of items onto the platform 822A or the removal of items from the platform 822A.

Subsequently, where a larger surface for accommodating items is desired, the leaves 824-1, 824-2 are extended, and the load sensors 840 are moved to corners of the leaves 824-1, 824-2. Another platform 822B is placed onto the load sensors 840, and a computer device (not shown) in communication with the load sensors 840 may receive and interpret electrical load signals to determine masses or weights of the platform 822B and any items placed thereon, or to detect changes in loading associated with the placement of items onto the platform 822B or the removal of items from the platform 822B. The load sensors 840, and other load sensors of the present disclosure, may be placed in any location with respect to a surface or relocated for use in connection with any other surface in accordance with the present disclosure.

Some of the load sensors of the present disclosure may be self-contained systems having load cells, power supplies and/or communications equipment provided therein. Referring to FIGS. 9A through 9D, views of components of one storage system in accordance with implementations of the present disclosure are shown. Except where otherwise noted, reference numerals preceded by the number "9" shown in FIGS. 9A through 9D indicate components or features that are similar to components or features having reference numerals preceded by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

Figure 9A:
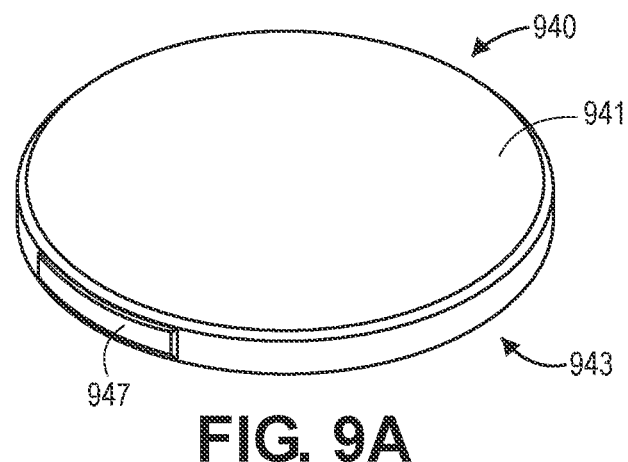
FIGS. 9A through 9D are views of components of one storage system in accordance with implementations of the present disclosure.
Figure 9B:
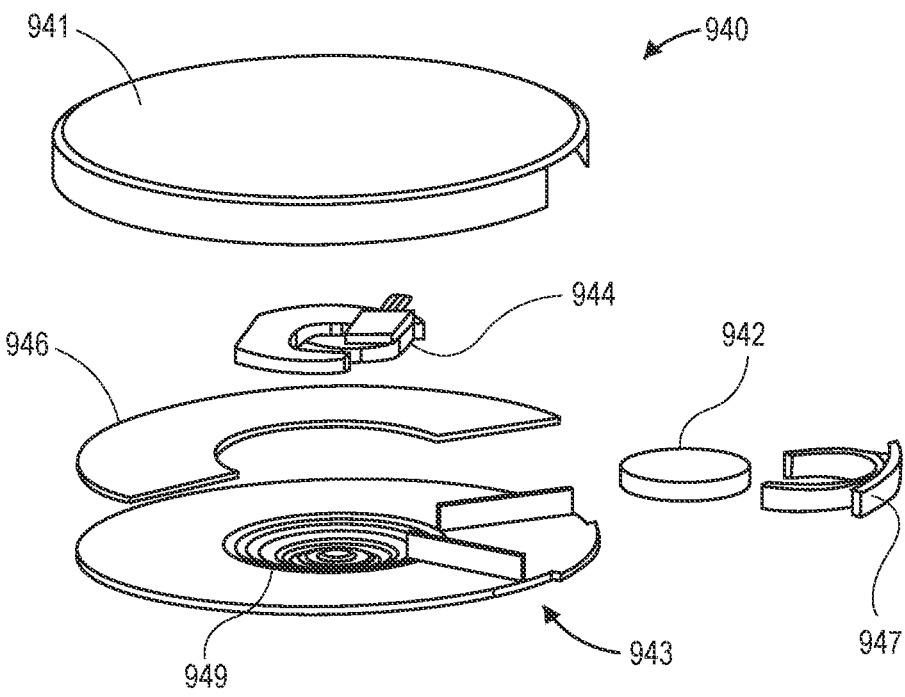
Figure 9C:
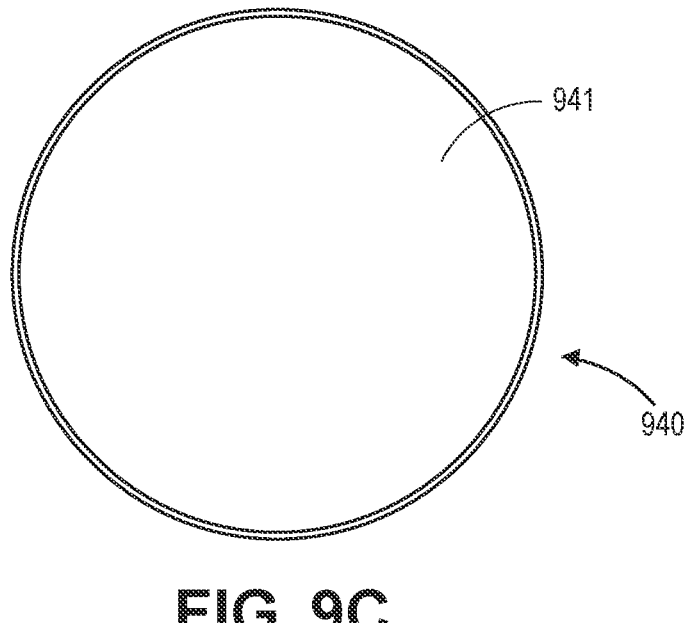
Figure 9D:
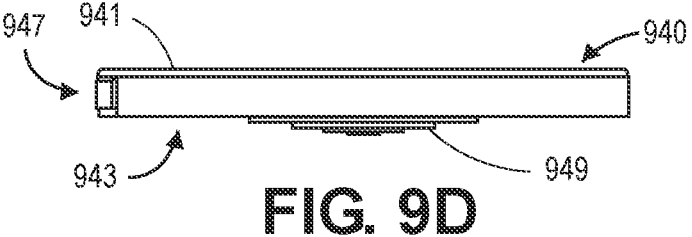

A perspective view of a load sensor 940 is shown in FIG. 9A. An exploded view of the load sensor 940 is shown in FIG. 9B. A top view of the load sensor 940 is shown in FIG. 9C. A side view of the load sensor 940 is shown in FIG. 9D.

As is shown in FIGS. 9A through 9D, the load sensor 940 includes a substantially round, disc-shaped housing defined by a cover 941 and a base 943. The cover 941 and the base 943 may be formed from any suitable materials, including but not limited to molded plastics (e.g., thermosetting plastics such as epoxy or phenolic resins, polyurethanes or polyesters, as well as polyethylenes, polypropylenes or polyvinyl chlorides), rubbers, composites or other like materials. Additionally, as is also shown in FIGS. 9A and 9B, the cover 941 includes an opening for accommodating a battery clip 947.

As is shown in FIG. 9B, the exploded view of the load sensor 940 of FIG. 9A shows the battery clip 947 having a battery 942 (e.g., a coin-cell battery) therein, as well as a load cell 944 and a printed circuit board 946. The battery clip 947 may be inserted into or removed from the load sensor 940 in order to receive or replace the battery 942 therein. The load cell 944 may be a capacitive sensor, a force-sensing resistor, a strain gage load cell, a piezoelectric sensor, an inductive weight sensor, or any other type or form of device or system for generating electrical load signals in response to loading on the load sensor 940. The printed circuit board 946 may include one or more processors, transistors, transducers, transceivers or any other components for controlling operations of the load sensor 940 or interpreting information or data captured thereby. As is also shown in FIGS. 9B and 9D, the base 943 includes an articulated contact surface 949 disposed therein. The articulated contact surface 949 may be formed from any suitable materials, including but not limited to plastics or rubbers, and may aid in maintaining the load sensor 940 in a stationary position with respect to a shelf, a table, a platform or another substantially planar surface of an inventory location, even as the load sensor 940 is subject to loading by the weight of one or more items. By providing the articulated contact surface 949 in alignment with the load cell 944, loading conditions placed upon the load sensor 940 are centrally directed to the load cell 944, rather than any other portion of the load sensor 940.

Figure 10:
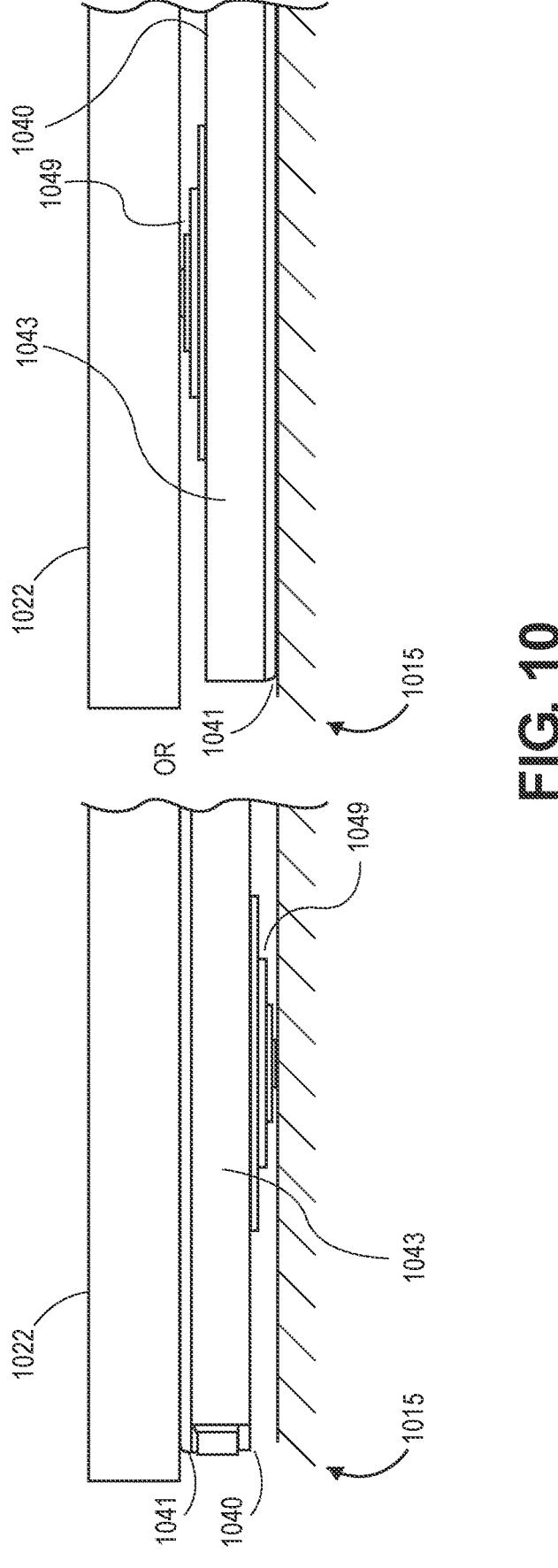
FIG. 10 is a view of components of one storage system in accordance with implementations of the present disclosure.

Articulated contact surfaces enable load sensors to remain in stationary positions with respect to shelves, tables, platforms or other surfaces on which the load sensors are placed, or with respect to shelves, tables, platforms or other surfaces placed thereon. Referring to FIG. 10, views of components of one storage system in accordance with implementations of the present disclosure are shown. Except where otherwise noted, reference numerals preceded by the number "10" shown in FIG. 10 indicate components or features that are similar to components or features having reference numerals preceded by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 10, a load sensor 1040 similar to the load sensor 940 of FIGS. 9A through 9D is provided on a first surface 1015, and a second surface 1022 for accommodating or storing one or more items is placed thereon. For example, the first surface 1015 may be a floor or another substantially flat object, or a component of a traditional storage system, and the second surface 1022 may be a platform or another sufficiently flat object from which the storage or distribution of one or more items is desired. The load sensor 1040 includes a base 1041 and a cover 1043, and an articulated contact surface 1049 disposed in the base 1043.

The articulated contact surface 1049 enables the load sensor 1040 to remain fixed in position with respect to the first surface 1015 and/or the second surface 1022. For example, as is shown in FIG. 10, the articulated contact surface 1049 may be placed in contact with the first surface 1015, and the second surface 1022 may be placed onto the base 1041. In this regard, where the articulated contact surface 1049 is formed from a rubber, a plastic or another material having sufficiently high properties of friction, the articulated contact surface 1049 enhances a likelihood that the load sensor 1040 will remain in position on the first surface 1015 as the second surface 1022 is loaded with one or more items, and that loading conditions applied to the load sensor 1040 are accurately sensed by a load cell (not shown) centrally disposed between the cover 1041 and the base 1043. Alternatively, the load sensor 1040 may be inverted, such that the base 1041 comes into contact with the first surface 1015, and the second surface 1022 is placed onto the articulated contact surface 1049. In this regard, the articulated contact surface 1049 enhances a likelihood that the second surface 1022 will remain in position, e.g., in contact with the articulated contact surface 1049, as the second surface 1022 is loaded with one or more items, while also ensuring that loading conditions applied to the load sensor 1040 are accurately sensed by a load cell (not shown) centrally disposed between the cover 1041 and the base 1043.

Figure 11:
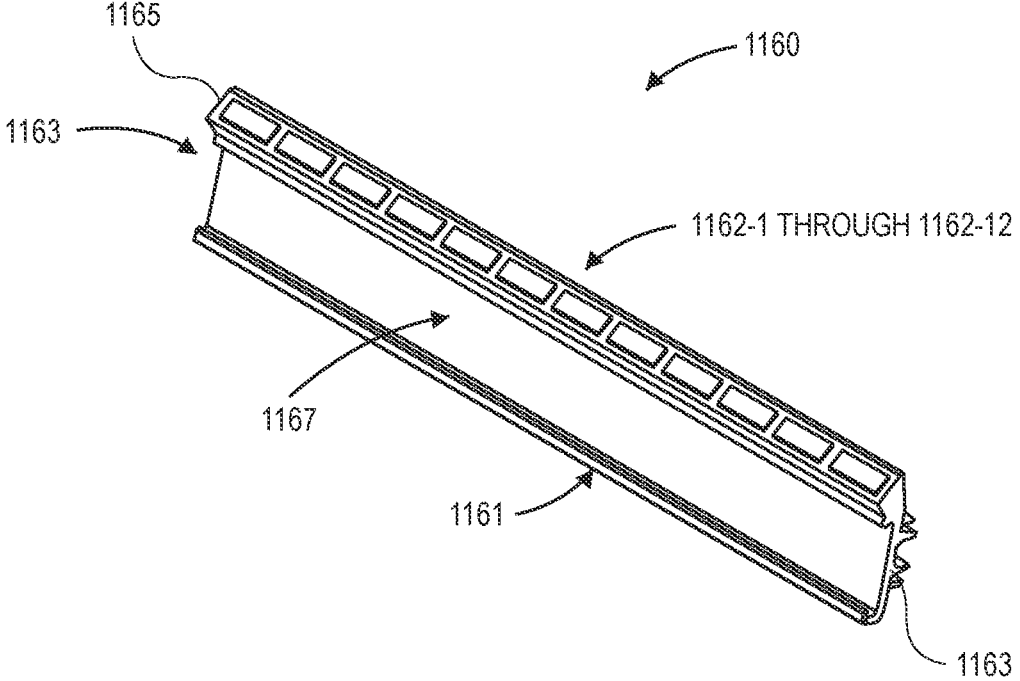
FIG. 11 is a view of components of one storage system in accordance with implementations of the present disclosure.

As is discussed above, photovoltaic systems for providing electrical power may be retrofitted or otherwise provided in association with traditional shelves or other components for accommodating items. Referring to FIG. 11, views of components of one storage system in accordance with implementations of the present disclosure are shown. Except where otherwise noted, reference numerals preceded by the number "11" shown in FIG. 11 indicate components or features that are similar to components or features having reference numerals preceded by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 11, a photovoltaic power system 1160 includes a frame 1161 or housing having a plurality of photovoltaic cells 1162-1 through 1162-12 provided in an upper surface of the frame 1161. The photovoltaic power system 1160 further includes a pair of end caps 1163 provided at opposing ends of the frame 1161 and a protective cover 1165 over the photovoltaic cells 1162-1 through 1162-12. The frame 1161, the end caps 1163 and/or the cover 1165 may be formed from any suitable materials. Additionally, a front edge of the photovoltaic power system 1160 further includes a ticket channel 1167 for accommodating one or more signs, labels or other indicators. The photovoltaic power system 1160 may be configured to mate with an existing storage system, e.g., a gondola-type system, in any manner, and to provide electrical power to any components that may be utilized by the existing storage system, including but not limited to one or more load sensors.

Figure 12A:
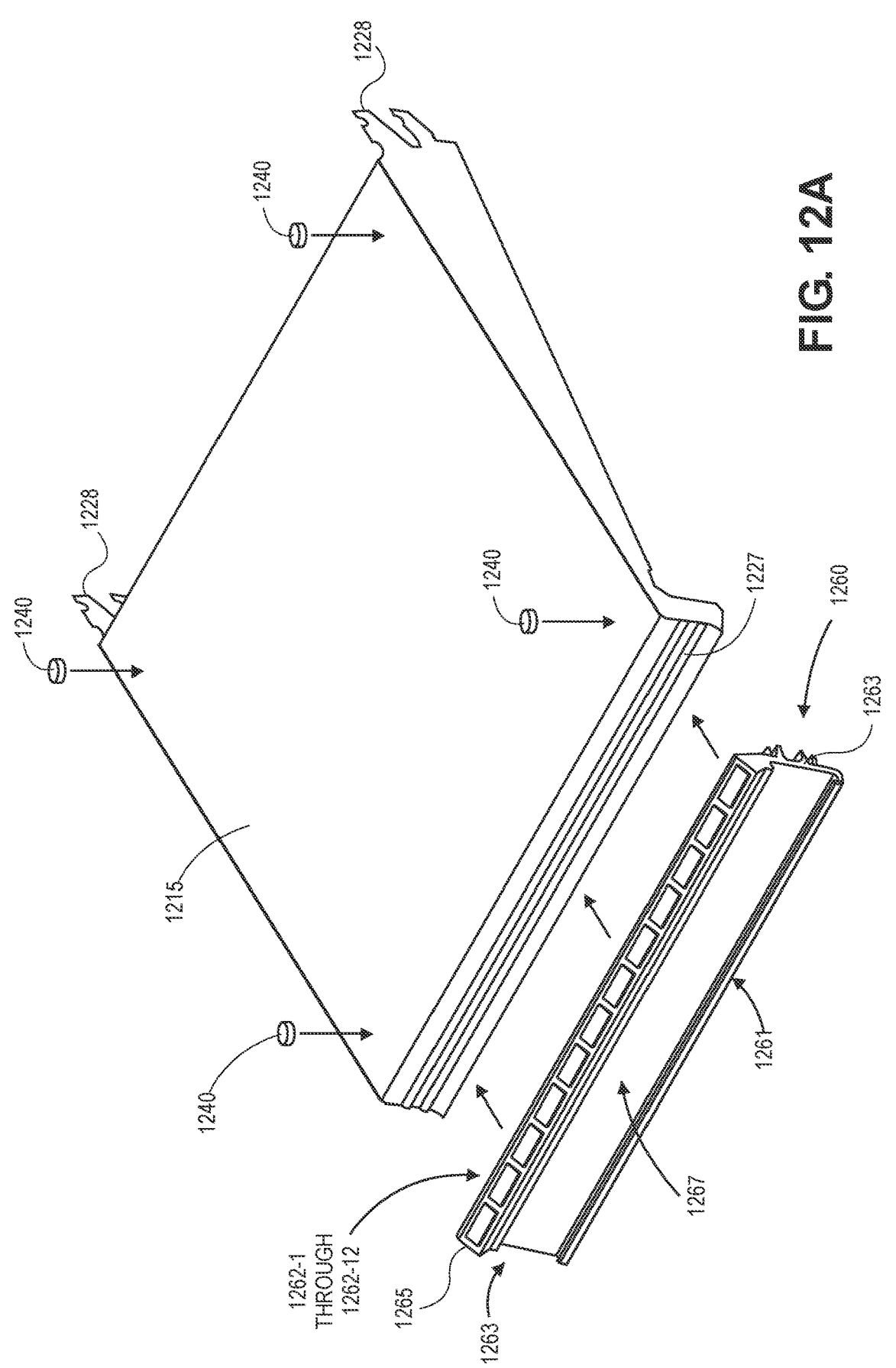
FIGS. 12A through 12C are views of components of one storage system in accordance with implementations of the present disclosure.
Figure 12B:
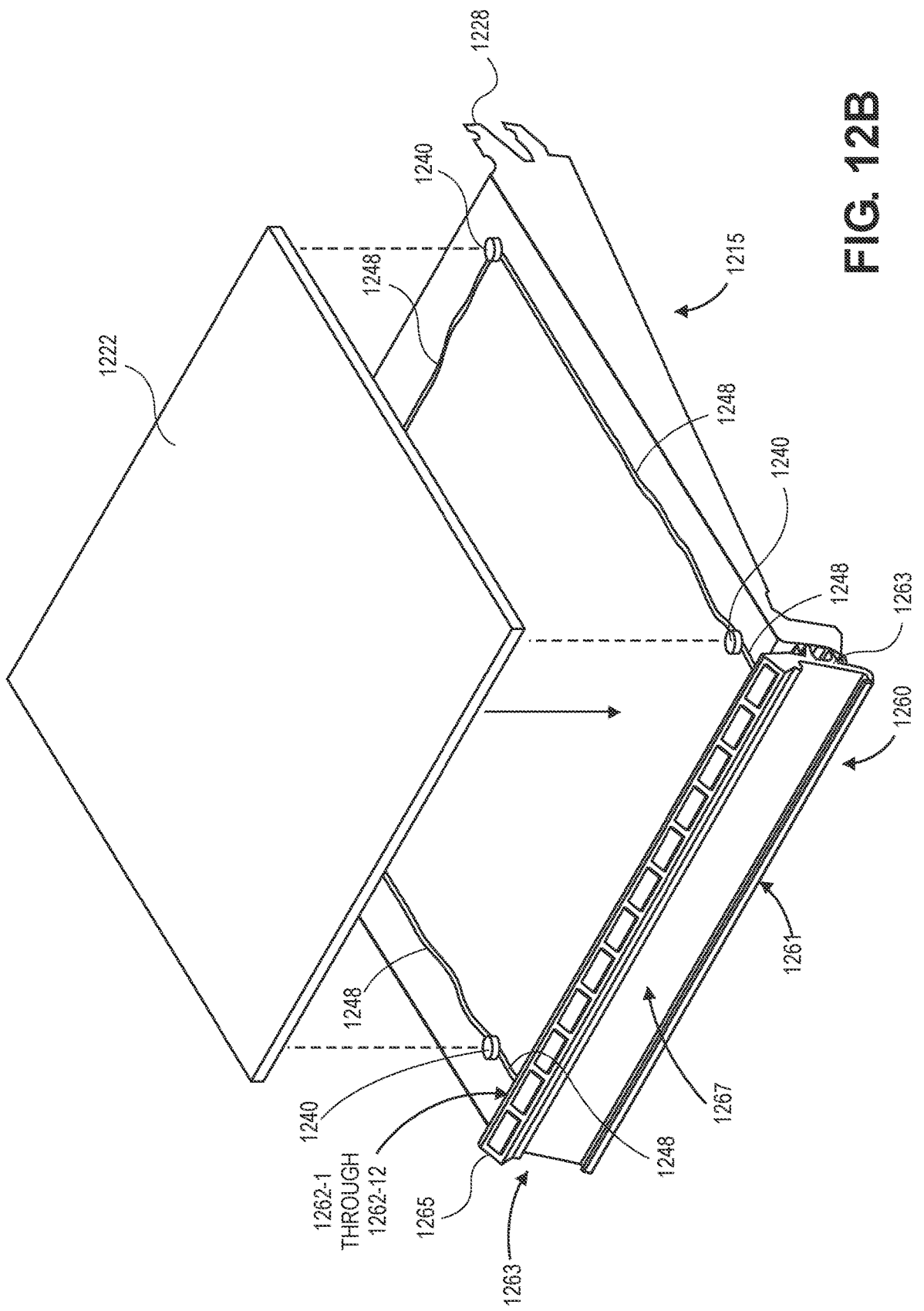
Figure 12C:
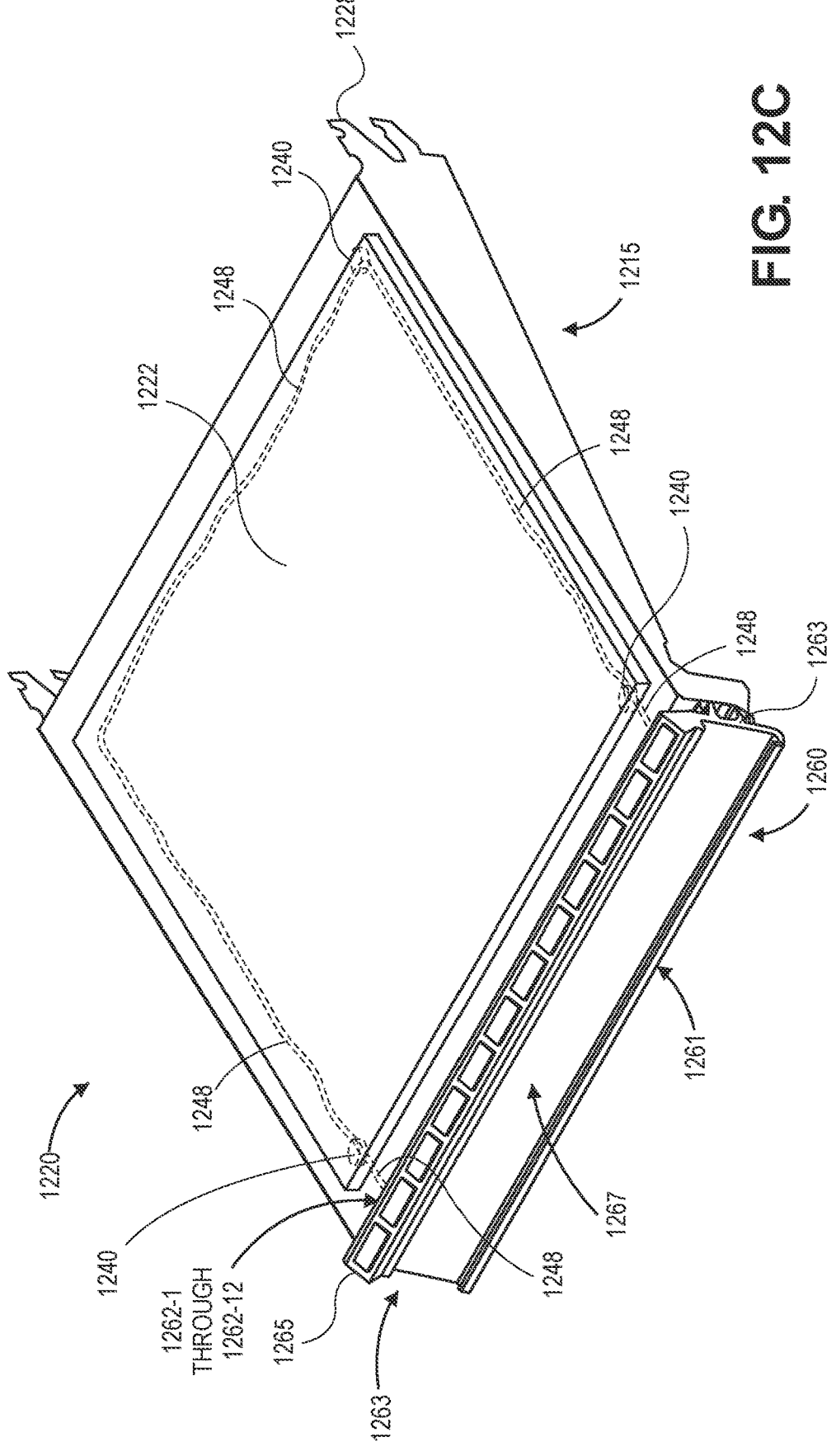

Referring to FIGS. 12A through 12C, views of components of one storage system in accordance with implementations of the present disclosure are shown. Except where otherwise noted, reference numerals preceded by the number "12" shown in FIGS. 12A through 12C indicate components or features that are similar to components or features having reference numerals preceded by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIGS. 12A through 12C, a photovoltaic power system 1260 similar to the photovoltaic power system 1160 of FIG. 11 includes a frame 1261 (or housing), a plurality of photovoltaic cells 1262-1 through 1262-12, a pair of end caps 1263 and a protective cover 1265 over the photovoltaic cells 1262-1 through 1262-12. Additionally, a front edge of the photovoltaic power system 1260 further includes a ticket channel 1267.

The photovoltaic power system 1260 may be mounted to a modular shelf 1215 and used to provide power to a plurality of load sensors 1240 placed on a surface of the modular shelf 1215. For example, the shelf 1215 of FIG. 12A is configured for use in a gondola-type system, and includes a ticket channel 1227 at a front edge of the shelf 1215. The load sensors 1240 each include one or more load cells or other systems for sensing loading thereon, as well as one or more power supplies, circuit boards, transceivers or other systems or components.

As is further shown in FIGS. 12A through 12C, when the photovoltaic power system 1260 is mounted to the front edge of the shelf 1215, and the load sensors 1240 are placed on the shelf 1215, the load sensors 1240 may be coupled to one another and to the photovoltaic power source 1260 by a plurality of wired connectors 1248, which permit the load sensors 1240 to be powered by the photovoltaic power source 1260, or to transfer information or data (e.g., load signals) therebetween. The photovoltaic power system 1260 may be mated with the ticket channel 1227 of the shelf 1215, e.g., by one or more brackets, bolts, clips, rivets or other fasteners, and any signs, labels or other indicators of the contents of the shelf 1215 that would have been provided in the ticket channel 1227 of the shelf 1215 may be applied to the ticket channel 1267 of the photovoltaic power system 1260. Additionally, a platform 1222 or other surface may be applied over the load sensors 1240, which may be configured to generate and transmit signals corresponding to loads sensed thereby at designated intervals, e.g., in one or more pulses rather than continuously, in order to reduce power or energy consumed by the load sensors 1240. For example, the pulse intervals and/or pulse durations may be selected based on an extent of power or energy that the photovoltaic power system 1260 may provide to the load sensors 1240, or a level of activity associated with the load sensors 1240, such as an amount, a number or a frequency of interactions with the platform 1222. Where actors are interacting with the platform 1222 infrequently, the load sensors 1240 may be configured for operation in a first mode, in which the load sensors 1240 are configured for pulse-sampling at short durations or at long intervals, in an effort to conserve power or energy by limiting pulse-sampling and processing of pulses. Where actors are interacting with the platform 1222 more frequently, however, the load sensors 1240 may transition to a second mode, in which the load sensors 1240 are configured for pulse-sampling for longer durations or at short intervals, in an effort to enhance the accuracy or precision by which transactions may be identified based on differences in loading conditions on the platform 1222. After a level of activity associated with the load sensors 1240 has slowed, e.g., for a predetermined period of time, however, the load sensors 1240 may transition back to the first mode, and may be configured for pulse-sampling at the short durations or at the long intervals.

Once the storage system 1220 has been formed from the shelf 1215, the platform 1222, the load sensors 1240 and the photovoltaic power source 1260 as shown in FIG. 12C, the storage system 1220 may be inserted into a gondola rack or other like structure (not shown), and items may be accommodated thereon. Alternatively, the shelf 1215 may be installed into a gondola rack or other like structure (not shown) prior to mounting the photovoltaic power source 1260 thereto, or prior to placing the load sensors 1240 and the platform 1222 thereon. Moreover, any number of the storage systems 1220 may be installed on a gondola rack or other like structure, or on two or more of such gondola racks or structures. Each of the storage systems 1220 may independently generate and transmit load signals corresponding to masses or weights thereon, and such load signals may be processed to determine changes in loading conditions accordingly.

Figure 13A:
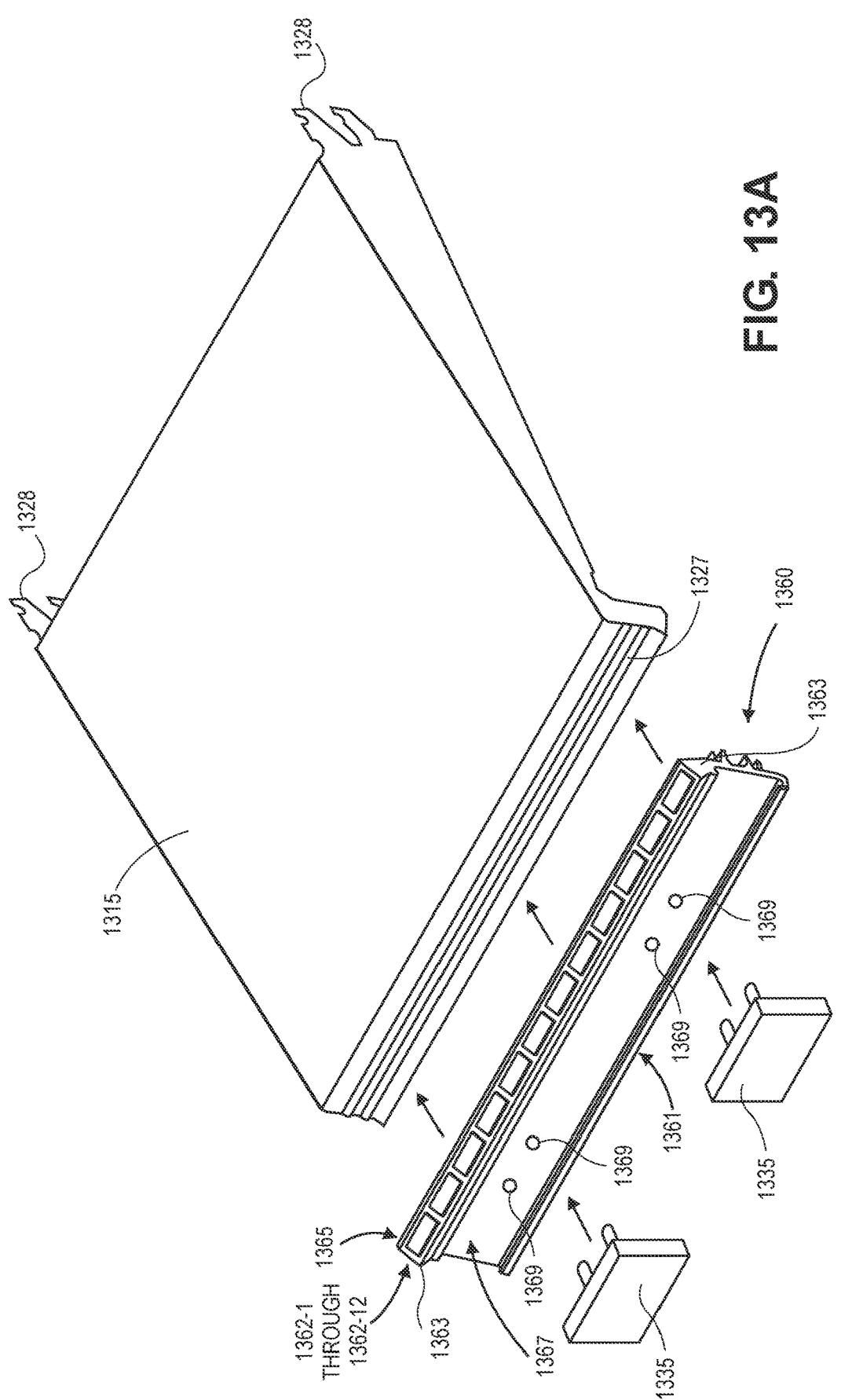
FIGS. 13A and 13B are views of components of one storage system in accordance with implementations of the present disclosure.
Figure 13B:
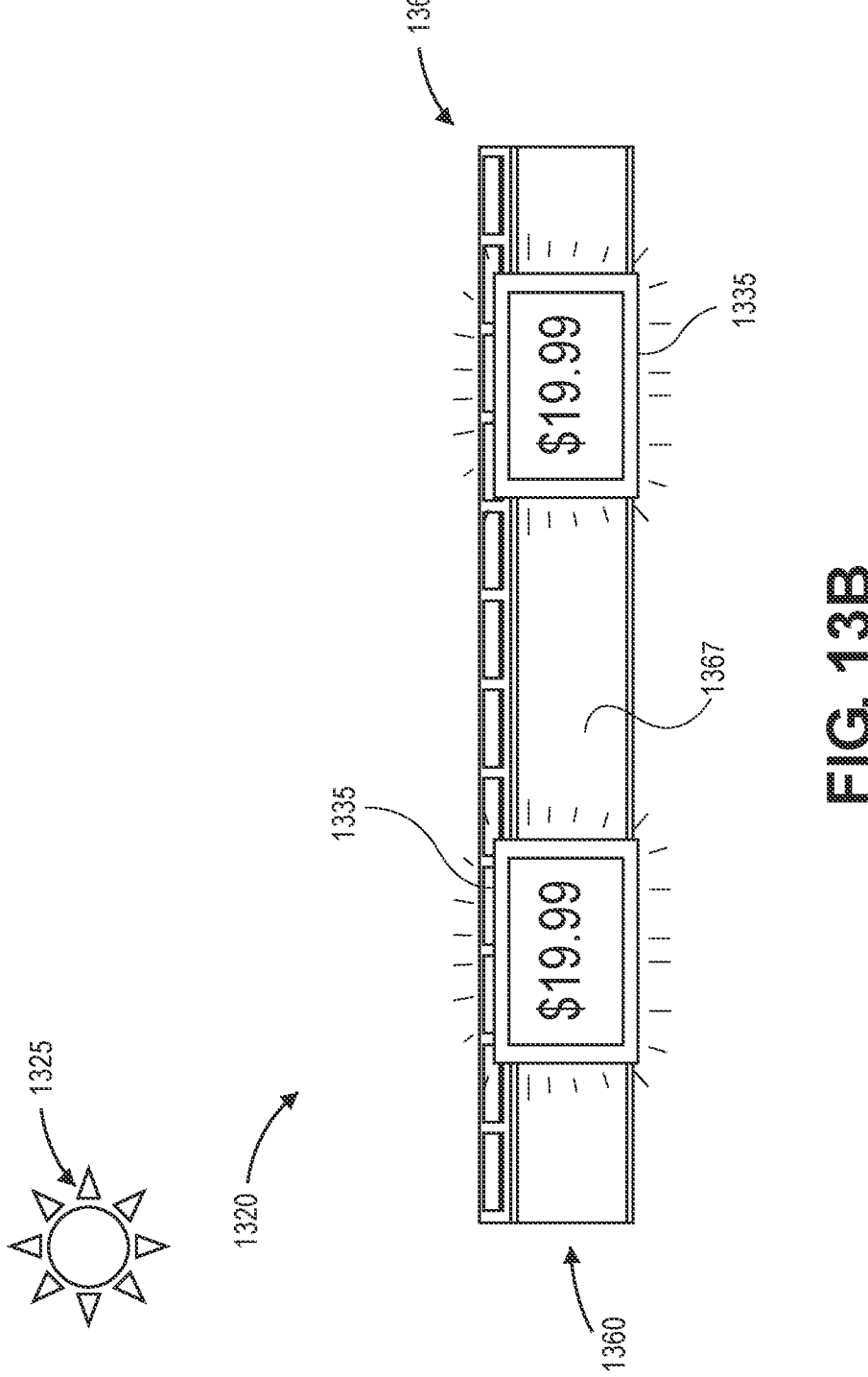

The photovoltaic power systems of the present disclosure may be used to provide electrical power to systems or components other than load sensors, as well. Referring to FIGS. 13A and 13B, views of components of one storage system in accordance with implementations of the present disclosure are shown. Except where otherwise noted, reference numerals preceded by the number "13" shown in FIGS. 13A and 13B indicate components or features that are similar to components or features having reference numerals preceded by the number "12" shown in FIGS. 12A through 12C, by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIGS. 13A and 13B, a photovoltaic power system 1360 similar to the photovoltaic power system 1160 of FIG. 11 or the photovoltaic power system 1260 of FIGS. 12A through 12C includes a frame 1361 (or housing), a plurality of photovoltaic cells 1362-1 through 1362-12, a pair of end caps 1363 and a protective cover 1365 over the photovoltaic cells 1362-1 through 1362-12. Additionally, a front edge of the photovoltaic power system 1360 further includes a ticket channel 1367 and ports 1369 for mounting one or more components to the photovoltaic power system 1360, or for electrically coupling such components to the one or more photovoltaic cells 1362-1 through 1362-12.

As is shown in FIG. 13A, the photovoltaic power system 1360 is configured for mounting to a modular shelf 1315, e.g., to a front edge of the shelf 1315. Additionally, as is also shown in FIG. 13A, a pair of digital screens 1335 are aligned for mounting to the ticket channel 1367. As is shown in FIG. 13B, upon coupling the digital screens 1335 to the ticket channel 1367, and exposing the photovoltaic cells 1362-1 through 1362-12 to light, e.g., by a light source 1325, the digital screens 1335 may display content relating to items to be stored on the shelf 1315 (e.g., prices, names, masses or volumes, serving sizes, nutrition facts, operating restrictions or countries of origin), which may be programmed into one or more chips or memory components (not shown) of the digital screens 1335, or transmitted to the digital screens 1335 over one or more networks.

In some implementations, load sensors of the present disclosure may be modular in nature, and may include housings or other structures that are sized or shaped for physical or electrical coupling with one another or with one or more platforms when the load sensors are applied in association with a planar surface. Referring to FIGS. 14A through 14D, views of components of one storage system in accordance with implementations of the present disclosure are shown. Except where otherwise noted, reference numerals preceded by the number "14" shown in FIGS. 14A through 14D indicate components or features that are similar to components or features having reference numerals preceded by the number "13" shown in FIGS. 13A and 13B, by the number "12" shown in FIGS. 12A through 12C, by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

Figure 14A:
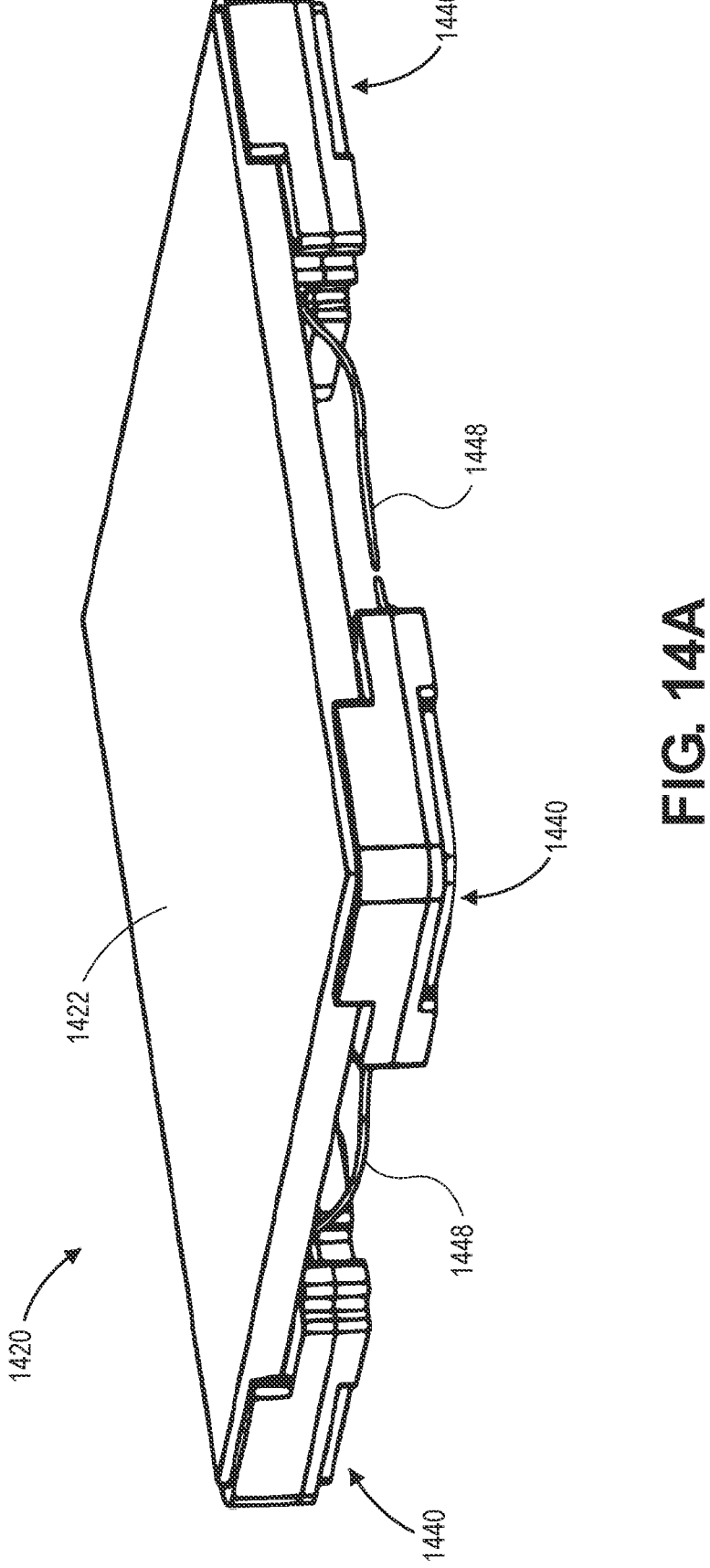
FIGS. 14A through 14D are views of components of one storage system in accordance with implementations of the present disclosure.

As is shown in FIG. 14A, a storage system 1420 of the present disclosure includes a platform 1422 placed on four load sensors 1440, which are provided at each corner of the platform 1422. The load sensors 1440 are electrically coupled by connectors 1448.

Figure 14B:
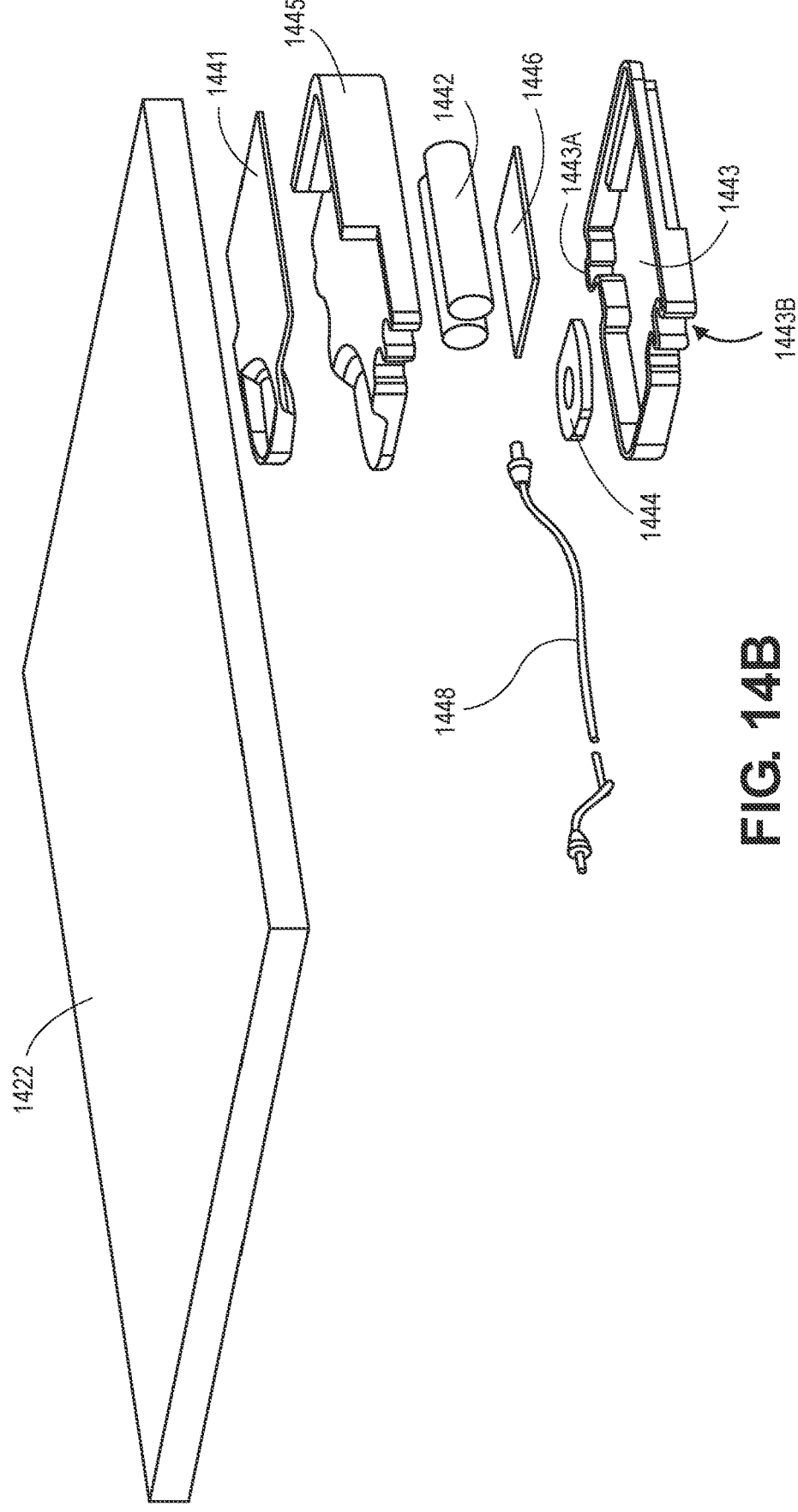

As is shown in FIG. 14B, the platform 1422 and an exploded view of one of the load sensors 1440 is shown. The load sensor 1440 includes an upper surface 1441, a lower surface 1443 and a main housing 1445. The upper surface 1441 is provided at a substantially horizontal angle and configured to accommodate a corner portion of a platform, such as the platform 1422, thereon. The main housing 1445 includes a raised edge at a corner, e.g., a ninety degree (90°) angle, such that when the platform 1422 rests on the upper surface 1441, the raised edge at the corner contacts the platform 1422 and acts as a barrier or guide restricting movement of the platform 1422 in lateral directions. The lower surface 1443 may have a shape or orientation that permits the load sensors 1440 to be stacked atop one another when the load sensors 1440 are not being utilized in connection with a storage system of the present disclosure. Likewise, the upper surface 1441, the lower surface 1443 and/or the housing 1445 may include one or more external features that permit the load sensors 1440 to be laterally interlocked with one another, including but not limited to one or more male extensions 1443A and/or female notches (or slots or openings) 1443B on perimeters of the upper surface 1441, the lower surface 1443 and/or the housing 1445, with the male extensions 1443A of one of the load sensors 1440 being sized, shaped, located, oriented or otherwise configured for insertion or mating with the female notches 1443B of another of the load sensors 1440.

Figure 14C:
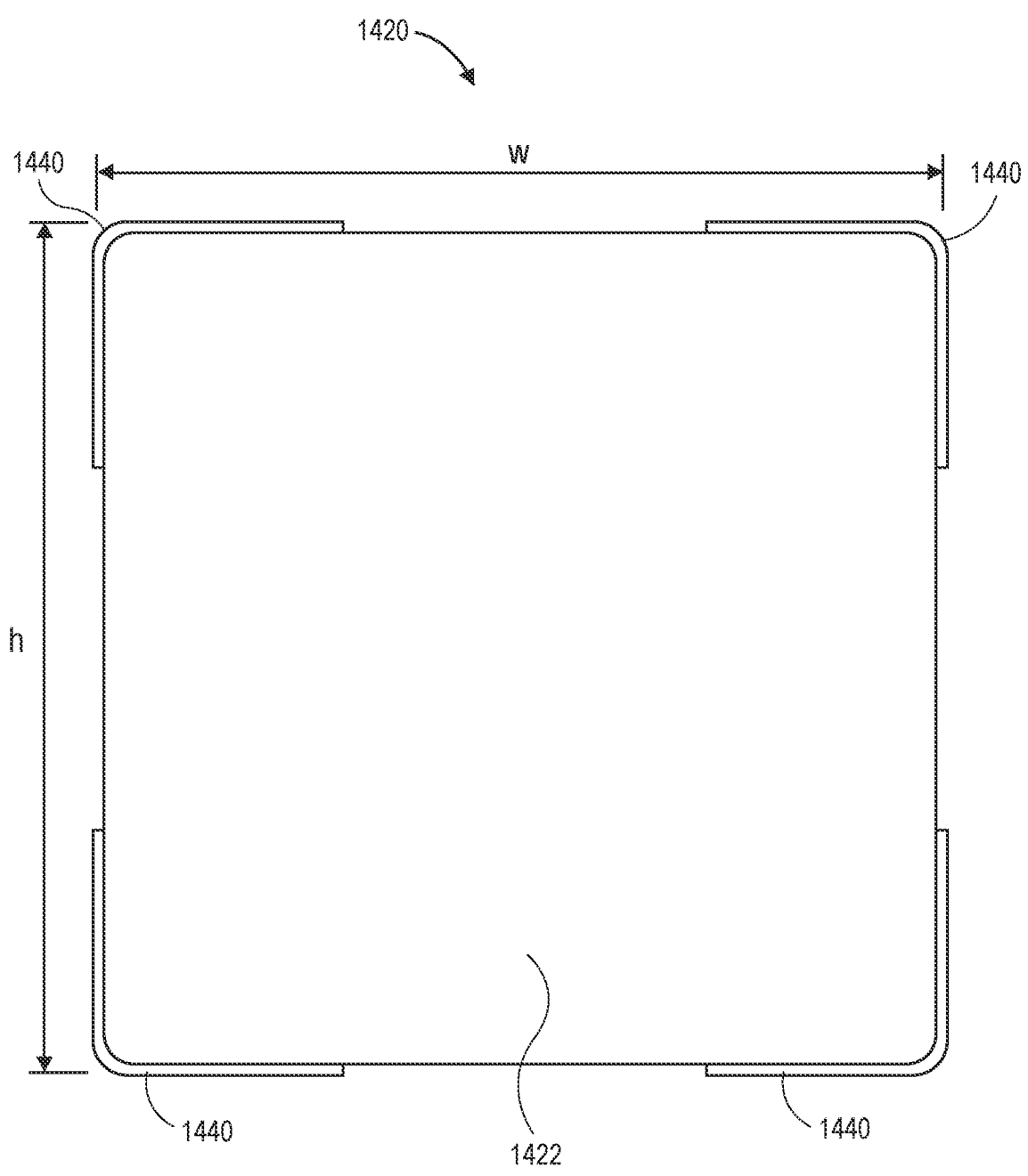
Figure 14D:
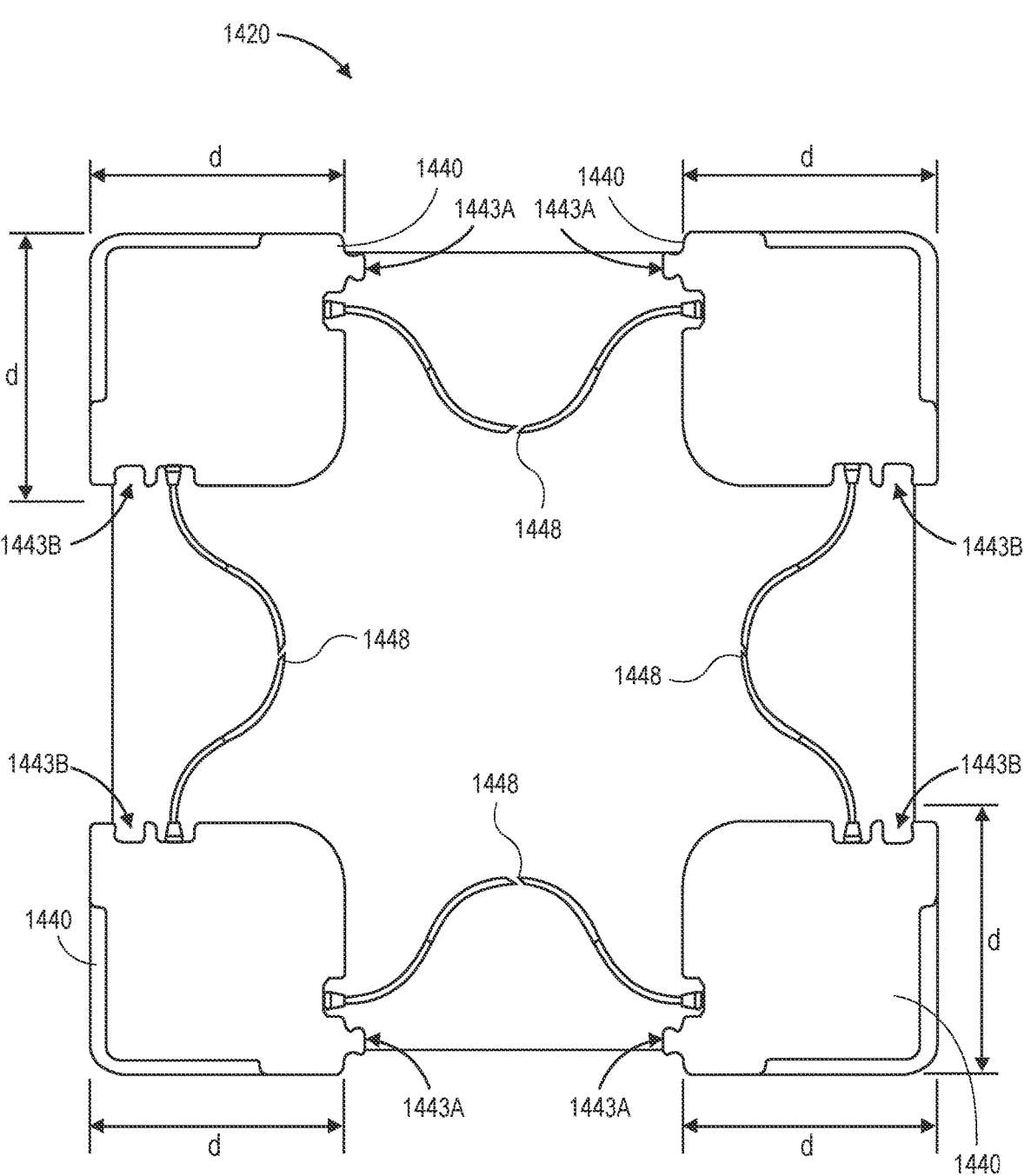

Additionally, as is also shown in FIG. 14B, the load sensor 1440 further includes a pair of batteries 1442, a load cell 1444 and a circuit board 1446 disposed within the main housing 1445, between the upper surface 1441 and the lower surface 1443. The load sensor 1440 further includes one or more ports for accommodating ends of the connectors 1448.

Where load sensors are of a modular design, such as the load sensors 1440 of FIGS. 14A and 14B, the load sensors may accommodate platforms of any size. As is shown in FIG. 14C, a top view of the storage system 1420 shows that the platform 1422 has a height h and a width w. As is shown in FIG. 14D, a bottom view of the storage system 1420 (e.g., an underside of the storage system 1420) shows a maximum distance d from one of the raised edges at the corner of the load sensors 1440 to an opposite edge of the main housing 1445. Thus, the load sensors 1440 shown in FIGS. 14A through 14D may accommodate any rectangular platform having a height h and a width w that are each less than twice the distance d.

Additionally, as is also shown in FIG. 14D, the load sensors 1440 are connected to one another by the connectors 1448 beneath the platform 1422. Thus, each of the load sensors 1440 need not include a separate or discrete power supply or circuit board, processors or transceivers. Instead, each of the load sensors 1440 may include their own load cells, which may generate electrical load signals consistent with a loading condition on the platform 1422 sensed thereby, and one or more of the load sensors 1440 may transmit such load signals at pulsed intervals or durations to a server or other external computer device or machine (not shown).

Referring to FIGS. 15A through 15D, views of components of one storage system in accordance with implementations of the present disclosure are shown. Except where otherwise noted, reference numerals preceded by the number "15" shown in FIGS. 15A through 15D indicate components or features that are similar to components or features having reference numerals preceded by the number "14" shown in FIGS. 14A through 14D, by the number "13" shown in FIGS. 13A and 13B, by the number "12" shown in FIGS. 12A through 12C, by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

Figure 15A:
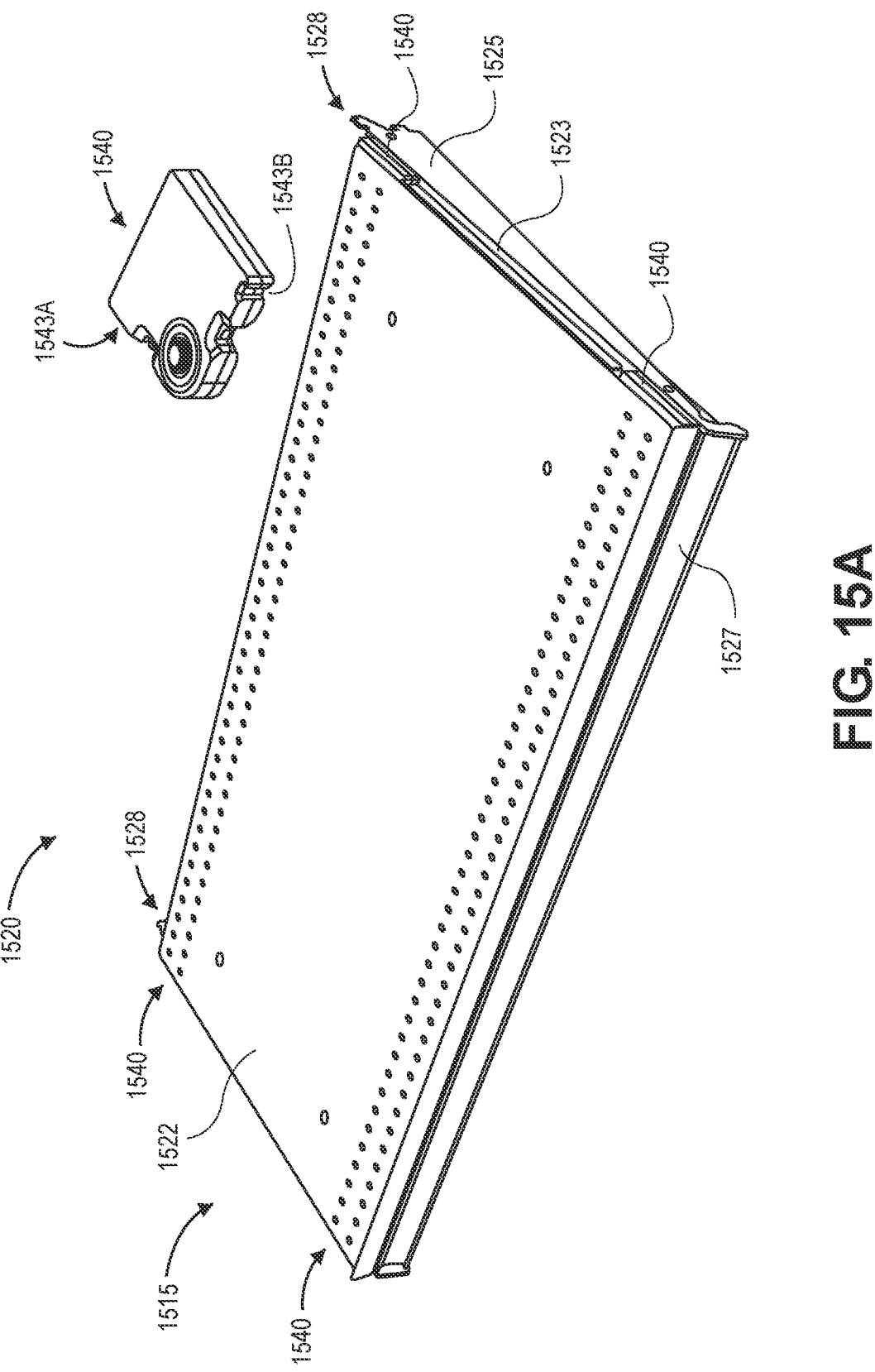
FIGS. 15A through 15D are views of components of one storage system in accordance with implementations of the present disclosure.
Figure 15B:
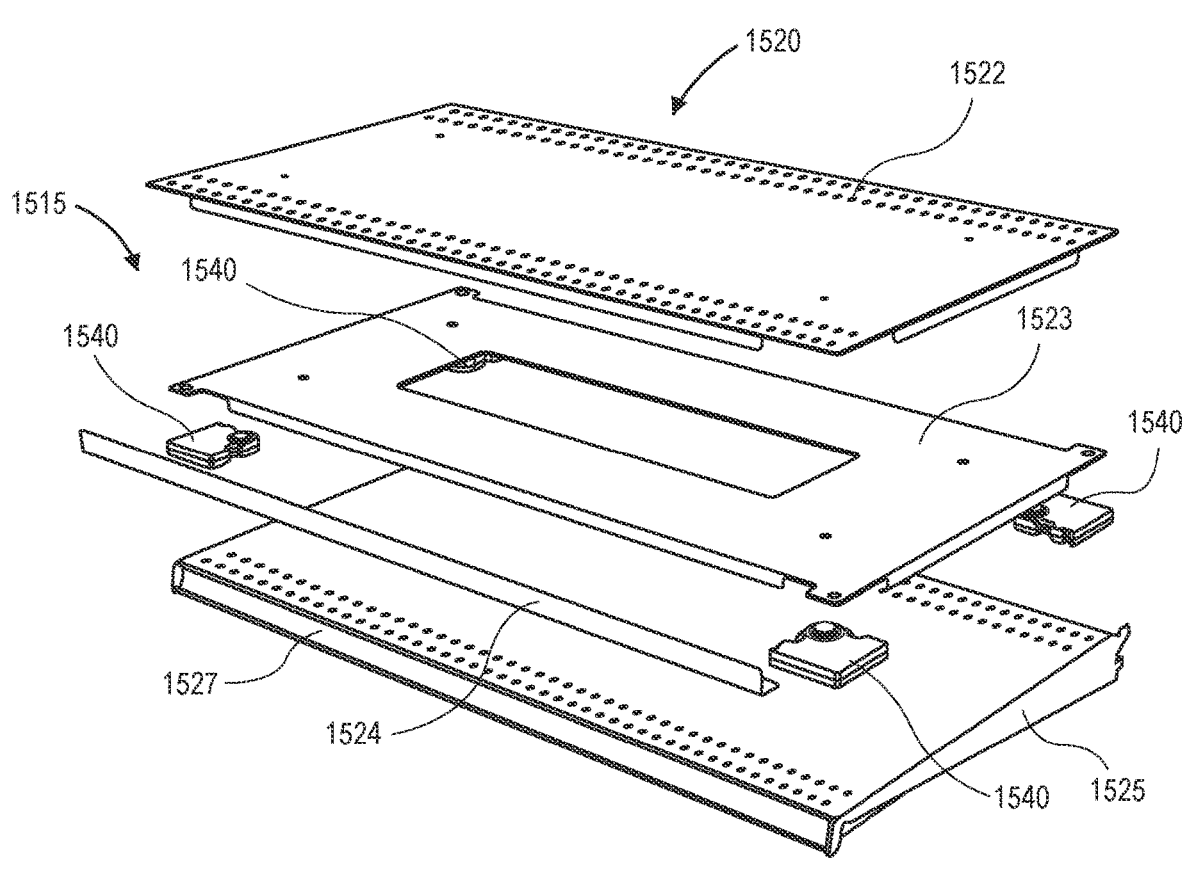
Figure 15C:
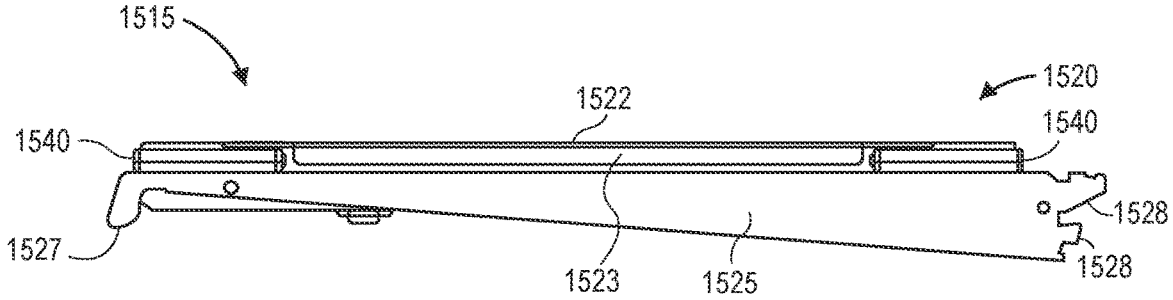
Figure 15D:
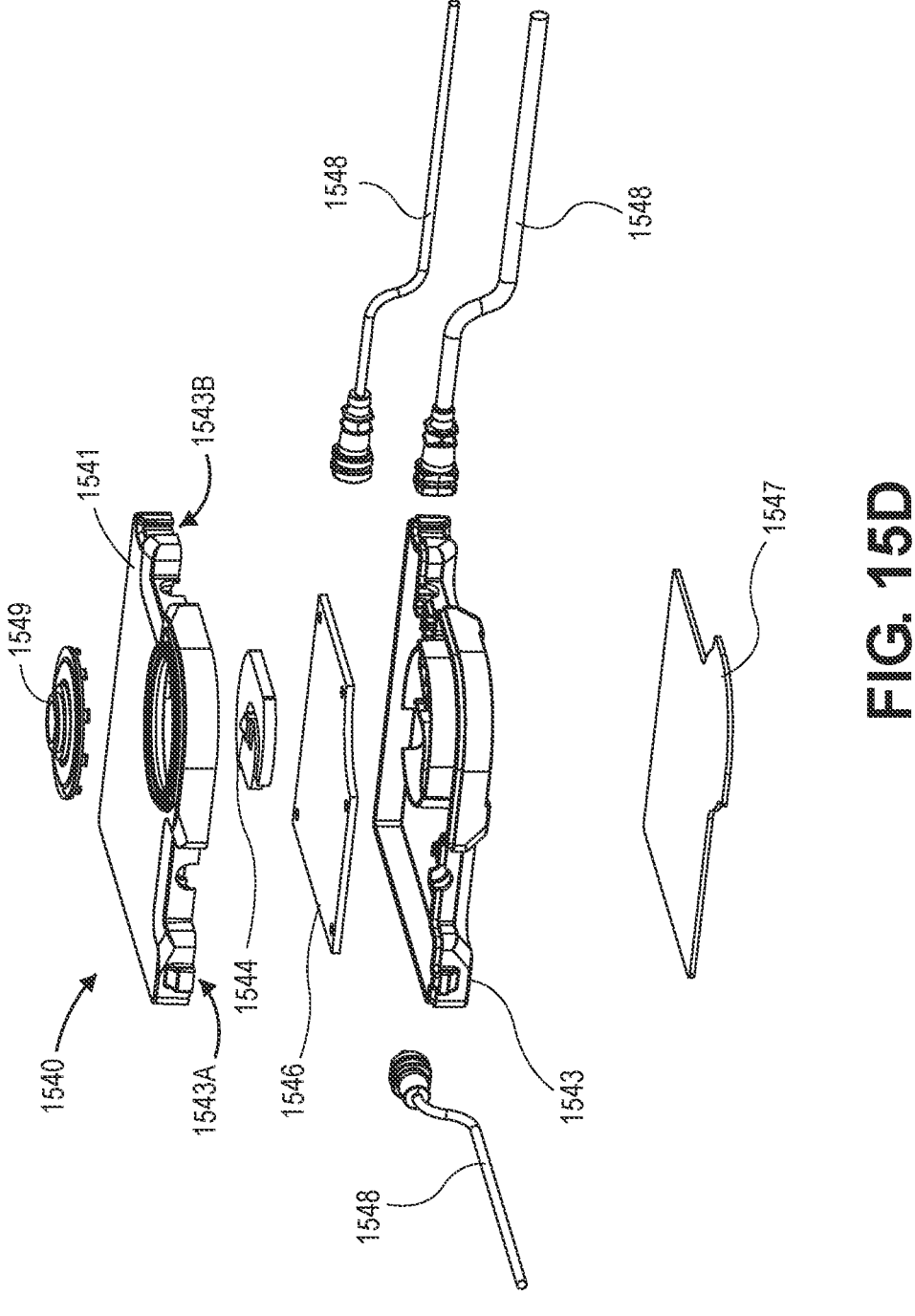

A perspective view of a storage system 1520 and a load sensor 1540 is shown in FIG. 15A. An exploded view of the storage system 1520 is shown in FIG. 15B. A side view of the storage system 1520 is shown in FIG. 15C. An exploded view of the load sensor 1540 is shown in FIG. 15D.

As is shown in FIGS. 15A through 15D, the storage system 1520 includes a frame 1515, a merchandise surface 1522, a substructure 1523, a front stop 1524 and four of the load sensors 1540. The frame 1515 is a modular shelf or other system that includes hooks 1528 or other extensions for mounting the frame 1515 to a gondola rack or other like structure.

The merchandise surface 1522 is a planar sheet or platform formed from any suitable materials (e.g., woods, metals, plastics) that is configured to rest on or be mounted to the substructure 1523. The merchandise surface 1522 and the substructure 1523 may be solid, continuous objects or surfaces or, alternatively, may include one or more holes, openings or perforations therein. In the implementation shown in FIGS. 15A through 15D, the merchandise surface 1522 includes a plurality of holes having circular shapes (or other shapes) that are provided in patterns at front or rear edges, and mimic or match similar patterns of holes provided in the frame 1515. Alternatively, in some implementations, the merchandise surface 1522 and the frame 1515 need not have patterns of holes that mimic or match one another. For example, in some implementations, any of the surfaces on which items are placed may include wire racks, meshed devices or other substantially open components that are sized, shaped or constructed to provide support for one or more items thereon, and to impart loads due to the weight of such items onto one or more sensors provided underneath such devices or components.

Additionally, the substructure 1523 is itself configured to rest on or be mounted to the load sensors 1540, which are placed at or near the four corners of an upper surface of the frame 1515. In the implementation shown in FIGS. 15A through 15D, the substructure 1523 includes a substantially centrally located rectangular opening, which may reduce the weight of the substructure 1523 and, therefore, dead loads or tares acting on the load sensors 1540. Alternatively, the substructure 1523 need not have any openings, or such openings need not be centrally located or rectangularly shaped.

As is shown in FIG. 15B, the substructure 1523 may further include one or more rails or extensions on a front edge or on side edges that are folded downward, e.g., at approximately ninety degree (90°) angles, and are intended to maintain the substructure 1523 in place, resting on the load sensors 1540 provided on the frame 1515. As is also shown in FIG. 15B, the merchandise surface 1522 further includes similar rails or extensions on a front edge or on side edges that are folded downward and are intended to maintain the merchandise surface 1522 in place, resting on the substructure 1523.

Additionally, the front stop 1524 is mounted at or near an access point (or entry point) for the storage system 1520, e.g., to a front edge of the merchandise surface 1522, the substructure 1523 or the frame 1515, in any manner, such as by one or more brackets or other bolted, clipped, fastened, riveted or threaded connections. The front stop 1524 may provide a physical barrier for retaining any number of items of any type that are placed on the merchandise surface 1522. Alternatively, or additionally, one or more stops or walls may be provided on opposing sides or a rear edge of the storage system 1520. The frame 1515 further includes a ticket channel 1527 or other system for accommodating one or more signs, labels, indicators or other systems, including but not limited to a photovoltaic power system having one or more photovoltaic cells.

The merchandise surface 1522 may be utilized to support any number of items of any type thereon, including but not limited to food products (e.g., prepared foods, baked goods, produce or the like), office products, consumer electronics, home and garden products, hardware or tools, or any other items. The substructure 1523 provides lateral stability and orientation to the load sensors 1540, and ensures that contact surfaces of the load sensors 1540 will remain in the same position within a common plane regardless of the extent of loading placed on the merchandise surface 1522.

As is shown in FIG. 15D, an exploded view of one of the load sensors 1540 is shown. The load sensor 1540 includes an upper surface 1541, a housing 1545 and a lower surface 1547. The upper surface 1541 is provided at a substantially horizontal angle and includes an articulated contact surface 1549 extending vertically upward therefrom. The housing 1545 includes a raised edge about a perimeter, e.g., a ninety degree (90°) angle, that defines a cavity for accommodating a load cell 1544 and a circuit board 1546 having any number of components for controlling the operation of the load sensor 1540 or interpreting information or data captured thereby, including one or more processors, transistors, transducers, transceivers or converters, or other components. A plurality of wired connectors 1548 are coupled to the load sensors 1540 for providing electrical power to the load sensors 1540 or enabling communication between the load sensors 1540. Alternatively, or additionally, the load sensors 1540 may include one or more power sources, e.g., batteries, or may be configured to communicate wirelessly according to any wireless protocol.

The upper surface 1541 and/or the housing 1545 may include one or more external features that permit the load sensors 1540 to be laterally interlocked with one another, including but not limited to one or more male extensions 1543A and/or female notches (or slots or openings) 1543B on perimeters of the upper surface 1541 and/or the housing 1545, with the male extensions 1543A of one of the load sensors 1540 being sized, shaped, located, oriented or otherwise configured for insertion or mating with the female notches 1543B of another of the load sensors 1540. Moreover, the lower surface 1547 may be or include a friction pad or any other surface or substance that may be applied to an underside of the housing 1545 to achieve a desired level of friction between the load sensors 1540 and/or the frame 1515 or the merchandise surface 1522.

Figures 16A, 16B:
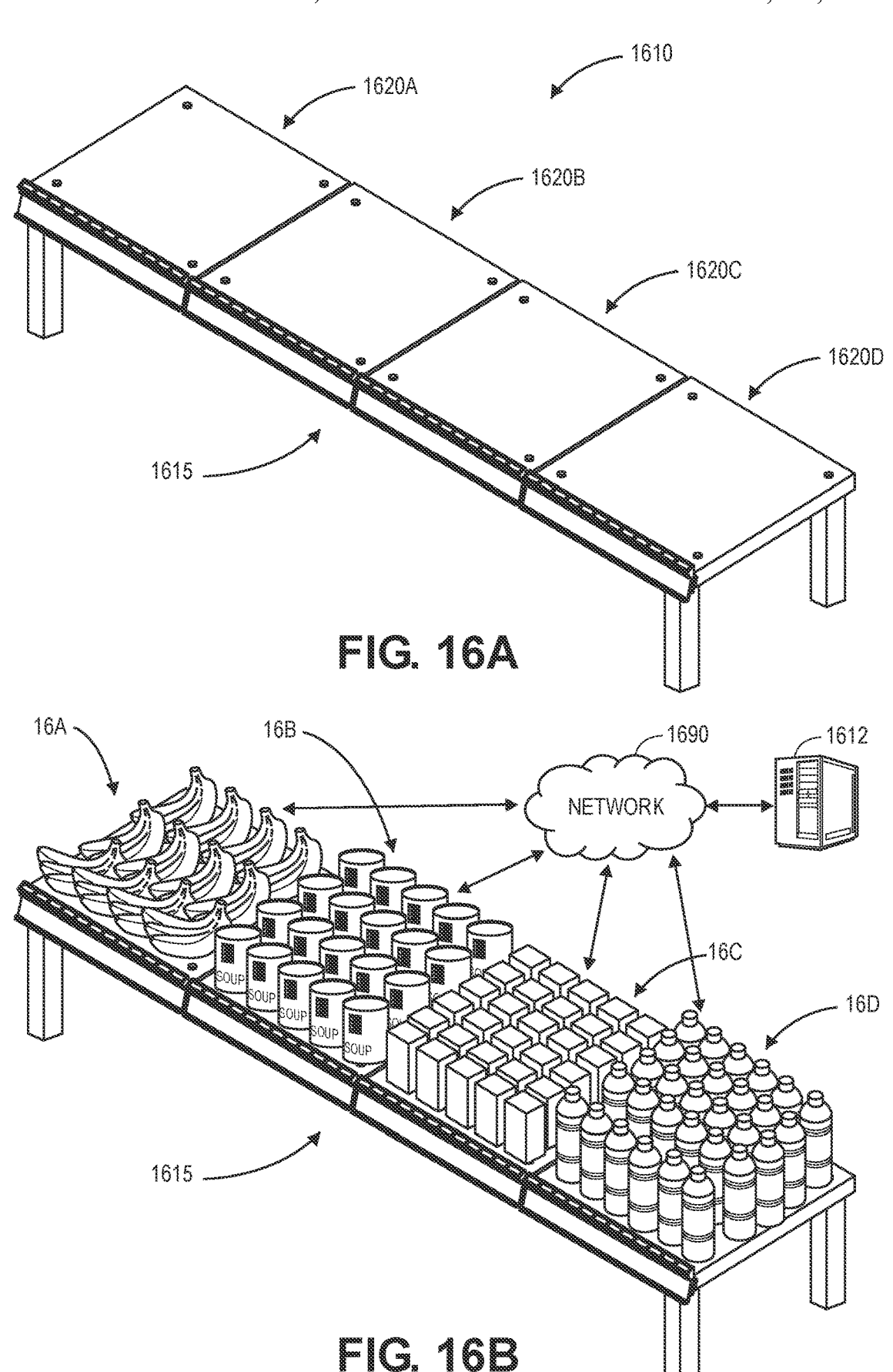
FIGS. 16A and 16B are views of components of one storage system in accordance with implementations of the present disclosure.

Any number of the storage systems or aspects thereof that are disclosed herein may be utilized in connection with one another. Referring to FIGS. 16A and 16B, views of components of one storage system in accordance with implementations of the present disclosure are shown. Except where otherwise noted, reference numerals preceded by the number "16" shown in FIGS. 16A and 16B indicate components or features that are similar to components or features having reference numerals preceded by the number "15" shown in FIGS. 15A through 15D, by the number "14" shown in FIGS. 14A through 14D, by the number "13" shown in FIGS. 13A and 13B, by the number "12" shown in FIGS. 12A through 12C, by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 16A, a materials handling facility 1610 includes a table 1615 having a plurality of storage systems 1620A, 1620B, 1620C, 1620D that are aligned in series with one another placed thereon. As is shown in FIG. 16B, each of the storage systems 1620A, 1620B, 1620C, 1620D may be loaded with a plurality of items 16A, 16B, 16C, 16D thereon. One or more load sensors of the respective storage systems 1620A, 1620B, 1620C, 1620D may generate and transmit electrical load signals representing forces sensed thereby at pulsed intervals to a server 1612 over a network 1690. The server 1612 may process the electrical load signals to determine changes in loading on the storage systems 1620A, 1620B, 1620C, 1620D, and may record one or more transactions associated with removing items 16A, 16B, 16C, 16D from the storage systems 1620A, 1620B, 1620C, 1620D, as necessary.

Figure 17A:
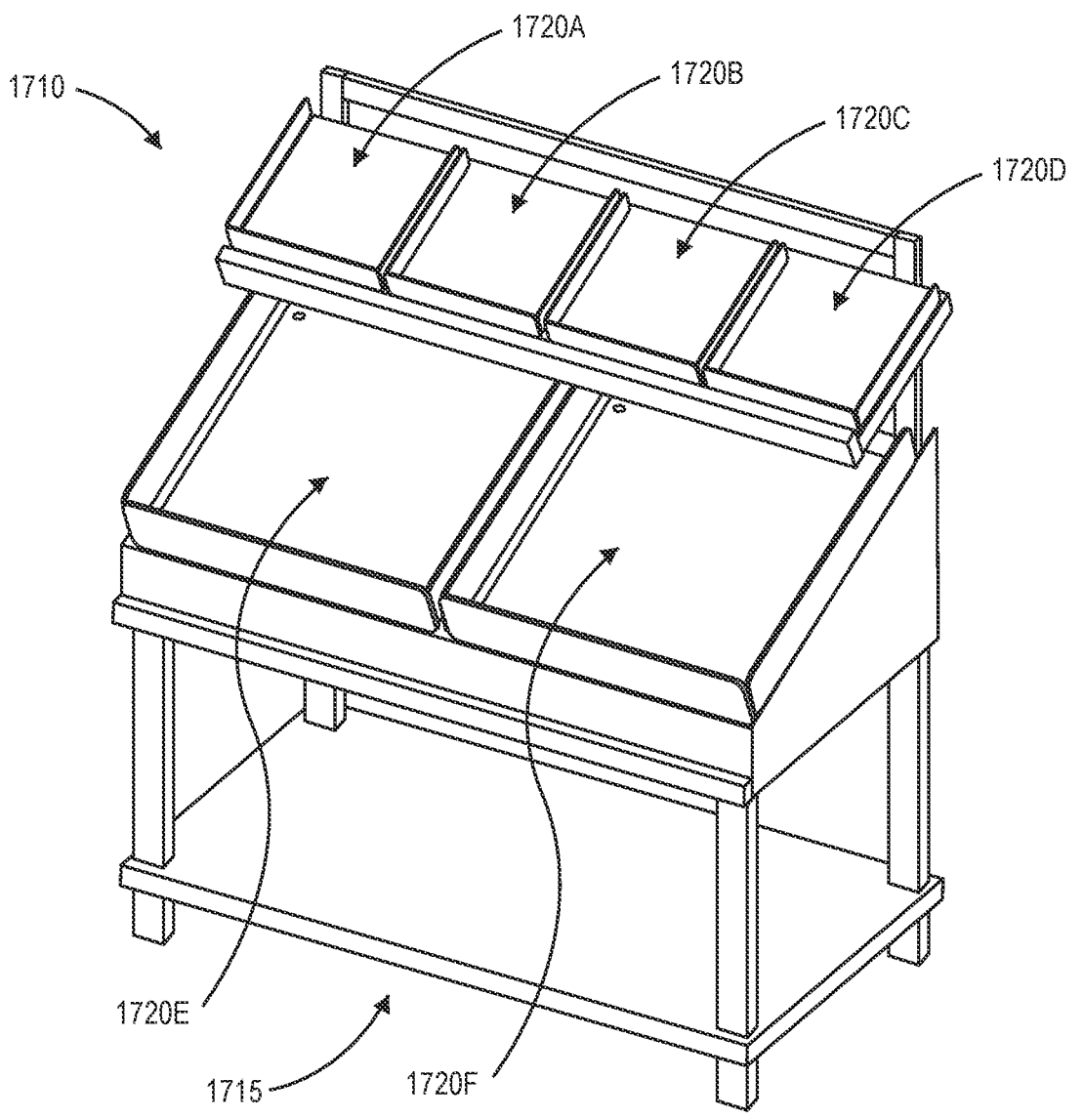
FIGS. 17A and 17B are views of one storage system in accordance with implementations of the present disclosure.
Figure 17B:
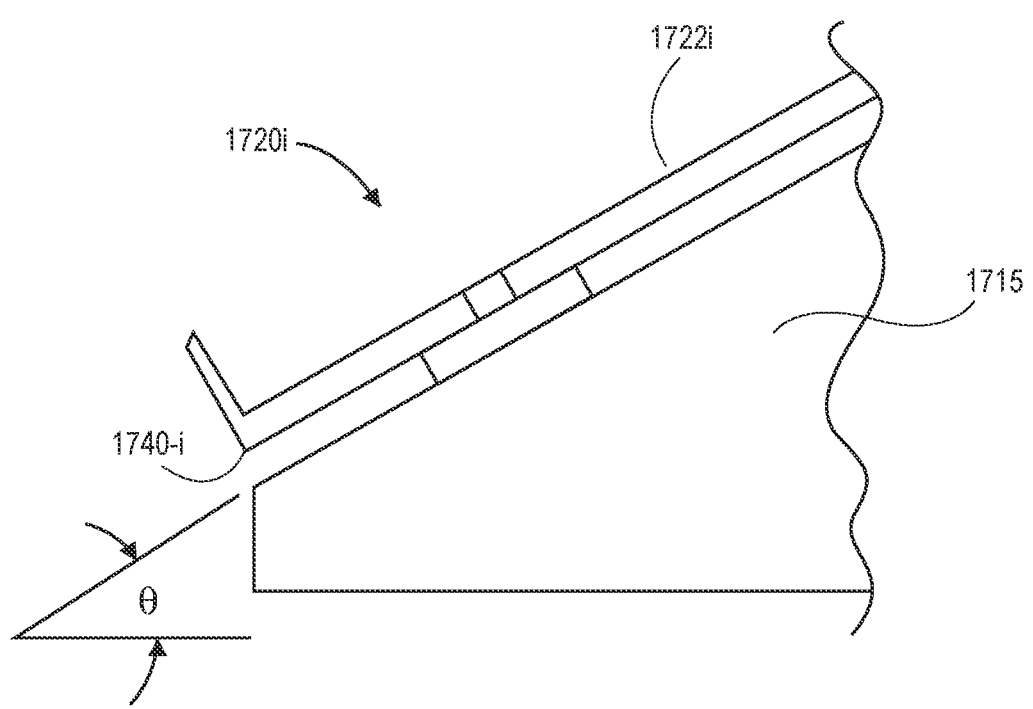
Figure 17B:
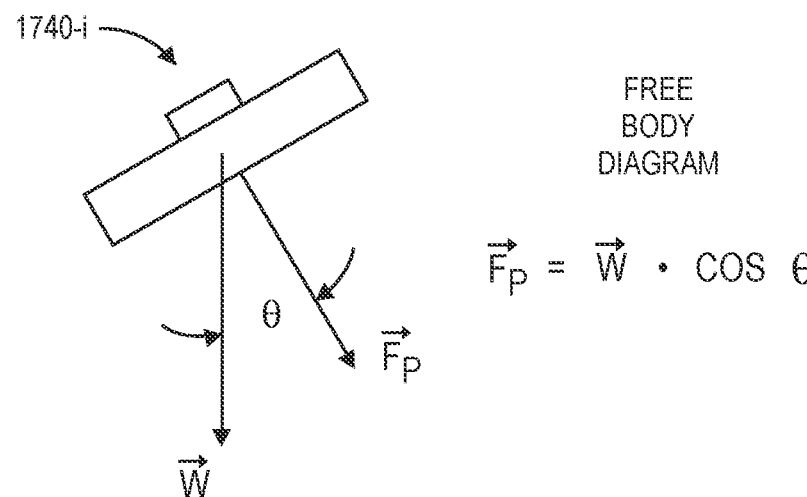

Moreover, the storage systems of the present disclosure may be aligned at any angles or orientations, including both horizontal and non-horizontal angles or orientations. Referring to FIGS. 17A and 17B are views of components of one storage system in accordance with implementations of the present disclosure is shown. Except where otherwise noted, reference numerals preceded by the number "17" shown in FIGS. 17A and 17B indicate components or features that are similar to components or features having reference numerals preceded by the number "16" shown in FIGS. 16A and 16B, by the number "15" shown in FIGS. 15A through 15D, by the number "14" shown in FIGS. 14A through 14D, by the number "13" shown in FIGS. 13A and 13B, by the number "12" shown in FIGS. 12A through 12C, by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 17A, a materials handling facility 1710 includes a frame 1715 having a plurality of storage systems 1720A, 1720B, 1720C, 1720D, 1720E, 1720F mounted thereto or placed thereon. Each of the storage systems 1720A, 1720B, 1720C, 1720D, 1720E, 172F may be in communication with one or more servers or external computer devices or systems (not shown), and may generate and transmit electrical load signals based on an extent of loading on the respective ones of the storage systems 1720A, 1720B, 1720C, 1720D, 1720E, 1720F. Additionally, as is shown in FIG. 17A, each of the storage systems 1720A, 1720B, 1720C, 1720D, 1720E, 1720F is aligned at a non-horizontal angle to enable customers to place items therein or remove items therefrom. The storage systems 1720A, 1720B, 1720C, 1720D have surfaces that are substantially small in area and provided at elevated heights with respect to the storage systems 1720E, 1720F, which are substantially larger than the storage systems 1720A, 1720B, 1720C, 1720D.

The load sensors of the present disclosure may be configured to determine loading applied to a surface of a storage system, even where the surface of the storage system is not aligned at a horizontal angle. As is shown in FIG. 17B, a storage system 1720-$i$, which may be a representative one of the storage systems 1720A, 1720B, 1720C, 1720D, 1720E, 1720F mounted to the frame 1715 as shown in FIG. 17A, includes a merchandise surface 1722-$i$ aligned at a non-zero angle $\theta$ with respect to horizonal. A vector W corresponding to loading applied to the merchandise surface 1722-$i$ due to the weight of items thereon acts in a vertical direction. Therefore, where a representative one of the load sensors 1740-$i$ returns a signal corresponding to a force $F_P$ sensed thereby, e.g., in a direction normal to the merchandise surface 1722-$i$, the vector W may be calculated as function of a cosine of the angle $\theta$. The forces $F_P$ sensed by each of the load sensors of each of the storage systems 1720A, 1720B, 1720C, 1720D, 1720E, 1720F may be calculated in a similar manner, and provided to an external computer device or systems (e.g., a server) by wired or wireless connections.

The arrangement and use of storage systems of the present disclosure at varying angles or elevations enhances their functionality and enables the storage systems to be utilized in a number of different applications. For example, in some implementations, smaller items, or items having multiple complementary options, may be accommodated in the storage systems 1720A, 1720B, 1720C, 1720D, while larger items, or more essential items, may be accommodated in the storage systems 1720E, 1720F. Any combination of storage systems having load sensors that are configured to generate and transmit electrical load signals in response to loading conditions may be utilized in tandem for accommodating items of any number or type in accordance with implementations of the present disclosure.

As is discussed above, where a storage system includes a power source having a plurality of photovoltaic cells that are provided at locations corresponding to one or more items or groups of items, voltage or power levels generated by the respective cells in the presence of light may be monitored to determine when a shadow blocks, obscures or reduces light cast upon one or more of the cells. Such shadows may indicate the presence of an arm or other body part over the one or more cells, and changes in voltage or power levels observed at such cells may be used to determine a discrete location from which the items are removed therefrom or placed thereon by a customer or another actor during a transaction, to identify the items, or to identify the customer or other actor associated with the transaction.

Figure 18:
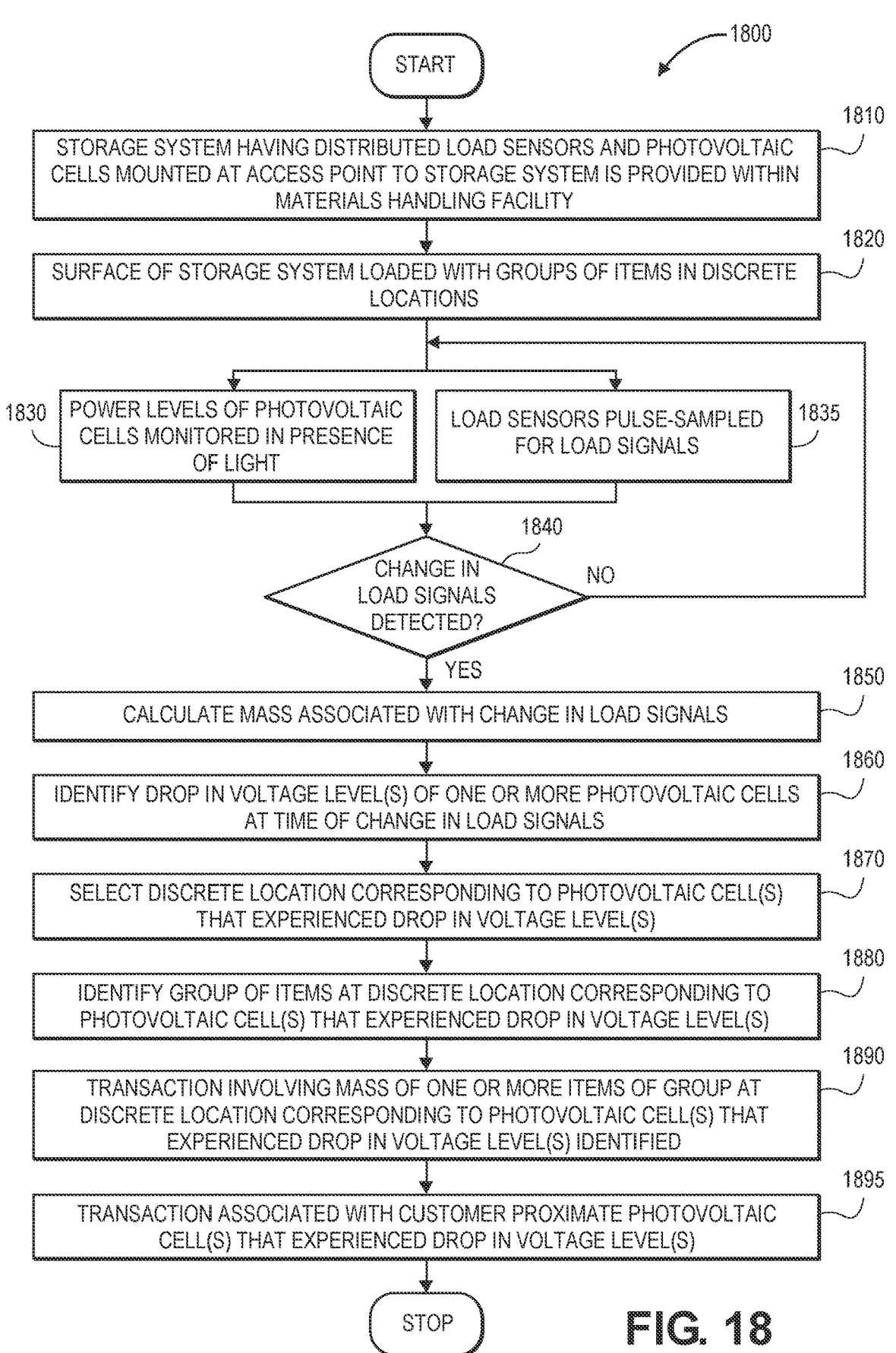
FIG. 18 is a flow chart of one process for using one or more storage systems in accordance with implementations of the present disclosure.

Referring to FIG. 18, a flow chart 1800 of one process for using one or more storage systems in accordance with implementations of the present disclosure is shown.

At box 1810, a storage system having distributed load sensors and photovoltaic cells mounted at an access point to the storage system is provided within a materials handling facility. For example, the storage system may include a bank or array of photovoltaic cells provided in a housing mounted at or near a front edge of a platform or other surface, such as the storage system 120 of FIGS. 1A through 1G. At box 1820, a surface of the storage system is loaded with one or more groups of items provided in discrete locations. For example, the items may be placed in defined regions or spaces such as lanes or blocks on the surface that are dedicated for storage of identical or fungible items of the same or very similar kinds or types. In some implementations, where the storage system is provided in a home improvement store or other like establishment, cans of paint of different colors, cans of primer, and cans of sealants may be placed in defined regions or spaces on a surface that are dedicated to the storage of such cans. Where the storage system is provided in a grocery store, melons, celery and peppers may be placed in defined regions or spaces on a surface that are dedicated to the storage of such produce. The defined regions or spaces may be aligned parallel or perpendicular to one or more edges of the surface, or in any other manner, and each of the regions or spaces may correspond to one or more of the photovoltaic cells.

At box 1830, voltage levels generated by the photovoltaic cells are monitored in the presence of light. For example, as is discussed above, a photovoltaic cell absorbs photons of light energy from the sun or another natural or artificial light source and generates a current from such photons, with a voltage level being determined as a function of angles of the photovoltaic cells with respect to the light source, any objects located between the light source and the respective photovoltaic cells, a level of cleanliness of the respective photovoltaic cells (e.g., a photovoltaic cell itself, or a shield or other surface covering the cell), or any other factor.

In parallel, at box 1835, the load sensors are pulse-sampled for load signals. For example, each of the load sensors may transmit a signal representative of a respective loading condition at a regular interval of time, e.g., every ten milliseconds, which may be selected on any basis. In some implementations, each of the load sensors may be powered by the photovoltaic cells, separately or in tandem with one or more batteries or other voltage sources of any size or type.

At box 1840, whether a change in the load signals is detected is determined. A change in one or more of the load signals indicates a change in loading on the surface, as sensed by one or more of the load sensors. The change may indicate that one or more items was removed from the surface, e.g., by a customer who desires the item, or that one or more items were placed on the surface, e.g., by an associate, a worker or another staff member who is stocking the items on the surface, or by a customer who removed one or more items from the surface and returns the one or more items to the surface. If no change in the load signals is detected, then the process returns to boxes 1830 and 1835, where voltage levels generated by the photovoltaic cells are monitored in the presence of light, and where the load sensors continue to be pulse-sampled for load signals.

If a change in the load signals is detected, however, then the process advances to box 1850, where a mass is calculated based on the change in the load signals. For example, the mass may represent a mass of a single item that was removed from the surface or placed onto the surface, or an aggregate mass of a combination of items that were removed from the surface or placed onto the surface. At box 1860, a drop in a voltage level of one or more of the photovoltaic cells at a time at which the change in the load signals is detected is identified. For example, where light energy contacting a photovoltaic cell is blocked by an arm or other body part of a customer, an associate or another actor who is removing an item from the surface or placing an item onto the surface, voltage levels and/or voltage levels associated with the photovoltaic cell may be observed to temporarily decrease for a period of time corresponding to the presence of the arm or other body part between a light source and the photovoltaic cell.

At box 1870, a discrete location corresponding to the one or more photovoltaic cells that experienced the drop in voltage levels identified at box 1860 is selected. The photovoltaic cells may be mounted or otherwise provided within a vicinity of the discrete location, e.g., at or near a front edge of the discrete location. At box 1880, a group of items that are at the discrete location is identified. The group may include items of a common or similar type, items having a common or similar mass, items having a common or similar price, or any other collection of items. At box 1890, a transaction involving a mass calculated at box 1850 of the items of the group identified at box 1880 is identified. For example, a record of the items on the storage system may be updated to reflect a removal (or an addition) of the mass calculated at box 1850 based on the difference in load signals, and the group of items identified at box 1880 based on the drop in voltage levels. At box 1895, the transaction is associated with a customer proximate the photovoltaic cells that experienced the drop in voltage levels, and the process ends. For example, where locations of one or more customers are determined based on information or data captured by one or more sensors, one of the customers that is nearest the photovoltaic cells may be reasonably determined to be associated with the transaction.

A detected change (e.g., a reduction) in voltage levels due to shadows or other blockage of light energy on one or more photovoltaic cells may be used to determine one or more aspects of a transaction, either independently or in concert with information or data obtained from any number of other sources. For example, a detected change in a level of voltage generated by a photovoltaic cell may be used to identify an item proximate the photovoltaic cell as being a subject of a transaction. Alternatively, or additionally, a detected change in a level of voltage generated by a photovoltaic cell may be used to identify a customer proximate the photovoltaic cell as being associated with a transaction. Moreover, a time at which a change in a level of voltage generated by a photo-voltaic cell is detected, or a duration of the detected change, may be associated with a time or a duration of a transaction. A number or a size of the photovoltaic cells for which a change in a level of voltage generated thereby is detected may also be used to determine a number or a size of one or more items involved in a transaction. Furthermore, where changes in levels of voltage generated by a plurality of photovoltaic cells, a discrete location of an item or items associated with a transaction may be determined based on distances or proximities of the respective cells to each of a plurality of discrete locations.

Figure 19A:
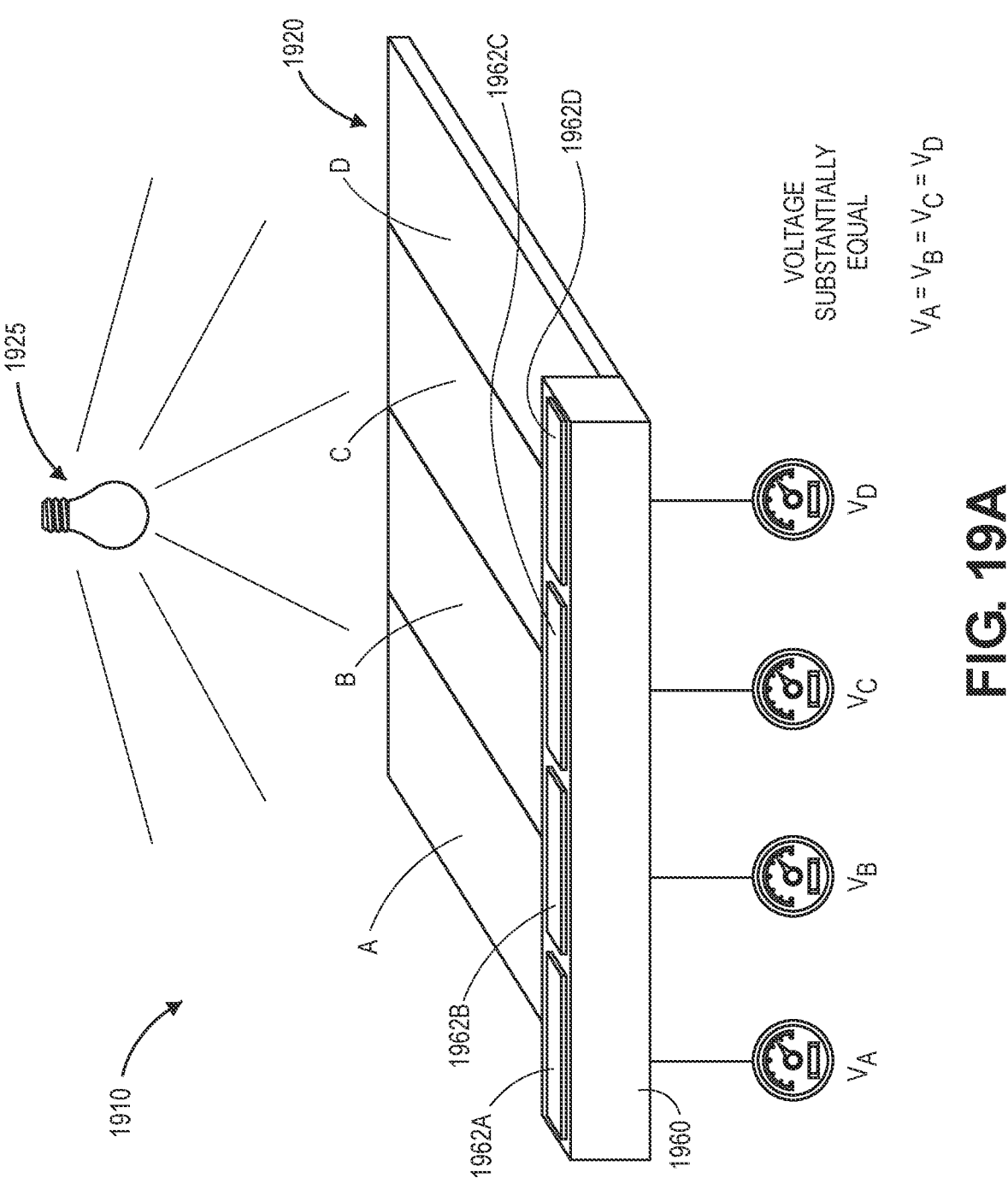
FIGS. 19A through 19C are views of components of one storage system in accordance with implementations of the present disclosure.
Figure 19B:
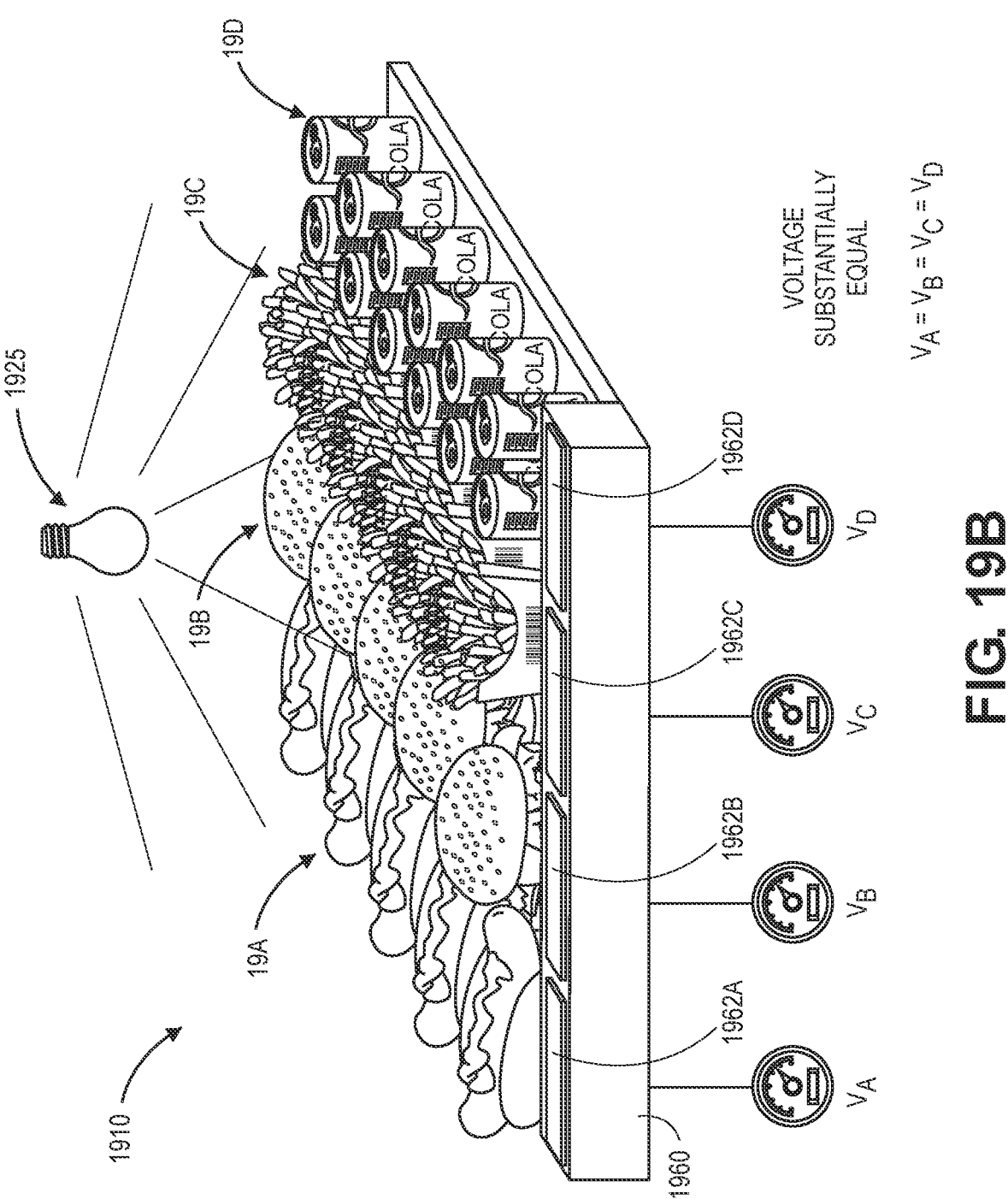
Figure 19C:
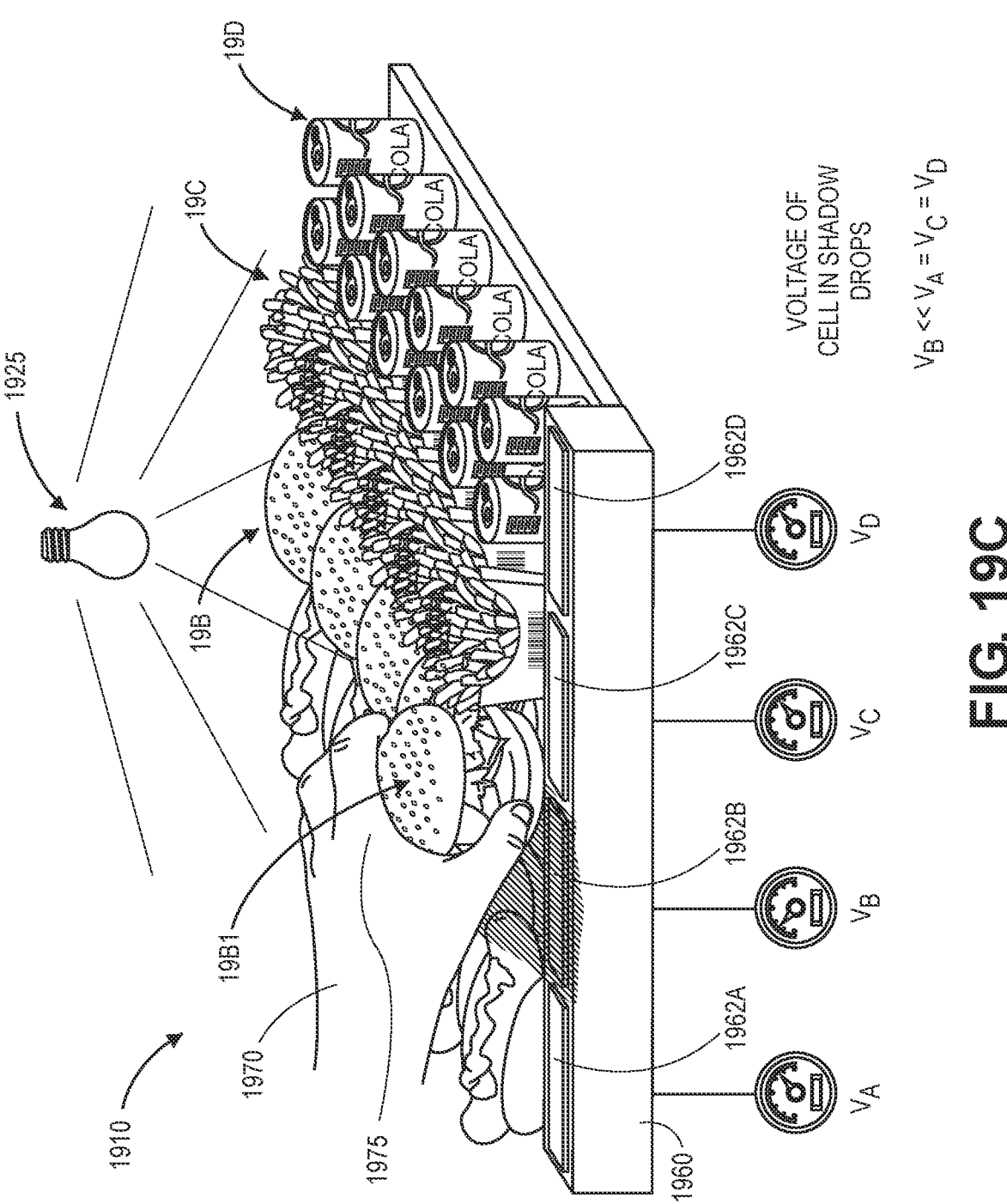

Referring to FIGS. 19A through 19C, a view of components of one storage system in accordance with implementations of the present disclosure is shown. Except where otherwise noted, reference numerals preceded by the number "19" shown in FIGS. 19A through 19C indicate components or features that are similar to components or features having reference numerals preceded by the number "17" shown in FIGS. 17A and 17B, by the number "16" shown in FIGS. 16A and 16B, by the number "15" shown in FIGS. 15A through 15D, by the number "14" shown in FIGS. 14A through 14D, by the number "13" shown in FIGS. 13A and 13B, by the number "12" shown in FIGS. 12A through 12C, by the number "11" shown in FIG. 11, by the number "10" shown in FIG. 10, by the number "9" shown in FIGS. 9A through 9D, by the number "8" shown in FIG. 8, by the number "7" shown in FIGS. 7A through 7C, by the number "6" shown in FIGS. 6A through 6C, by the number "5" shown in FIGS. 5A through 5E, by the number "4" shown in FIGS. 4A and 4B, by the number "2" shown in FIGS. 2A and 2B, or by the number "1" shown in FIGS. 1A through 1G.

As is shown in FIG. 19A, a materials handling facility 1910 includes a storage system 1920 and a light source 1925. The storage system 1920 includes a plurality of lanes A, B, C, D or other defined regions or spaces that are dedicated or accommodating or storing identical or fungible items of the same or very similar kinds or types thereon. The lanes A, B, C, D may be defined with respect to one another by one or more lines or other demarcations, such as is shown in FIG. 19A. Alternatively, the storage system 1920 need not include any other lines or demarcations defining the lanes A, B, C, D.

The storage system 1920 further includes a photovoltaic power source 1960 disposed at or near an access point (or entry point) for the storage system 1920, e.g., a front edge of the storage system 1920. The photovoltaic power source 1920 includes one or more photovoltaic cells 1962A, 1962B, 1962C, 1962D disposed thereon. The photovoltaic cells 1962A, 1962B, 1962C, 1962D are configured to absorb natural or artificial light energy emitted by the light source 1925, and to convert the light energy to electrical energy for powering one or more load sensors (not shown) or other components for generating electrical load signals consistent with a loading condition on the storage system 1920. As is shown in FIG. 19A, each of the photovoltaic cells 1962A, 1962B, 1962C, 1962D is aligned or associated with one of the lanes A, B, C, D.

Levels of voltage $V_A$, $V_B$, $V_C$, $V_D$ generated by each of the photovoltaic cells 1962A, 1962B, 1962C, 1962D may be monitored or otherwise determined by one or more meters or sensors associated with the photovoltaic power source 1960. Where the photovoltaic cells 1962A, 1962B, 1962C, 1962D are substantially identical, the levels of voltage $V_A$, $V_B$, $V_C$, $V_D$ generated by the respective photovoltaic cells 1962A, 1962B, 1962C, 1962D in the presence of light from the light source 1925 is substantially equal, or voltage $V_A=V_B=V_C=V_D$.

As is shown in FIG. 19B, the lanes A, B, C, D of the storage system 1920 may be loaded with any number of items 19A, 19B, 19C, 19D. For example, and as is shown in FIG. 19B, a plurality of sandwiches 19A are placed on the storage system 1920 in lane A, while a plurality of hamburgers 19B are placed on the storage system 1920 in lane B, a plurality of baskets 19C of French fries are placed on the storage system 1920 in lane C and a plurality of cans 19D of beverages are placed on the storage system 1920 in lane D. Where light energy is not blocked from the photovoltaic cells 1962A, 1962B, 1962C, 1962D, the levels of voltage $V_A$, $V_B$, $V_C$, $V_D$ generated by the respective photovoltaic cells 1962A, 1962B, 1962C, 1962D remain substantially equal, or voltage $V_A=V_B=V_C=V_D$.

As is shown in FIG. 19C, when a customer 1970 extends an arm 1975 or other body part over the photovoltaic cell 1962B to retrieve one of the hamburgers 19B from the lane B, the arm 1975 or other body part causes a shadow that partially or fully blocks light energy emitted by the light source 1925 from contacting the photovoltaic cell 1962B. Therefore, a level of voltage $V_B$ generated by the photovoltaic cell 1962B is considerably lower than the levels of power or voltage $V_A$, $V_C$, $V_D$ generated by the other photovoltaic cells 1962A, 1962C, 1962D, which remain substantially equal to one another. Thus, any attributes of a transaction involving one of the hamburgers 19B may be determined based on the drop in the level of voltage $V_B$ due to the shadow caused by the arm 1975. For example, in some implementations, the item associated with the transaction may be identified as one of the hamburgers 19B based on the drop in the level of voltage $V_B$. In some implementations, the transaction may be associated with the customer 1970, who is nearest the location of the photovoltaic power source 1962B at which the drop in the level of voltage $V_B$ was observed.

Figure 20:
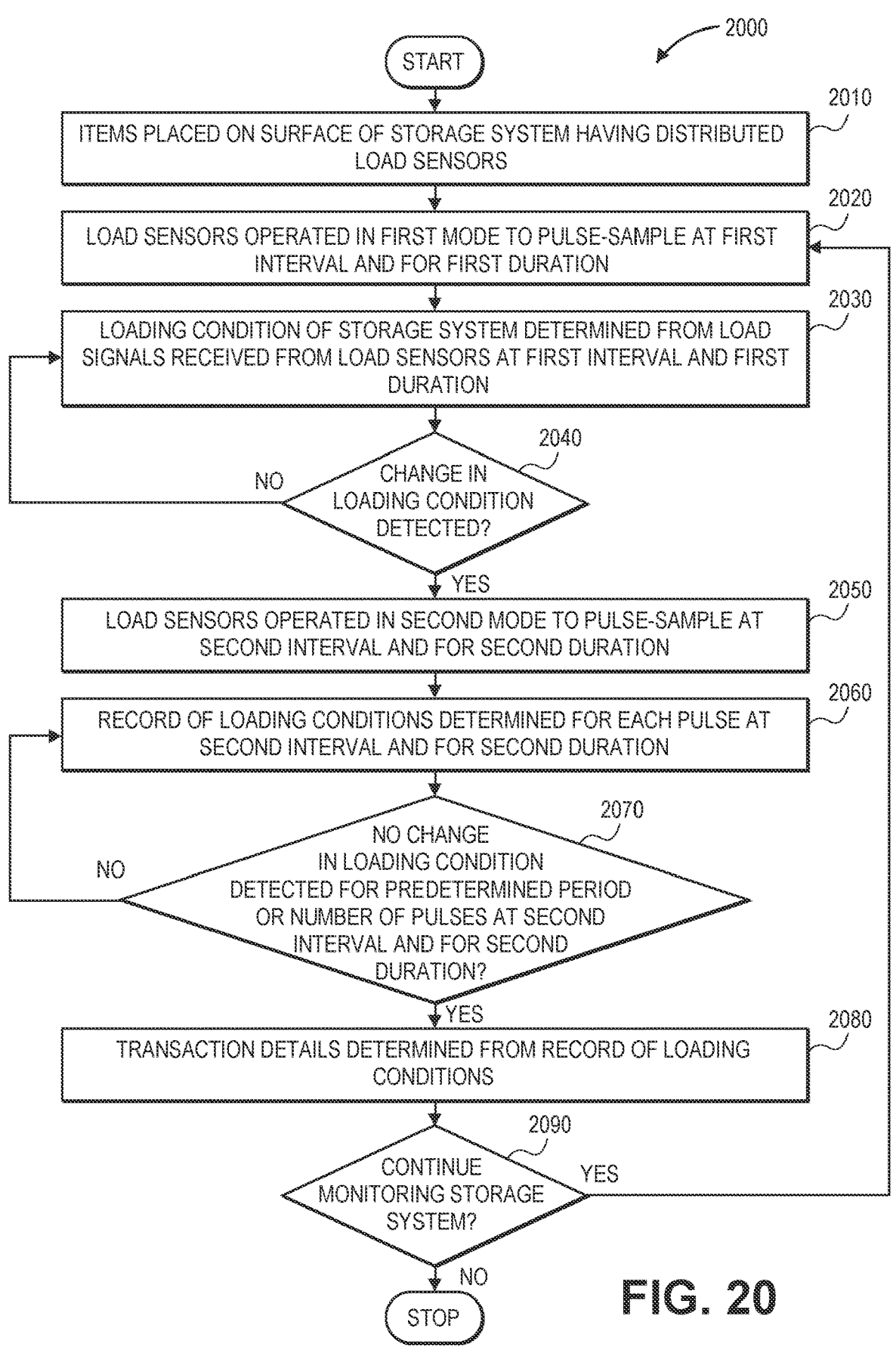
FIG. 20 is a flow chart of one process for using one or more storage systems in accordance with implementations of the present disclosure.

As is discussed above, load sensors of the present disclosure may be configured for operation in different modes, in which pulse intervals and/or pulse durations are selected based on an extent of power or energy that is available to the load sensors, as well as a level of activity associated with the load sensors, or a desired level of accuracy or precision in detecting interactions using the load sensors. Referring to FIG. 20, a flow chart 2000 of one process for using one or more storage systems in accordance with implementations of the present disclosure is shown. At box 2010, items are placed on a surface of a storage system having one or more distributed load sensors associated therewith. For example, the storage system may include one or more platforms or other surfaces provided in association with a shelf, a table, another platform, a floor, a cart or another substantially planar surface of an inventory location, and the load sensors may be provided in any number beneath such platforms or other surfaces. Alternatively, the storage system may be an integrated system that includes one or more surfaces for accommodating items. The load sensors may include one or more load cells, circuits, or other components, and may be configured for communication by wired or wireless technologies or protocols.

At box 2020, the load sensors are operated in a first mode to pulse-sample at a first interval and for a first duration. For example, each of the load sensors may be programmed to transmit a signal representative of a respective loading condition at a regular interval of time, such as every ten milliseconds, and having a regular duration, such as every two milliseconds, which may be selected on any basis, and with an objective of increasing a likelihood that a change in a loading condition of each of the load sensors is appropriately detected, or with an objective of conserving available power. For example, in some implementations, pulse intervals and pulse durations may be selected on any basis, including but not limited to an extent of power or energy that is available to the load sensors, a level of activity (e.g., a number or a frequency of interactions) of interactions with the storage system, or any other factors, including but not limited to a desired level of accuracy or precision in detecting such interactions.

At box 2030, a loading condition of the storage system is determined from load signals that are received from the load sensors at the first interval and for the first duration. For example, values of forces sensed by the respective load sensors may be calculated from such signals, and live and dead loads on the storage system may be determined accordingly.

At box 2040, whether a change in the loading condition is detected based on the load signals that are received from the load sensors at the first interval and for the first duration is determined. For example, where loading on the surface of the storage system remains constant, e.g., where items are neither removed from nor added to the surface of the storage system, the values represented in the load signals likewise remain constant. If no change in the loading condition is detected, then the process returns to box 2030.

If a change in the loading condition is detected, however, then the process advances to box 2050, where the load sensors are operated in a second mode to pulse-sample at a second interval and for a second duration. For example, where an increase in activity on the surface of the storage system is detected, the intervals by which the load sensors are sampled may be shortened, and the durations of such samples may be extended, to enhance the probability that interactions with the surface of the storage system will be timely and accurately detected. The second interval and the second duration may be determined on any basis, such as an extent of power available to the load sensors, or the frequency with which changes in the loading condition are detected. At box 2060, a record of the loading condition is determined for each pulse at the second interval and for the second duration, e.g., in the second mode. For example, where the load sensors may be configured to monitor for changes in loading at a low frequency in the first mode, e.g., when interactions with the surface are infrequent, loading conditions need not be recorded in the absence of interactions with the surface of the storage system where such loading conditions do not frequently change. Conversely, a record of the loading condition may be recorded for each pulse sampled in the second mode, or at a greater frequency than in the first mode, where interactions with the surface of the storage system are occurring or are likely to occur, such as where a customer evaluates multiple items on the surface of the storage system before choosing a single one, or where a customer retrieves an item from the surface of the storage system and then returns the item to the surface of the storage system.

At box 2070, whether no change in the loading condition has been detected for a predetermined period of time or for a predetermined number of pulses in the second mode is determined. If changes have been observed in the loading condition with the load sensors operating in the second mode, however, then the process returns to box 2060, where records of the loading conditions are determined for each pulse in the second mode. If no change has been observed in the loading condition with the load sensors operating in the second mode, however, then the process advances to box 2080, where transaction details are determined from the record of the loading conditions determined at box 2060.

At box 2090, whether the continued monitoring of the storage system is desired is determined. If the continued monitoring is desired, then the process returns to box 2020, where the load sensors are operated in the first mode to pulse-sample at the first interval and for the first duration, thereby consuming less power than when the load sensors were operated in the second mode in the presence of activity on the surface of the storage system. If the continued monitoring of the storage system is no longer desired, however, then the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Although some of the implementations of storage systems disclosed herein may be implemented within a fulfillment center or another materials handling facility, those of ordinary skill in the pertinent arts will recognize that the systems and methods of the present disclosure are not so limited, and may be utilized in connection with the placement, storage or distribution of items from storage systems provided in any environment or for any purpose.

For example, although some implementations of storage systems of the present disclosure are referenced as providing support for discrete, homogenous items (e.g., in one or more dedicated locations or spaces on the shelving systems, such as lanes or blocks), those of ordinary skill in the pertinent arts will recognize that such storage units and/or inventory areas may accommodate any type, form or number of items, and in any location or space thereon, irrespective of any attribute or category of such items.

Moreover, those of ordinary skill in the pertinent arts will further recognize that any type, form or number of storage systems may be provided singly or in tandem for the purpose of supporting one or more items thereon. As is discussed above, used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. Likewise, the systems and methods of the present disclosure may also be utilized outside of a traditional materials handling facility environment. For example, when utilized in a home, a plurality of storage systems in accordance with the present disclosure may be installed in a kitchen, a pantry, a garage, a shed or a work area, to support items thereon and track their respective arrival or departure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes shown in the flow charts of FIGS. 3, 18 and 20, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A facility comprising:
   a computer system;
   a storage surface; and a storage system resting on the storage surface, wherein the storage system comprises:

a platform configured to receive at least one of a plurality of items thereon, wherein the platform comprises four corners; and four load sensors disposed between an underside of the platform and the storage surface, wherein each one of the load sensors comprises:

a housing comprising an upper section and a lower section, wherein at least a portion of a shape of the housing defines a corner;

at least one battery provided within a cavity defined by the upper section of the housing and the lower section of the housing;

a circuit board provided within the cavity;

a load cell provided within the cavity, wherein the load cell is configured to generate load signals corresponding to a load supplied to the load cell; and a transmitter provided within the cavity, wherein the transmitter is configured to transmit the load signals to the computer system, and wherein each one of the four load sensors is provided at one of the four corners of the platform.

2. The facility of claim 1, wherein the load cell of each of the load sensors is one of:

a capacitive sensor;

a force-sensing resistor;

a strain gage;

a piezoelectric sensor; or an inductive weight sensor.

3. The facility of claim 1, wherein the storage system further comprises a plurality of connectors, wherein each of the housings comprises at least one port for accommodating an end of one of the plurality of connectors, wherein each of the plurality of connectors is configured to transfer at least one of power or data to or from at least one of the load sensors, and wherein each of the plurality of connectors is connected between:

ports of two of the load sensors; or a port of one of the load sensors and at least one of the computer system or an external power source.

4. The facility of claim 1, wherein each of the load sensors comprises an articulated contact surface descending below the lower section, wherein each of the articulated contact surfaces is formed from at least one of a polycarbonate or an acrylic, wherein each of the upper sections is in contact with the platform, and wherein each of the articulated contact surfaces is in contact with the storage surface.

5. The facility of claim 1, wherein the computer system is programmed with one or more sets of instructions that, when executed, cause the computer system to at least:

receive a first plurality of load signals corresponding to loads supplied to the load cells at a first time, wherein each of the first plurality of load signals is received from at least one of the load sensors;

receive a second plurality of load signals corresponding to loads supplied to the load cells at a second time, wherein each of the second plurality of load signals is received from at least one of the load sensors;

detect a first variation in load on the platform between the first time and the second time based at least in part on at least one of the first plurality of load signals and at least one of the second plurality of the load signals;

identify at least one item of the plurality of items associated with the first variation in load on the platform; and store an indication of at least one transaction associated with the at least one item.

6. A method comprising:

receiving, by a computer system, a first load signal from a first load sensor of a plurality of load sensors provided between a platform and a surface of a storage unit, wherein the first load signal indicates a force applied to the first load sensor by the platform at a first time, wherein each one of the plurality of load sensors is provided at one corner of the platform, and wherein each one of the plurality of load sensors comprises:

a housing, wherein at least a portion of a shape of the housing defines a corner;

at least one internal power source provided within the housing;

a circuit board provided within the housing;

a load cell provided within the housing, wherein the load cell is configured to generate load signals corresponding to a load supplied to the load cell; and a transmitter provided within the housing, wherein the transmitter is configured to transmit the load signals to the computer system;

receiving, by the computer system, a second load signal from the first load sensor, wherein the second load signal indicates a force applied to the first load sensor by the platform at a second time;

detecting, by the computer system, a variation in loading on the platform based at least in part on the first load signal and the second load signal;

identifying, by the computer system, a first item based at least in part on the first load signal and the second load signal; and storing, by the computer system, information regarding the first item in at least one data store.

7. The method of claim 6, wherein each one of the housings of the plurality of load sensors is formed from one or more of a plastic, a rubber, or a composite.

8. The method of claim 6, wherein each one of the plurality of load sensors comprises a port for accommodating an end of a connector, wherein each one of the plurality of load sensors is configured to transfer at least one of power or data by way of the port, and wherein a port of each one of the plurality of load sensors is connected, by way of a connector, to one of:

a port of another of the plurality of load sensors; or a port of at least one of the computer system or an external power source.

9. The method of claim 6, wherein each of the plurality of load sensors is configured to transmit load signals generated thereby to the computer system by at least one of:

a wireless communication protocol; or a wired connection to the computer system or another of the plurality of load sensors in communication with the computer system.

10. The method of claim 6, wherein identifying the first item based at least in part on the first load signal and the second load signal comprises:

calculating at least one of a mass or a weight based at least in part on the first load signal and the second load signal, wherein at least one of the mass or the weight is calculated based at least in part on a difference between the force applied to the first load sensor by the platform at the first time and the force applied to the first load sensor by the platform at the second time; and identifying one of a plurality of items having the at least one of the mass or the weight, wherein the one of the plurality of items having the at least one of the mass or the weight is the first item.

11. The method of claim 10, further comprising:

determining a cost associated with a transaction involving the first item, wherein the cost associated with the transaction is one of:

a unit cost for the first item; or a product of a cost per mass or weight of the first item and one of the mass or the weight; and charging the cost associated with the transaction to a customer.

12. The method of claim 6, wherein the storage unit is one of a shelf, a table or a floor, and wherein the platform rests on the plurality of load sensors.

13. The method of claim 6, wherein the housing comprises an upper section and a lower section, and wherein the at least one internal power source, the circuit board, the load cell and the transmitter are provided within a cavity defined by the upper section and the lower section.

14. The method of claim 13, wherein the housing further comprises an articulated contact surface descending below the lower section, wherein the articulated contact surface of each one of the plurality of load sensors is formed from at least one of a polycarbonate or an acrylic, wherein the upper section of each one of the plurality of load sensors is in contact with the platform, and wherein the articulated contact surface of each one of the plurality of load sensors is in contact with the surface of the storage unit.

15. A storage system comprising:

a computer system;

a platform having an upper surface for accommodating items thereon, wherein the platform has a substantially rectangular shape having four corners;

four load sensors disposed between a lower surface of the platform and an upper surface of an inventory location, wherein the computer system is in communication with each of the four load sensors, and wherein each of the four load sensors is provided at one of the four corners of the platform and comprises:

a housing, wherein at least a portion of a shape of the housing defines a corner aligned with the one of the four corners of the platform;

a circuit board provided within the housing;

a battery provided within the housing;

a load cell provided within the housing, wherein the load cell is configured to generate load signals corresponding to a load supplied to the load cell; and a transmitter provided within the housing, wherein the transmitter is configured to transmit the load signals to the computer system; and a plurality of connectors, wherein each of the plurality of connectors is configured to transfer at least one of power or data to or from at least one of the four load sensors, and wherein each of the plurality of connectors is connected between:

two of the four load sensors; or one of the four load sensors and at least one of the computer system or a power source external to the four load sensors.

16. The storage system of claim 15, wherein each of the four load sensors is configured to transmit load signals generated thereby to the computer system by at least one of:

a wireless communication protocol; or one of the plurality of connectors.

17. The storage system of claim 15, wherein the computer system is configured to execute a method comprising:

receiving a first load signal from a first load sensor of the four load sensors, wherein the first load signal indicates a force applied to the first load sensor by the platform at a first time;

receiving a second load signal from the first load sensor, wherein the second load signal indicates a force applied to the first load sensor by the platform at a second time;

detecting a variation in loading on the upper surface of the platform based at least in part on the first load signal and the second load signal;

identifying an item based at least in part on the variation in loading; and in response to identifying the item based at least in part on the variation in loading, storing information regarding the item in at least one data store.

18. The storage system of claim 17, wherein the method further comprises:

in response to identifying the item based at least in part on the variation in loading, determining a cost associated with the item, wherein the cost associated with the item is one of:

a unit cost for the item; or a product of a cost per mass or weight of the item and one of a mass of the item or a weight of the item determined based at least in part on the variation, wherein the information regarding the item comprises the cost associated with the item.

19. The storage system of claim 15, wherein the load cell of each of the four load sensors is one of:

a capacitive sensor;

a force-sensing resistor;

a strain gage;

a piezoelectric sensor; or an inductive weight sensor.

20. The storage system of claim 15, wherein each one of the housings comprises an upper section and a lower section defining a cavity, wherein each one of the housings has a shape defining a corner, wherein each one of the load sensors comprises an articulated contact surface descending below the lower section, wherein each one of the articulated contact surfaces is formed from at least one of a polycarbonate or an acrylic, wherein each one of the upper sections is in contact with the lower surface of the platform, and wherein each one of the articulated contact surfaces is in contact with the upper surface of the inventory location.

* * * * *